(12) United States Patent
Herrmann et al.

(10) Patent No.: US 8,277,324 B2
(45) Date of Patent: Oct. 2, 2012

(54) SYSTEM AND METHOD FOR COLLECTING AND USING PLAYER INFORMATION

(75) Inventors: Mark E. Herrmann, Wellesley, MA (US); Dow K. Hardy, Marlborough, MA (US); John F. Acres, Corvallis, OR (US); John E. Taylor, Jr., Vero Beach, FL (US); Scott N. Weller, Windham, NH (US); Francis Josef Lichtenberger, Winchester, MA (US)

(73) Assignee: Scientific Games Holdings Limited, Ballymahon, Co. Longford (IE)

( * ) Notice: Subject to any disclaimer, the term of this patent is extended or adjusted under 35 U.S.C. 154(b) by 536 days.

(21) Appl. No.: 12/345,296

(22) Filed: Dec. 29, 2008

(65) Prior Publication Data

US 2009/0176579 A1      Jul. 9, 2009

Related U.S. Application Data

(60) Provisional application No. 61/016,801, filed on Dec. 26, 2007.

(51) Int. Cl.
*A63F 9/24* (2006.01)
*A63F 13/00* (2006.01)
*G06F 17/00* (2006.01)
*G06F 19/00* (2011.01)

(52) U.S. Cl. .......................................... 463/43
(58) Field of Classification Search ...................... 463/43
See application file for complete search history.

(56) References Cited

U.S. PATENT DOCUMENTS

| | | | |
|---|---|---|---|
| 4,689,742 A | 8/1987 | Troy et al. | |
| 4,764,666 A | 8/1988 | Bergeron | |
| 4,882,473 A | 11/1989 | Bergeron et al. | |
| 5,398,932 A | 3/1995 | Eberhardt et al. | |
| 5,772,511 A | 6/1998 | Smeltzer | |
| 5,779,549 A | 7/1998 | Walker et al. | |
| 5,816,918 A | 10/1998 | Kelly et al. | |
| 6,007,426 A | 12/1999 | Kelly et al. | |
| 6,015,344 A | 1/2000 | Kelly et al. | |

(Continued)

FOREIGN PATENT DOCUMENTS

EP       1833014       9/2007

(Continued)

OTHER PUBLICATIONS

PCT Search Report, Sep. 15, 2011.

*Primary Examiner* — Matthew W Such
*Assistant Examiner* — Robert Carpenter
(74) *Attorney, Agent, or Firm* — Dority & Manning, P.A.

(57) ABSTRACT

A distributed computer system is provided for collecting player information. Further, a scoring system is provided that rates a player based on one or more elements of the collected information. Players may be rated with respect to a number of characteristics. Responsive to a determined rating or score, action may be taken by the distributed system with regard to the player. For instance, the player may be provided a complimentary offer, provided an award, and invitation to come to a gambling location, presented an advertisement, or other action may be performed involving the player. Further, the distributed computer system may permit a player to manage their frequent player accounts and receive complimentary offers based on a set of criteria specified by the player.

20 Claims, 33 Drawing Sheets

U.S. PATENT DOCUMENTS

| | | | |
|---|---|---|---|
| 6,048,269 A | 4/2000 | Burns et al. | |
| 6,113,495 A | 9/2000 | Walker et al. | |
| 6,193,608 B1 | 2/2001 | Walker et al. | |
| 6,224,486 B1 * | 5/2001 | Walker et al. | 463/42 |
| 6,244,958 B1 | 6/2001 | Acres | |
| 6,251,017 B1 | 6/2001 | Leason et al. | |
| 6,302,793 B1 | 10/2001 | Fertitta, III et al. | |
| 6,371,852 B1 | 4/2002 | Acres | |
| 6,575,832 B1 | 6/2003 | Manfredi et al. | |
| 6,663,105 B1 | 12/2003 | Sullivan et al. | |
| 6,786,824 B2 * | 9/2004 | Cannon | 463/42 |
| 6,852,031 B1 | 2/2005 | Rowe | |
| 6,910,968 B2 | 6/2005 | Nassef | |
| 6,929,544 B2 | 8/2005 | Osterer | |
| 6,969,319 B2 | 11/2005 | Rowe et al. | |
| 7,094,149 B2 | 8/2006 | Walker et al. | |
| 7,303,470 B2 | 12/2007 | George et al. | |
| 7,490,830 B2 | 2/2009 | Mirandette et al. | |
| 2001/0034635 A1 | 10/2001 | Winters | |
| 2002/0007313 A1 | 1/2002 | Mai et al. | |
| 2002/0077173 A1 | 6/2002 | Luciano et al. | |
| 2002/0093190 A1 | 7/2002 | Katz | |
| 2002/0107072 A1 | 8/2002 | Giobbi | |
| 2002/0116266 A1 * | 8/2002 | Marshall | 705/14 |
| 2002/0155885 A1 | 10/2002 | Shvili | |
| 2003/0032473 A1 | 2/2003 | Rowe et al. | |
| 2003/0032476 A1 | 2/2003 | Walker et al. | |
| 2003/0186739 A1 | 10/2003 | Paulsen et al. | |
| 2004/0259631 A1 | 12/2004 | Katz et al. | |
| 2005/0027599 A1 | 2/2005 | Boyd et al. | |
| 2005/0049886 A1 | 3/2005 | Grannan et al. | |
| 2005/0090314 A1 | 4/2005 | Nassef, Jr. | |
| 2005/0124407 A1 | 6/2005 | Rowe | |
| 2005/0164779 A1 | 7/2005 | Okuniewicz | |
| 2006/0036450 A1 | 2/2006 | Nassef, Jr. et al. | |
| 2006/0041586 A1 | 2/2006 | Nassef, Jr. | |
| 2006/0089194 A1 | 4/2006 | Joshi et al. | |
| 2006/0194631 A1 | 8/2006 | Rowe et al. | |
| 2006/0247035 A1 | 11/2006 | Rowe et al. | |
| 2007/0060274 A1 | 3/2007 | Rowe et al. | |
| 2007/0067297 A1 | 3/2007 | Kublickis | |
| 2007/0087834 A1 | 4/2007 | Moser et al. | |
| 2007/0239716 A1 | 10/2007 | Weininger et al. | |
| 2008/0032763 A1 | 2/2008 | Giobbi | |
| 2009/0054148 A1 | 2/2009 | Hardy et al. | |
| 2011/0111836 A1 | 5/2011 | Acres | |
| 2011/0111855 A9 | 5/2011 | Hardy et al. | |

FOREIGN PATENT DOCUMENTS

| | | |
|---|---|---|
| WO | WO 02/086845 | 10/2002 |
| WO | WO 03089082 | 10/2003 |
| WO | WO 2004/114073 | 12/2004 |
| WO | WO 2006/028820 | 3/2006 |
| WO | WO 2006/052469 | 5/2006 |
| WO | WO 2007/145999 | 12/2007 |
| WO | WO 2008/014334 | 1/2008 |
| WO | WO 2008/022084 | 2/2008 |

* cited by examiner

SYSTEM AND METHOD FOR COLLECTING AND USING PLAYER INFORMATION

RELATED APPLICATIONS

This application claims priority under 35 U.S.C. 119(e) to U.S. Provisional Application Ser. No. 61/016,801, entitled "SYSTEM AND METHOD FOR COLLECTING AND USING PLAYER INFORMATION," by Mark Herrmann et al., filed Dec. 26, 2007, of which application is incorporated herein by reference in its entirety.

FIELD OF THE INVENTION

The field of the invention relates generally to gaming, and more particularly to collecting and using information relating to players.

BACKGROUND

Traditional methods of collecting player information include information collected by player tracking systems, such as, for example, International Game Technology's Advantage system, Bally Technology's Slot Management System and Table Management System. Player tracking systems are useful for automating some or all of the tasks required to provide additional incentives for frequent or loyal play. For example, points may be awarded for every unit of wagers made and those points may be redeemed for prizes.

Player tracking systems utilize magnetic striped cards to hold a unique identifier which is associated with a specific person's account. Each gambling machine and/or table game position is equipped with a compatible card reader. A person wishing to allow their gambling activities to be monitored inserts their card into the compatible card reader. Other identification techniques are also useful with player tracking systems and include but are not limited to biometric identification, smart cards and Hollerith cards. In some cases, additional identity authentication is required such as entering a PIN or password on a keypad or touchscreen.

Most player tracking systems include a display which provides acknowledgment that the card was accurately read and associated with an account. Typically, for so long as the person's card remains inserted in the reader, all gambling activity that occurs on the associated gambling game is recorded on the identified account.

Such activity is monitored and tracked by casinos and other gaming establishments to determine, among other things, a classification of a particular player. Such activities are monitored to determine complimentary packages, such as free hotel rooms, casino credits and other incentives that may be used to retain the player's business, or to encourage a return visit to the casino.

Numerous organizations and companies have incentive programs for customers. For example, airlines have frequent flyer programs that allow a member passenger to take free trips or provide other perks after the member has taken a minimum number of flights or has flown a minimum number of miles. Numerous other types of establishments, including hotel chains, chain stores, and movie rental companies, have similar programs used to incentivize a customer.

Casinos also often have similar frequent player programs that provide incentives for continued customer patronage. For instance, the Foxwoods Casino (Mashantucket, Conn.) offers a program referred to as Wampum Rewards. A player participating in the program receives a card which the player uses whenever he/she comes to the casino. In one example implementation, the player swipes the card at special kiosks located within the casino which permit that player to have a chance to win prizes. A Wampum Rewards member may also swipe his or her card whenever betting or spending money within the casino and in the associated hotel, resort, or shops. As the player bets or spends more money, the player becomes eligible for free or reduced cost perks. Other examples of frequent player programs used in the casino environment include the well-known Harrah's Total Rewards, Wynn Casino's Red Card, and Trump Casinos' Trump Card programs (e.g., Trump One Card).

As with frequent flyer programs and other types of incentive programs, typical goals of the casino frequent player program include increasing player loyalty, providing incentives to a player to visit the associated casinos as often as possible, and encouraging the player to spend as much money in the associated establishments as possible. To further improve the effectiveness of player loyalty programs, there is a present and recurring need for new methods to provide incentives to frequent player program members as well as attract new players.

SUMMARY

According to one aspect, it is realized that such conventional systems for collecting player information are not sufficient for adequately determining player worth. For instance, a new player who has never visited the gaming establishment will be "unknown" to the gaming establishment, and any data provided by the player will be insufficient for determining their value as a gambler. However, that person may be well-known to other gaming establishments, and may have, depending on their behavior at such establishments, widely different player ratings and profiles among the various establishments. That is, the individual activities at each of the gaming establishments are insufficient for determining the actual worth of the player, as the actual worth of the player is determined by the overall assessment of his/her activities. Such an assessment is difficult to determine, as each gaming establishment does not grant access to each other's data, and thus a holistic view of the play cannot be determined. In the case where there are multiple locations for a casino to which a player may visit, and each of these locations may have a separate view of activity that may be compiled into a total view for the establishment, such a total view is still incomplete, as there are player activities that are beyond the view of the establishment.

It would be beneficial to have a system capable of collecting and storing player performance data from multiple gaming establishments. Such information may be used, for example, to determine a value of a particular player to a gaming establishment. According to one aspect, a system is provided that collects player information from multiple sources such as gaming establishments, and creates a rating for a player that is more indicative of player value than information collected from a single source. For instance, player information such as ratings, demographics, play history and other player information may be collected and stored by a player tracking or other type of system. The information may be stored in any type of storage (e.g., in a file system, in a database, in memory, etc.). Such a system establishes a holistic rating for the player that is more clearly indicative of player worth, as a result of collecting information from multiple gaming establishments.

Such a system that collects player rating information from multiple gaming establishments (among other sources) is better than conventional rating systems, as gaming establishments are limited to only the information that they have collected on a player. Thus, gaming establishments have a limited view on a player, and thus do not make decisions regarding the player optimally. For instance, for a player that plays very little at establishment X, but plays at establishment Y, the estimated worth of the player by establishment X will be lower than that of Y, and establishment X may be losing opportunities based on their limited view of the player. Thus, the system can identify opportunities to consolidate play of the player.

Such a system increases accuracy in knowing number of visits per player, visit frequency, amount spent per visit, which is used to compute worth. For instance, recency (when was the last time the player visited?), frequency (how frequent does a player visit?), and intensity (how much does the player spend?) or RFI may be used to determine value of a player. However, these parameters are affected substantially if a portion of a player's behavior is unknown. By knowing activity at other gaming establishments which may be different than the "limited" view of a particular gaming establishment, the gaming establishment may more accurately rate the player, and perform actions accordingly (e.g., make an offer to the player that is better suited to his/her player rating).

Such a system may track player behavior among multiple establishments, establish a better view of the player, and make better marketing decisions accordingly. For instance, the player plays craps at establishment X, but does not play poker. However, the player plays poker at establishment Y at a particular level. Now, because a system is provided that tracks behavior from multiple gaming establishments, establishment X may make an offer regarding poker based on behavior of the player at establishment Y, and that offer may interest the player. Such a system may be provided as a service (e.g., to a local tourism board) as a method to increase cross-selling opportunities between a number of establishments.

With some conventional information that could be obtained from gaming establishments (e.g., as provided by the gaming establishment as a result of subscribing to the gaming establishment's information), access to player performance information may be limited to the frequent player info, but info could not be tied to the player. That is, in some forms of information provided by casinos, the only information available to gaming establishments is the frequent player identifier information, but not the actual player identity, which is necessary to contact the player, make offers, etc. In one aspect, players are enticed to provide their frequent player information and its association to their identity that permits their identities to be identified with more than one frequent player accounts and their associated performance information.

Also, because this information is collected and stored, the system may have the capability of functioning as a data clearing house for proprietary performance information from multiple gaming establishments. This information may be traded, sold, auctioned, and/or offered to multiple entities to perform various functions such as direct marketing, financial analysis, player rating and/or monitoring functions, or other functions.

Further, a system may collect other information regarding the player, and may provide the player information to other organizations. Not only would such information be useful for casinos, but other organizations as well. Further, because the system is capable of providing a more accurate assessment of gamblers, the system may successfully correlate other types of information with player gambling tendencies. For example, upon analyzing the player database and holistic view of the players, it may be determined (e.g., by survey or other methods) that Vodka drinkers consistently make up the highest tiers of gamblers. Such information may be used by the system to attract more and better gamblers, but this information may also be sold to casinos for their own advertising and marketing purposes.

Another aspect relates to scoring of players. In one embodiment, players and potential players are scored based on a number of criteria, and their potential value to a gambling organization is determined based on the criteria. Scores for known players are compared with the criteria of unknown players for the purpose of evaluating them as potential gamblers. Persons/players may be evaluated based on a number of different types of data, including, but not limited to demographic data, psychographic data, social and social graph data, self-reported data provided by the person/player, online activity, offline activity, casino or other type of on-property activity, advertising response/actions, calls to or requests for action, and/or other information relating to the person/player and his/her behavior. In one embodiment, a model is maintained for the person/player and is updated as new information relating to the player is obtained.

Information relating to the player may be gathered from various sources, including casinos or other gambling organizations, data collection organizations, (e.g., TARGUSinfo), websites, online surveys, website questionnaires, opinion polls, or any other source of information. One or more referential data sets may be created that describe the person/player, such as their behavior (e.g., online behavior, casino behavior, offline spending behavior, etc.), demographic information regarding the player, psychographic information, or any other information relating to the person/player. Information stored in these referential data sets may be used by a system (e.g., a scoring system) to determine an overall score of a player/person. In one embodiment, the score may determine the likelihood that the player/person will spend a particular amount at a particular rate (e.g., by determining a person/player's Average Daily Theoretical win (ADT)).

Different scores may also be determined for a player based on what types of games the player/person may play. For instance, the player may have different ratings for table games than slots, a different rating for roulette versus poker, etc. Such rating information that relates to game type may be correlated to different subsets of player information. For instance, the fact that a player lives in a particular geographical area may be indicative of the player playing a particular game.

According to another embodiment, predictive mechanisms may be used to optimally determine the amount of player information to provide a score for a particular person/player. For instance, it is appreciated that certain player information is more highly indicative of a player's estimated worth than other information. Thus, if there is any information that can be collected from the player, the information that is more highly indicative should be collected from the player first, as it is appreciated that players generally do not wish to share much information about themselves, particularly in a gaming environment. According to one embodiment, more highly relevant questions are posed to a player in a sequence based in part on whether their answers are more highly indicative of their worth.

Further, it is appreciated that it would be beneficial to provide accurate scoring for potential players with little or no established gaming history. Player development is an extremely important aspect of casino marking. This is evident in the proliferation and use of player tracking and player management systems within the walls of the casino. As casino markets continue to become increasingly more competitive, it is important for a casino marketer to be able to gain an edge when attempting to entice the new player to play at their establishment.

With many markets and verticals, the Internet has long been a great tool for lead generation and customer acquisition. It can be appreciated, however, that a casino marketer faces uniquely different challenges than other businesses, such as a plumber, when attempting to attract new business into their establishment. A plumber may simply be looking to acquire leads that have leaky faucets. Casino marketers face an increasingly competitive commodity business, where supply is outstripping demand. That is why there is a strong need for a method and system that enables casino marketers to not only use the Internet as a tool to gather leads, but also to predict the value of that lead as a player. More accurate up-front scoring can provide the marketer with additional tools to increase conversions, such as better targeted advertising and promotions. It also improves the marketer's ability to spend their marketing budget more efficiently, focusing on the players that score a higher potential, in the effort of producing a greater return on investment.

Marketers already realize that Internet usage data can and should be used to derive a user's affinities. This data can be derived from which websites are visited, which products are purchased online, which news story topics they most frequent, and which advertisements are viewed and clicked on most often. The duration and frequency of return engagement can also be factored into this equation. It is this data, coupled with other external data, such as credit card purchase history, travel history, magazine subscription data, demographic data, psychographic data and volunteered data that can be used as input into a system that scores a player's potential value, before anything is known about their interaction on property. It should also be appreciated that this data could also originate from a questionnaire or form, volunteered by the user during a website visit, or a registration process.

Within the walls of the casino, the value of a player is commonly calculated by evaluating play history and property engagement over time. Sometimes, but not always, a casino may refer to a players' value as Average Daily Theoretical win, or ADT. There are other metrics that are used to measure value, but according to one embodiment, ADT is used to measure the value of a player. It should be appreciated that other metrics can be used also, either alone or in combination with ADT.

Because there could be a large number of people/players tracked in a system, it is appreciated that a system that measures people/players works with very large datasets. According to one embodiment, a method is provided for determining data elements within a set of available data that are good predictors of behavior. Ultimately, behavior equates to the metrics used to measure player value when play history has been established, such as ADT. In one embodiment, a system is provided that determines the optimal predictors of certain behavior over time. For instance, such a system may collect information from people/players and fine tune, responsive to gathering of information over time, which elements provide the best indication of value within specific demographic and psychographic groups.

According to one aspect, a system is provided that determines the value of a player. The system gathers information from a number of different sources regarding known and unknown players. For instance, data may be gathered regarding a player via forms, questionnaires, online behavior, other systems, or any other data source. Optionally, this collected information may be linked to known metrics, such as credit score, or other rating information. These metrics may be associated with particular elements, such as psychographic information or demographic information. In one implementation, a model may be created that represents the player, the model having information that is collected over time.

The collected information associated with the person/player may be processed by a scoring engine to produce a score for that player. In one implementation, analytical methods may be used such as predictive analytics functions to produce a predicted score for the person/player. Based on the computed score, a number of different actions may be performed such as targeting particular players for direct mail or online marketing, targeting offers to the player, providing the scoring information to other systems as a service, etc. Further, the scoring information may be used to improve the quality of data collection, as elements that are more highly indicative of player value may be posed to the player in order of priority. Further, one or more predictive scores may be associated and stored with the model of the player.

Yet further embodiments relate to delivering players (e.g., patrons) to a system. It is a well established practice for gaming establishments to offer gambling incentives to patrons or potential patrons. One goal of these incentives may be to motivate a patron or a potential patron to visit a specific gaming establishment. Another goal may be to reward an existing patron and engender customer loyalty. Yet another goal relates to improving the customer experience.

Gaming establishments naturally want customers to have enjoyable visits. For new patrons, studies have shown that casino patrons who win more than $100 on their first visit to a specific casino are 4 time more likely to become loyal customers. Similarly, existing patrons who continue to have enjoyable visits at gaming establishments are more likely to remain loyal to that specific establishment and will likely have higher visitation frequency.

Commonly, incentives are awarded as non-cashable credit (NCC) and may take the form of specially marked chips, coupons, vouchers, player card account credit or other forms that can be used with electronic gaming machines (EGMs) or table games. Typically, the NCC does not differentiate between various EGMs or table games. In other words, the EGM NCC functions the same on all eligible EGM games, while the table game NCC functions the same on all eligible table games. The games themselves function in the same whether patrons use NCC, cash, or credit.

Because the gaming establishments have a strong incentive to promote enjoyable visits, one aspect of the invention creates more intelligent incentives that increase the likelihood of an enjoyable patron visit or advance some other goal of the gaming establishment. These incentives may be, for example, in the form of intelligent NCC or may take any other form such as coupons, vouchers, player card account information, or other forms that is able to alter or control the gaming experience.

One embodiment of the invention uses customer profile information to award incentives that create customized gaming experiences catered to the known or predicted conscious or subconscious predispositions or preferences of the patron. This customized experience serves to make the incentive more enticing to the patron, increasing the likelihood that the patron will use the incentive. It also makes it more likely that the patron will have a positive gaming experience and an enjoyable visit, because the gaming experience will more closely fit the experience suited to that patron.

In general, aspects of the present invention relate to improved methods for attracting, scoring, and delivering players using a combination of online/offline methods in association with a distributed computer system in the form of an ecosystem. Because higher-quality players (and potential players) are identified, evaluated, and delivered by the ecosystem in a more efficient manner, the return on players and investment towards those players by advertisers, lotteries, gambling organizations and other entities is improved.

According to another embodiment, a distributed computer system may also function as a frequent player points clearing house where player's credits or other points may be traded, sold, auctioned, or otherwise transferred between entities. Players may be provided access and accounts to the system, and in exchange for access to their proprietary data, the system may provide other functions that encourage player return, such as providing a capability to trade, sell, or otherwise transfer frequent player points with other players, manage their frequent player accounts, receive offers from casinos and other establishments, solicit offers from establishments, and other functions. In one embodiment, a player grants access to their player account information, and the system is configured to obtain and store such information. Further, the system may be capable of collecting other identifying information for the player, such as where the player lives, his/her occupation, other demographic information which could be used as data points by gaming establishments (or other entities) to extend offers to players.

The system may also provide access to data for players that have no or limited contact to the gaming establishment, increasing opportunity to market to potential new players, using player's information identifying a propensity to gamble, along with their rating as gambler, and other information. The system also provides a more focused avenue for determining potential players, thus optimizing their marketing investment. For example, a more structured mailing list of potential gamblers can be created, rather than relying on other less-indicative forms of data.

According to one embodiment, data could be obtained by the system by either the gaming establishment providing the information (in exchange for access to services provided by the system) and/or by "logging on" to frequent player program tracking systems as the player, with the player's identity and password. It is appreciated that player "owns" their personal information, and for gaming establishments that do not wish to share their proprietary information, the player can grant access to their personal information for the system. Data may be collected in real time, and real-time decisions may be made regarding the player (e.g., the player was playing at casino A today, won/spent/played this much, send him/her a text message of an offer to come over to casino B (where casino A and casino B may be geographically located in the same area, or are near to each other)). According to one embodiment, a monitoring system may be provided that permits the real-time monitoring of the player so that actions regarding the player may be performed.

In some cases, gaming establishments may not permit access to player performance information (as it is proprietary information), and it may be beneficial to infer the player's performance. According to one embodiment, it is realized that the player's rate of spending in a particular gaming establishment may be inferred through a player's frequent player points. More particularly, as the rate of the player's frequent player points increases (or decreases as they are used by the player), the activity of the player can be inferred. For instance, if the player's frequent player points are increasing at a high rate, that play of that player may be correlated to a high spend rate. In this manner, the system need not have access to proprietary performance information to infer a player's spend rate.

In another implementation, entities may be encouraged to provide their proprietary data. In one embodiment, access to raw performance information from a particular gaming establishment may be prohibited, allaying privacy/competition concerns among those entities that own the information. More specifically, the holder of the player rating information may be, according to one embodiment, a neutral entity that does not provide unfettered access to the data, thus encouraging gaming establishments to share their proprietary data. In one embodiment more fully discussed below, one or more rules may be used to determine access to data.

Another aspect relates to a network that enables casino patrons to solicit complimentary offers. In one embodiment, gaming establishments (among other entities) may subscribe to player rating information (e.g., as provided by a player data collection system) and may use rating information to determine an offer that is extended to player. Such a method for determining an appropriate offer is better than conventional rating systems, as gaming establishments are limited to only the information that they have collected on a player. According to one embodiment, an offer could be based either on info provided by player, by offers created by gaming establishment, or combination of the information.

According to one embodiment, the system may permit more accurate offers to be extended to known players, as the system could track offers accepted by the player (e.g., what will it take to get this player to accept an offer?). By storing a historical record of packages taken/not taken by known players, more informed decisions may be made with regard to what future offers should be made to the player.

Further, it is appreciated that such a method could be extended to identify and attract unknown players. In particular, it is appreciated that offers extended to unknown players can be improved, especially for those who have not established a play history at a particular gaming establishment. In one embodiment, information may be collected by a system for previously unknown players, and offers may be tailored to suit such unknown players. Such a system may also provide more options for the gambler, as gaming establishments that did not have prior histories on players can now compete for their business. According to one aspect, it is appreciated that reaching the previously unknown player is one of the most valuable opportunities for gaming establishments. Thus, gaming establishments may more effectively target players that have not established a history.

According to another aspect, an online method is provided for players to track frequent player information from multiple gaming establishments (or other entities). Players are enticed by a tracking feature to provide their information that permits their identities to be correlated with frequent player accounts and its associated performance information. In one embodiment, a player is permitted to trade points between establishments, operating as clearing house for player points. Point programs may be any type (e.g., casino, hotel, airline, etc.) and may allow the player to trade between programs. Also, point programs may be created for gaming machine vendors, software program vendors, etc., thus permitting the view of the player and the functions that can be performed by the player with point programs to be more complete.

In another embodiment, gaming establishments are permitted to advertise on the system, enticing them to have more focused advertising access to players that have propensity and capability for gambling, and further encouragement to share proprietary information. Advertising displayed to the player may be based at least in part on the identity of the player. Also, the player is encouraged to "check their points" and see promotions that are available, increasing the likelihood that the advertising reach is increased.

In yet another embodiment, it is appreciated that social networks have become commonplace on the Internet, and it is desirable to permit gaming establishments to reach players that use such networks. In particular, as social networks increase in popularity, they not only continue to attract a more youthful age group, but they are used increasingly by people that are more mature in age. With the advent of social networks being used by such people, there is an increasingly greater opportunity for gaming establishments such as lotteries and casinos to market to their target audience, using such social networks.

According to one embodiment, as a member of a social network, a social network user is permitted to place content on their page that enable entry in one or more sweepstakes. According to one embodiment, the user is permitted to select one or more potentially available sweepstakes in which to participate. In one implementation, the content placed on the user's page uses a number of social network parameters to accrue entries in sweepstakes. For instance, how active the person is in their social network may affect how quickly the person accrues entries. In another embodiment, a member of a social network is permitted to accrue loyalty points (e.g., frequent player program points) rather than sweepstakes entries. In one embodiment, activity within the member's social network determines how quickly loyalty program points are accrued.

In addition to being marketing opportunities, according to one aspect, social networks can also be used as a tool to collect additional behavioral, preference, demographic, or other data that can be used to build the player profile and build a more complete model of the player. For example, social networks can be used as a platform for polls and questionnaires. Player behavior, such as online games played and time spent playing specific games can also be used to build a more accurate model of the player and make predictions about their value, preferences, and future behavior.

According to one aspect of the present invention, a computer-implemented method for collecting player information is provided, comprising acts of receiving performance information relating to at least one player from a plurality of independent organizations; determining a rating of the at least one player based at least in part on the received performance information; and extending an offer to the player based on the determined rating. According to one embodiment, the performance information is received from the plurality of independent organizations by accessing a frequent player account associated with at least one of the plurality of independent organizations.

According to another embodiment, the method further comprises an act of collecting demographic information related to the player. According to another embodiment, the method further comprises an act of collecting behavioral information related to the player. According to another embodiment, the method further comprises an act of collecting data regarding online activity of the player. According to another embodiment, the method further comprises an act of collecting data regarding offline activity of the player. According to another embodiment, the method further comprises an act of collecting data directly from the player.

According to another embodiment, the performance information includes frequent player account information, and wherein the act of determining a rating of the player further comprises acts of determining a rate of change in frequent player account points awarded to the player; and determining the rating based on the determined rate of change. According to another embodiment, the performance information includes win/loss statement information, and wherein the act of determining a rating of the player further comprises acts of determining an overall win/loss performance based on a plurality of win/loss statements collected from the plurality of independent organizations; and determining the rating based on the determined overall win/loss performance. According to another embodiment, the rate of change in frequent player account points is determined to be indicative of a rate of play by the player. According to another embodiment, the performance information includes loyalty account information, and wherein the method further comprises an act of receiving loyalty account information from one or more loyalty account systems.

According to another aspect, a computer readable medium is provided that comprises computer-executable instructions that when executed on a processor performs a method for collecting player information in a distributed computer system, the method comprising acts of receiving performance information relating to at least one player from a plurality of independent organizations; determining a rating of the at least one player based at least in part on the received performance information; and extending an offer to the player based on the determined rating. According to one embodiment, the performance information is received from the plurality of independent organizations by accessing a frequent player account associated with at least one of the plurality of independent organizations.

According to another embodiment, the method further comprises an act of collecting demographic information related to the player. According to another embodiment, the method further comprises an act of collecting behavioral information related to the player. According to another embodiment, the method further comprises an act of collecting data regarding online activity of the player.

According to another embodiment, the method further comprises an act of collecting data regarding offline activity of the player. According to another embodiment, the method further comprises an act of collecting data directly from the player. According to another embodiment, the performance information includes frequent player account information, and wherein the act of determining a rating of the player further comprises acts of determining a rate of change in frequent player account points awarded to the player; and determining the rating based on the determined rate of change.

According to another embodiment, the performance information includes win/loss statement information, and wherein the act of determining a rating of the player further comprises acts of determining an overall win/loss performance based on a plurality of win/loss statements collected from the plurality of independent organizations; and determining the rating based on the determined overall win/loss performance. According to another embodiment, the rate of change in frequent player account points is determined to be indicative of a rate of play by the player.

According to another aspect, a computer system is provided comprising a component adapted to receive performance information at least one player from a plurality of independent organizations, a component adapted to determine a rating of the at least one player based at least in part on the received performance information, and a component adapted to extend an offer to the player based on the determined rating. According to another embodiment, the performance information is received from the plurality of independent organizations by accessing a frequent player account associated with at least one of the plurality of independent organizations.

According to another embodiment, the system further comprises a component adapted to collect demographic information related to the player. According to another embodiment, the system further comprises a component adapted to collect behavioral information related to the player. According to another embodiment, the system further comprises a component adapted to collect data regarding online activity of the player. According to another embodiment, the system further comprises a component adapted to collect data regarding offline activity of the player.

According to another embodiment, the system further comprises a component adapted to collect data directly from the player. According to another embodiment, the performance information includes frequent player account information, and wherein the component adapted to determine a rating of the player further comprises a component adapted to determine a rate of change in frequent player account points awarded to the player; and a component adapted to determine the rating based on the determined rate of change. According to another embodiment, the performance information includes win/loss statement information, and wherein the component adapted to determining a rating of the player further comprises a component adapted to determine an overall win/loss performance based on a plurality of win/loss statements collected from the plurality of independent organizations; and a component adapted to determine the rating based on the determined overall win/loss performance. According to another embodiment, the rate of change in frequent player account points is determined to be indicative of a rate of play by the player.

According to another aspect, a computer-implemented system for collecting player information is provided, the system comprising a collector adapted to collect information relating to a plurality of frequent player accounts associated with a player, and a database adapted to store the collected information. According to another embodiment, the system further comprises a processor adapted to determine a rating of the player based on the information relating to the plurality of frequent player accounts associated with the player.

According to another embodiment, the plurality of frequent player accounts are player accounts related to a respective plurality of gaming establishments. According to another embodiment, the system further comprises a component configured to execute a trading of frequent player points between a plurality of players. According to another embodiment, the collector further comprises a component that is adapted to log onto at least one of the plurality of frequent player accounts associated with the player to obtain the information.

According to another embodiment, the system further comprises a component that permits the player to manage points associated with the at least one of the plurality of frequent player accounts associated with the player. According to another embodiment, the system further comprises an interface adapted to display, to the player, the collected information relating to a plurality of frequent player accounts associated with the player. According to another embodiment, the system further comprises a component configured to purchase, on behalf of the player, frequent player points from one of a plurality of frequent player programs. According to another embodiment, the system further comprises a component configured to sell, on behalf of the player, frequent player points from one of a plurality of frequent player programs.

According to another aspect, a computer-implemented method for collecting player information is provided, the system comprising acts of collecting information relating to a plurality of frequent player accounts associated with a player; and storing, in a database, the collected information. According to another embodiment, the method further comprises an act of determining a rating of the player based on the information relating to the plurality of frequent player accounts associated with the player. According to another embodiment, the plurality of frequent player accounts are player accounts related to a respective plurality of gaming establishments.

According to another embodiment, the method further comprises an act of executing a trading of frequent player points between a plurality of players. According to another embodiment, the act of collecting further comprises an act of logging onto at least one of the plurality of frequent player accounts associated with the player to obtain the information. According to another embodiment, the method further comprises an act of permitting the player to manage points associated with the at least one of the plurality of frequent player accounts associated with the player.

According to another embodiment, the method further comprises an act of displaying, to the player, the collected information relating to a plurality of frequent player accounts associated with the player. According to another embodiment, the method further comprises an act of purchasing, on behalf of the player, frequent player points from one of a plurality of frequent player programs. According to another embodiment, the method further comprises an act of selling, on behalf of the player, frequent player points from one of a plurality of frequent player programs.

According to another aspect, a computer readable medium is provided comprising computer-executable instructions that when executed on a processor performs a method for collecting player information in a distributed computer system, the method comprising acts of collecting information relating to a plurality of frequent player accounts associated with a player; and storing, in a database, the collected information. According to another embodiment, the method further comprises an act of determining a rating of the player based on the information relating to the plurality of frequent player accounts associated with the player.

According to another aspect, a computer-implemented method for receiving a complimentary offer, comprising acts of providing access to a player, to an interface that accepts criteria related to a complimentary offer desired by a player, receiving, by a plurality of organizations, a plurality of complimentary offers based on the accepted criteria, and permitting the player to select at least one of the plurality of complimentary offers. According to another embodiment, the method further comprises an act of receiving performance information relating to at least one player from a plurality of independent organizations. According to another embodiment, the method further comprises an act of determining a rating of the player and determining at least one of the plurality of complimentary offers based on the determined rating of the player.

According to another embodiment, the method further comprises an act of determining a rating of the player responsive to player performance information collected from a plurality of independent organizations. According to another embodiment, the player performance information collected from a plurality of independent organizations is collected via a plurality of frequent player accounts. According to another embodiment, the method further comprises an act of storing at least one accepted offer by the player, and determining at least one of the complimentary offers based on the at least one accepted offer.

According to another embodiment, the criteria includes at least one of a group comprising a price of a complimentary offer; a location of the complimentary offer; a date of the complimentary offer; and a proposition to spend a predetermined amount in a gambling location associated with the complimentary offer. According to another embodiment, the act of receiving, further comprises receiving from the plurality of organizations, a plurality of predetermined complimentary offers. According to another embodiment, the method further comprises an act of determining, based on the accepted criteria and from a plurality of available predetermined complimentary offers, a complimentary offer provided to the player.

According to another embodiment, the method further comprises an act of monitoring an inventory of available predetermined complimentary offers, and providing complimentary offers from the monitored inventory. According to another embodiment, the complimentary offer is provided in real time after the accepted criteria is provided by the player. According to another embodiment, the complimentary offer is provided responsive to a receipt of the accepted criteria.

According to another embodiment, the method further comprises determining a rating of the player, and wherein the plurality of complimentary offers that are offered to the player are determined based on the rating of the player. According to another embodiment, the rating comprises a score that indicates a capacity of the player to spend money.

According to another aspect, a computer readable medium is provided comprising computer-executable instructions that when executed on a processor performs a method for receiving a complimentary offer in a distributed computer system, the method comprising acts of providing access to a player, to an interface that accepts criteria related to a complimentary offer desired by a player, receiving, by a plurality of organizations, a plurality of complimentary offers based on the accepted criteria; and permitting the player to select at least one of the plurality of complimentary offers. According to another embodiment, the method further comprises an act of receiving performance information relating to at least one player from a plurality of independent organizations.

According to another embodiment, the method further comprises an act of determining a rating of the player and determining at least one of the plurality of complimentary offers based on the determined rating of the player. According to another embodiment, the method further comprises an act of determining a rating of the player responsive to player performance information collected from a plurality of independent organizations. According to another embodiment, the player performance information collected from a plurality of independent organizations is collected via a plurality of frequent player accounts.

According to another embodiment, the method further comprises an act of storing at least one accepted offer by the player, and determining at least one of the complimentary offers based on the at least one accepted offer. According to another embodiment, the criteria includes at least one of a group comprising a price of a complimentary offer; a location of the complimentary offer; a date of the complimentary offer; and a proposition to spend a predetermined amount in a gambling location associated with the complimentary offer. According to another embodiment, the act of receiving, further comprises receiving from the plurality of organizations, a plurality of predetermined complimentary offers.

According to another embodiment, the method further comprises an act of determining, based on the accepted criteria and from a plurality of available predetermined complimentary offers, a complimentary offer provided to the player. According to another embodiment, the method further comprises an act of monitoring an inventory of available predetermined complimentary offers, and providing complimentary offers from the monitored inventory.

According to another embodiment, the complimentary offer is provided in real time after the accepted criteria is provided by the player. According to another embodiment, the complimentary offer is provided responsive to a receipt of the accepted criteria. According to another embodiment, the method further comprises determining a rating of the player, and wherein the plurality of complimentary offers that are offered to the player are determined based on the rating of the player. According to another embodiment, the rating comprises a score that indicates a capacity of the player to spend money.

According to another aspect, a distributed computer system is provided for receiving a complimentary offer, the system comprising an interface that is adapted to accept, from a player, criteria related to a complimentary offer desired by the player, a component adapted to receive, by a plurality of organizations, a plurality of complimentary offers based on the accepted criteria, and a component that is adapted to permit the player to select at least one of the plurality of complimentary offers. According to another embodiment, the system further comprises a component adapted to receive performance information at least one player from a plurality of independent organizations. According to another embodiment, the system further comprises a component adapted to determine a rating of the player and to determine at least one of the plurality of complimentary offers based on the determined rating of the player.

According to another aspect, a system is provided for managing data in a computer-based environment, the system comprising a customer-facing component that collects player information, a casino-facing component that collects casino information, and a rule-based component that determines access to the player information and the casino information. According to another embodiment, the system further comprises a component that determines an offer to at least one player, the offer being fulfilled by at least one casino, the offer being based at least in part on the collected player information. According to another embodiment, the offer is determined responsive to a component that receives criteria from the at least one player regarding a desired offer.

According to another embodiment, the offer is presented to the at least one player in response to the determination of the offer. According to another embodiment, the system further comprises a database that stored the player information and the casino information. According to another embodiment, the system further comprises an application programming interface (API) adapted to provide at least one data service to at least one information consumer. According to another embodiment, the at least one information consumer includes a casino, and wherein the data service provides the collected player information.

According to another embodiment, the at least one information consumer includes at least one player, and wherein the data service provides collected casino information. According to another embodiment, the collected casino information includes at least one promotional offer. According to another embodiment, the system further comprises a component that collects player information from one or more public and private data sources. According to another embodiment, the customer-facing component includes at least one website that collects the player information.

According to another embodiment, the website provides access to frequent player information of at least one player in exchange for providing access to player information relating to the at least one player. According to another embodiment, the system further comprises a component that is adapted to correlate frequent player information to an identity of at least one player. According to another embodiment, the system further comprises an advertising component adapted to determine an ad displayed to at least one player responsive to the collected player information. According to another embodiment, the system further comprises a component adapted to correlate frequent player information from multiple frequent player programs with the identity of the at least one player. According to another embodiment, the system further comprises an advertising network wherein advertising messages are targeted to players based on the player information collected by the system.

According to another aspect, a computer-implemented method is provided for managing data in a distributed computer system, the system comprising acts of collecting, by a customer-facing component, player information, collecting, by a casino-facing component, casino information, and determining, by a rule-based component, access to the player information and the casino information. According to another embodiment, the method further comprises acts of determining an offer to at least one player, the offer being fulfilled by at least one casino, the offer being based at least in part on the collected player information. According to another embodiment, the offer is determined responsive to a component that receives criteria from the at least one player regarding a desired offer.

According to another embodiment, the offer is presented to the at least one player in response to the determination of the offer. According to another embodiment, the method further comprises storing, in a database, the player information and the casino information. According to another embodiment, the method further comprises an act of providing an application programming interface (API) that presents at least one data service to at least one information consumer.

According to another embodiment, the at least one information consumer includes a casino, and wherein the data service provides the collected player information. According to another embodiment, the at least one information consumer includes at least one player, and wherein the data service provides collected casino information. According to another embodiment, the collected casino information includes at least one promotional offer.

According to another embodiment, the method further comprises an act of collecting player information from one or more public and private data sources. According to another embodiment, the customer-facing component includes at least one website that collects the player information. According to another embodiment, the website provides access to frequent player information of at least one player in exchange for providing access to player information relating to the at least one player. According to another embodiment, the method further comprises an act of correlating frequent player information to an identity of at least one player.

According to another embodiment, the method further comprises an act of determining, by an advertising component, an ad displayed to at least one player responsive to the collected player information. According to another embodiment, the method further comprises an act of correlating frequent player information from multiple frequent player programs with the identity of the at least one player. According to another embodiment, the method further comprises an act of targeting, by an advertising network, advertising messages to players based on the player information collected by the system.

According to another aspect, a computer readable medium is provided comprising computer-executable instructions that when executed on a processor performs a method for collecting player information in a distributed computer system, the method comprising acts of collecting, by a customer-facing component, player information, collecting, by a casino-facing component, casino information, and determining, by a rule-based component, access to the player information and the casino information. According to one embodiment, the method further comprises acts of determining an offer to at least one player, the offer being fulfilled by at least one casino, the offer being based at least in part on the collected player information.

According to another embodiment, the offer is determined responsive to a component that receives criteria from the at least one player regarding a desired offer. According to another embodiment, the offer is presented to the at least one player in response to the determination of the offer. According to another embodiment, the method further comprises storing, in a database, the player information and the casino information.

According to another aspect, a computer-implemented method is provided for evaluating a player, the method comprising acts of determining a model of a desired player based on a plurality of model parameters, obtaining a plurality of information relating to a plurality of potential unknown players, scoring the plurality of potential unknown players in relation to the model of the desired player, determining one or more desired players from the plurality of potential unknown players based on their respective scores, and performing an action with respect to the determined one or more desired players.

According to another embodiment, the act of obtaining further comprises an act of collecting frequent player account information from a plurality of independent organizations. According to another embodiment, the act of obtaining further comprises an act of collecting information relating to the plurality of potential unknown players from a plurality of public data sources. According to another embodiment, the method further comprises selecting, from a plurality of available advertisements, an advertisement for display to the determined one or more desired players, and wherein the act of performing an action comprises an act of displaying the selected advertisement to at least one of the one or more desired players.

According to another embodiment, the method further comprises selecting, from a plurality of available complimentary offers, a complimentary offer to be presented to the determined one or more desired players, and wherein the act of performing an action comprises an act of displaying the complimentary offer to at least one of the one or more desired players. According to another embodiment, the selected advertisement to be displayed to the player is determined according to at least one of predicted affinities, predispositions, and preferences of the player.

According to another aspect, a computer-implemented method is provided for evaluating a player, the method comprising acts of receiving frequent player account information for a player, identifying the player by the frequent player account information, collecting data from one or more independent organizations, and determining a worth of the player based on performance information associated with the frequent player account information and the collected data.

According to another embodiment, the method further comprises an act of determining an advertisement to be displayed to the player base on the performance information and the collected data.

According to another embodiment, the method further comprises an act of determining an advertisement to be displayed to the player in response to the determined worth of the player. According to another embodiment, the method further comprises an act of determining an advertisement to be displayed to the player according to at least one of predicted affinities, predispositions, and preferences of the player.

According to another aspect, a computer readable medium is provided comprising computer-executable instructions that when executed on a processor performs a method for evaluating a player in a distributed computer system, the method comprising acts of determining a model of a desired player based on a plurality of model parameters, obtaining a plurality of information relating to a plurality of potential unknown players, scoring the plurality of potential unknown players in relation to the model of the desired player, determining one or more desired players from the plurality of potential unknown players based on their respective scores, and performing an action with respect to the determined one or more desired players. According to another embodiment, the act of obtaining further comprises an act of collecting frequent player account information from a plurality of independent organizations.

According to another embodiment, the act of obtaining further comprises an act of collecting information relating to the plurality of potential unknown players from a plurality of public data sources. According to another embodiment, the method further comprises selecting, from a plurality of available advertisements, an advertisement for display to the determined one or more desired players, and wherein the act of performing an action comprises an act of displaying the selected advertisement to at least one of the one or more desired players.

According to another embodiment, the method further comprises selecting, from a plurality of available complimentary offers, a complimentary offer to be presented to the determined one or more desired players, and wherein the act of performing an action comprises an act of displaying the complimentary offer to at least one of the one or more desired players. According to another embodiment, the selected advertisement to be displayed to the player is determined according to at least one of predicted affinities, predispositions, and preferences of the player.

According to another aspect of the present invention, a computer readable medium is provided comprising computer-executable instructions that when executed on a processor performs a method for evaluating a player in a distributed computer system, the method comprising acts of receiving frequent player account information for a player, identifying the player by the frequent player account information, collecting data from one or more independent organizations, and determining a worth of the player based on performance information associated with the frequent player account information and the collected data.

According to another embodiment, the method further comprises an act of determining an advertisement to be displayed to the player base on the performance information and the collected data. According to another embodiment, the method further comprises an act of determining an advertisement to be displayed to the player in response to the determined worth of the player. According to another embodiment, the method further comprises an act of determining an advertisement to be displayed to the player according to at least one of predicted affinities, predispositions, and preferences of the player.

According to another aspect, a computer-implemented method for interacting with a player comprising acts of determining a qualification of a player; providing a game to be played by the player; monitoring play of the game by the player; and in response to the player playing the game and the act of monitoring, providing an award to the player. According to another embodiment, the method further comprises an act of sponsoring the award by a gambling organization.

According to another embodiment, the act of sponsoring relates to a location of the player. According to another embodiment, the method further comprises an act of determining a rating of the play of the player responsive to the act of monitoring. According to another embodiment, the method further comprises an act of determining at least one of a group comprising affinities, predispositions, and preferences of the player, the act of determining at least one of the group being responsive to the act of monitoring.

According to another embodiment, the game includes at least one of the group comprising a skill-based game; a game of chance; a game having a predetermined outcome; and a game having an outcome determined after entry into the game is made. According to another embodiment, the method further comprises an act of sponsoring, by a gambling organization, an entry of the player into the game. According to another embodiment, the method further comprises an act of sponsoring, by a gambling organization, a particular prize awarded in the game. According to another embodiment, the entry of the player in the game is typically paid for by the player.

According to another embodiment, the method further comprises an act of determining an award based on at least one of a group comprising an affinity, a predisposition, and a preference of the player, a location of the player, an a determined score of the player. According to another embodiment, the score of the player measures a capacity of the player to spend money.

According to another aspect, a computer readable medium is provided comprising computer-executable instructions that when executed on a processor performs a method for interacting with a player in a distributed computer system, the method comprising acts of determining a qualification of a player; providing a game to be played by the player; monitoring play of the game by the player; and in response to the player playing the game and the act of monitoring, providing an award to the player.

According to another embodiment, the method further comprises an act of sponsoring the award by a gambling organization. According to another embodiment, the act of sponsoring relates to a location of the player. According to another embodiment, the method further comprises an act of determining a rating of the play of the player responsive to the act of monitoring. According to another embodiment, the method further comprises an act of determining at least one of a group comprising affinities, predispositions, and preferences of the player, the act of determining at least one of the group being responsive to the act of monitoring.

According to another embodiment, the game includes at least one of the group comprising a skill-based game; a game of chance; a game having a predetermined outcome; and a game having an outcome determined after entry into the game is made. According to another embodiment, the method further comprises an act of sponsoring, by a gambling organization, an entry of the player into the game. According to another embodiment, the method further comprises an act of sponsoring, by a gambling organization, a particular prize awarded in the game.

According to another embodiment, the entry of the player in the game is typically paid for by the player. According to another embodiment, the method further comprises an act of determining an award based on at least one of a group comprising an affinity, a predisposition, and a preference of the player, a location of the player, an a determined score of the player. According to another embodiment, the score of the player measures a capacity of the player to spend money.

According to another aspect, a distributed computer system is provided that interacts with a player, the system comprising a component adapted to determine a qualification of a player; a component adapted to provide a game to be played by the player; a component adapted to monitor play of the game by the player; and a component, responsive to the player playing the game and the component adapted to monitor play, adapted to provide an award to the player. According to another embodiment, the system further comprises a component adapted to sponsor the award by a gambling organization.

According to another embodiment, the component adapted to sponsor the award is responsive to a location of the player. According to another embodiment, the system further comprises a component adapted to determine a rating of the play of the player responsive to the monitoring component. According to another embodiment, the system further comprises a component adapted to determine at least one of a group comprising affinities, predispositions, and preferences of the player, the component adapted to determine the at least one of the group being responsive to the monitoring component.

According to another aspect, in a distributed computer system, a method for processing player information, the method comprising acts of collecting, by a plurality of computer systems in the distributed computer system, a plurality of data elements relating to a player; processing the plurality of data elements relating to the player; determining at least one score responsive to the act of processing; and responsive to determining the at least one score, performing an action with respect to the player. According to another embodiment, the method further comprises an act of maintaining a predictive model of the player, and determining the at least one score based on the predictive model.

According to another embodiment, the at least one score is a measure of a player's capacity to spend money. According to another embodiment, the at least one score measures at least one of a group comprising a capacity of the player to gamble; a lifetime value of the player; a propensity of the player to gamble; a volatility tolerance of the player; a pace of play by the player; an affinity of the player; a predisposition of the player; and a preference of the player.

According to another embodiment, the act of collecting comprises collecting at least one of a group of information comprising online behavior of the player; offline behavior of the player; demographic data; psychographic data; social graph data; self-reported data; advertising response data; requests for action by the player; and response data relating to an action performed with respect to the player. According to another embodiment, the method further comprises an act of selectively providing access to the score to one or more third parties.

According to another embodiment, the method further comprises an act of providing a scoring service to interested third party information consumers. According to another embodiment, the method further comprises an act of accepting, from at least one third party, a third party score of the player and selectively providing the third party score to another third party. According to another embodiment, the method further comprises an act of collecting information relating to a frequent player account of the player.

According to another embodiment, the method further comprises an act of creating a model of the player in a memory of a distributed computer system. According to another embodiment, the method further comprises an act of maintaining the model of the player over time. According to another embodiment, the method further comprises an act of improving the model based on additional information collected regarding the player.

According to another embodiment, the player is previously unknown to the distributed computing system. According to another embodiment, the act of collecting is performed in real-time. According to another embodiment, the act of performing an action with respect to the player comprises providing a complimentary offer to the player.

According to another embodiment, the method further comprises an act of maintaining a record of complimentary offers made to the player. According to another embodiment, the method further comprises an act of monitoring the player over time by tracking the player score. According to another embodiment, the method further comprises providing, for an organization that provides the complimentary offers, an interface that permits the organization to manage administration of the complimentary offers.

According to another embodiment, the interface permits the organization to track complimentary offers made to the player. According to another embodiment, the interface provides at least one of a group of functions comprising determining overlap in time for incentives offered to the player; tracking redemption of incentives offered to the player; calculating an amount of layering in an incentive campaign; and determining a value in an amount of layering.

According to another embodiment, the method further comprises acts of determining at least one of a group comprising a score, an affinity, a predisposition, and a preference of the player responsive to the act of processing; and responsive to determining the at least one of the group comprising the score, the affinity, the predisposition, and the preference, performing an action with respect to the player.

According to another aspect, a computer readable medium is provided comprising computer-executable instructions that when executed on a processor performs a method for processing player information in a distributed computer system, the method comprising acts of collecting, by a plurality of computer systems in the distributed computer system, a plurality of data elements relating to a player; processing the plurality of data elements relating to the player; determining at least one score responsive to the act of processing; and responsive to determining the at least one score, performing an action with respect to the player.

According to another embodiment, the method further comprises an act of maintaining a predictive model of the player, and determining the at least one score based on the predictive model. According to another embodiment, the at least one score is a measure of a player's capacity to spend money. According to another embodiment, the at least one score measures at least one of a group comprising a capacity of the player to gamble; a lifetime value of the player; a propensity of the player to gamble; a volatility tolerance of the player; a pace of play by the player; an affinity of the player; a predisposition of the player; and a preference of the player.

According to another embodiment, the act of collecting comprises collecting at least one of a group of information comprising online behavior of the player; offline behavior of the player; demographic data; psychographic data; social graph data; self-reported data; advertising response data; requests for action by the player; and response data relating to an action performed with respect to the player. According to another embodiment, the method further comprises an act of selectively providing access to the score to one or more third parties.

According to another embodiment, the method further comprises an act of providing a scoring service to interested third party information consumers. According to another embodiment, the method further comprises an act of accepting, from at least one third party, a third party score of the player and selectively providing the third party score to another third party. According to another embodiment, the method further comprises an act of collecting information relating to a frequent player account of the player.

According to another embodiment, the method further comprises an act of creating a model of the player in a memory of a distributed computer system. According to another embodiment, the method further comprises an act of maintaining the model of the player over time. According to another embodiment, the method further comprises an act of improving the model based on additional information collected regarding the player.

According to another embodiment, the player is previously unknown to the distributed computing system. According to another embodiment, the act of collecting is performed in real-time. According to another embodiment, the act of performing an action with respect to the player comprises providing a complimentary offer to the player.

According to another embodiment, the method further comprises an act of maintaining a record of complimentary offers made to the player. According to another embodiment, the method further comprises an act of monitoring the player over time by tracking the player score. According to another embodiment, the method further comprises providing, for an organization that provides the complimentary offers, an interface that permits the organization to manage administration of the complimentary offers.

According to another embodiment, the interface permits the organization to track complimentary offers made to the player. According to another embodiment, the interface provides at least one of a group of functions comprising determining overlap in time for incentives offered to the player; tracking redemption of incentives offered to the player; calculating an amount of layering in an incentive campaign; and determining a value in an amount of layering.

According to another embodiment, the method further comprises acts of determining at least one of a group comprising a score, an affinity, a predisposition, and a preference of the player responsive to the act of processing; and responsive to determining the at least one of the group comprising the score, the affinity, the predisposition, and the preference, performing an action with respect to the player.

According to another aspect, in a distributed computer system, a method for processing player information, the method comprising acts of collecting, by a plurality of computer systems in the distributed computer system, a plurality of data elements relating to a plurality of players; responsive to the act of collecting, selectively administering a plurality of incentive programs to at least one player of the plurality of players using the distributed computer system; monitoring redemption of the plurality of incentive programs by the at least one player of the plurality of players; and automatically adjusting administration of additional programs through the distributed computer system responsive to the act of monitoring.

According to another embodiment, the method further comprises an act of monitoring, for the at least one player, performance of administered incentive programs to the at least one player. According to another embodiment, the method further comprises an act of determining a value of layering the plurality of incentive programs to the at least one player. According to another embodiment, the method further comprises an act of determining an effectiveness of layering the plurality of incentives programs to the at least one player.

According to another embodiment, the method further comprises an act of providing an interface that permits a user to monitor information relating to the plurality of incentives programs administered to the at least one player. According to another embodiment, the method further comprises an act of optimizing a value of incentives offered to the at least one player based on an estimated worth of the at least one player. According to another embodiment, the method further comprises an act of tracking a history of behavior of the at least one player with respect to incentives programs administered to the at least one player and modifying further incentives based on the tracked history of behavior.

According to another embodiment, the method further comprises an act of determining a value of the at least one player. According to another embodiment, the act of determining a value includes determining an average spend rate of the at least one player of the plurality of players. According to another embodiment, the method further comprises an act of maintaining behavior information relating to incentives administered to the at least one player in a profile associated with the at least one player.

According to another aspect, a computer readable medium is provided comprising computer-executable instructions that when executed on a processor performs a method for processing player information in a distributed computer system, the method comprising acts of collecting, by a plurality of computer systems in the distributed computer system, a plurality of data elements relating to a plurality of players; responsive to the act of collecting, selectively administering a plurality of incentive programs to at least one player of the plurality of players using the distributed computer system; monitoring redemption of the plurality of incentive programs by the at least one player of the plurality of players; and automatically adjusting administration of additional programs through the distributed computer system responsive to the act of monitoring.

According to another embodiment, the method further comprises an act of monitoring, for the at least one player, performance of administered incentive programs to the at least one player. According to another embodiment, the method further comprises an act of determining a value of layering the plurality of incentive programs to the at least one player. According to another embodiment, the method further comprises an act of determining an effectiveness of layering the plurality of incentives programs to the at least one player.

According to another embodiment, the method further comprises an act of providing an interface that permits a user to monitor information relating to the plurality of incentives programs administered to the at least one player. According to another embodiment, the method further comprises an act of optimizing a value of incentives offered to the at least one player based on an estimated worth of the at least one player. According to another embodiment, the method further comprises an act of tracking a history of behavior of the at least one player with respect to incentives programs administered to the at least one player and modifying further incentives based on the tracked history of behavior.

According to another embodiment, the method further comprises an act of determining a value of the at least one player. According to another embodiment, the act of determining a value includes determining an average spend rate of the at least one player of the plurality of players. According to another embodiment, the method further comprises an act of maintaining behavior information relating to incentives administered to the at least one player in a profile associated with the at least one player.

According to another aspect, a distributed computer system is provided for processing player information, the system comprising one or more components adapted to collect, by a plurality of computer systems in the distributed computer system, a plurality of data elements relating to a plurality of players; a component, responsive to the collection component, adapted to selectively administer a plurality of incentive programs to at least one player of the plurality of players; a component adapted to monitor redemption of the plurality of incentive programs by the at least one player of the plurality of players; and a component adapted to automatically adjust administration of additional programs through the distributed computer system responsive to the monitoring component.

According to another embodiment, the system further comprises a component adapted to monitor, for the at least one player, performance of administered incentive programs to the at least one player. According to another embodiment, the system further comprises a component adapted to determine a value of layering the plurality of incentive programs to the at least one player. According to another embodiment, the system further comprises a component adapted to determine an effectiveness of layering the plurality of incentives programs to the at least one player.

According to another embodiment, the system further comprises an interface that permits a user to monitor information relating to the plurality of incentives programs administered to the at least one player. According to another embodiment, the system further comprises a component adapted to optimize a value of incentives offered to the at least one player based on an estimated worth of the at least one player. According to another embodiment, the system further comprises a component adapted to track a history of behavior of the at least one player with respect to incentives programs administered to the at least one player and modify further incentives based on the tracked history of behavior.

According to another embodiment, the system further comprises a component adapted to determine a value of the at least one player. According to another embodiment, the system further comprises a component adapted to determine an average spend rate of the at least one player of the plurality of players. According to another embodiment, the system further comprises a component adapted to maintain behavior information relating to incentives administered to the at least one player in a profile associated with the at least one player.

According to another aspect, in a distributed computer system, a method is provided for collecting and processing player information, the method comprising acts of: collecting, by a plurality of computer systems in the distributed computer system, a plurality of data elements relating to a plurality of players; determining relevancy of each of the plurality of data items to a score of a player; determining a priority of data items based on their respective relevancy; and presenting a plurality of data collection opportunities to the player responsive to the determined priority of data items.

According to another embodiment, the plurality of data collection opportunities include at least one of the group comprising a quiz; a questionnaire; and a test. According to another embodiment, the method further comprises an act of correlating a relevancy of at least one of the plurality of data items to the score of the player. According to another embodiment, the score of the player represents a spend value of the player.

According to another embodiment, the data collection opportunities are presented via an ecosystem that interacts with the player through one or more computer-based interfaces. According to another embodiment, the method further comprises an act of identifying the player uniquely in the distributed computer system. According to another embodiment, the method further comprises an act of storing, associated with a profile of the player, one or more of the plurality of data elements relating to the player.

According to another embodiment, the method further comprises an act of presenting, to the player in an interface of a computer system, the plurality of data collection opportunities. According to another embodiment, the method further comprises an act of saving the plurality of data elements relating to a plurality of players in a reference database. According to another embodiment, the method further comprises an act of determining a series of data elements to collect from the player based on their relevancy to the score of the player.

According to another aspect, a computer readable medium is provided comprising computer-executable instructions that when executed on a processor performs a method for collecting and processing player information in a distributed computer system, the method comprising acts of collecting, by a plurality of computer systems in the distributed computer system, a plurality of data elements relating to a plurality of players; determining relevancy of each of the plurality of data items to a score of a player; determining a priority of data items based on their respective relevancy; and presenting a plurality of data collection opportunities to the player responsive to the determined priority of data items.

According to another embodiment, the plurality of data collection opportunities include at least one of the group comprising a quiz; a questionnaire; and a test. According to another embodiment, the method further comprises an act of correlating a relevancy of at least one of the plurality of data items to the score of the player. According to another embodiment, the score of the player represents a spend value of the player. According to another embodiment, the data collection opportunities are presented via an ecosystem that interacts with the player through one or more computer-based interfaces.

According to another embodiment, the method further comprises an act of identifying the player uniquely in the distributed computer system. According to another embodiment, the method further comprises an act of storing, associated with a profile of the player, one or more of the plurality of data elements relating to the player. According to another embodiment, the method further comprises an act of presenting, to the player in an interface of a computer system, the plurality of data collection opportunities.

According to another embodiment, the method further comprises an act of saving the plurality of data elements relating to a plurality of players in a reference database. According to another embodiment, the method further comprises an act of determining a series of data elements to collect from the player based on their relevancy to the score of the player.

According to another aspect, a system is provided for collecting and processing player information, the system comprising one or more components adapted to collect, by a plurality of computer systems in the distributed computer system, a plurality of data elements relating to a plurality of players; a component adapted to determine relevancy of each of the plurality of data items to a score of a player; a component adapted to determine a priority of data items based on their respective relevancy; and a component adapted to present a plurality of data collection opportunities to the player responsive to the determined priority of data items.

According to another embodiment, the plurality of data collection opportunities include at least one of the group comprising a quiz; a questionnaire; and a test. According to another embodiment, the system further comprises a component adapted to correlate a relevancy of at least one of the plurality of data items to the score of the player. According to another embodiment, the score of the player represents a spend value of the player.

According to another embodiment, the data collection opportunities are presented via an ecosystem that interacts with the player through one or more computer-based interfaces. According to another embodiment, the system further comprises a component adapted to identify the player uniquely in the distributed computer system. According to another embodiment, the system further comprises a component adapted to store, associated with a profile of the player, one or more of the plurality of data elements relating to the player.

According to another embodiment, the system further comprises a component adapted to present, to the player in an interface of a computer system, the plurality of data collection opportunities. According to another embodiment, the system further comprises a component adapted to save the plurality of data elements relating to a plurality of players in a reference database. According to another embodiment, the system further comprises a component adapted to determine a series of data elements to collect from the player based on their relevancy to the score of the player.

According to another aspect, in a distributed computer system including a social network, a method is provided for administering a social network, the method comprising acts of providing a component that is selectively associated with a member's social networking content; and based on one or more actions performed with respect to the component, providing at least one of a game and an award to the member. According to another embodiment, the method further comprises an act of permitting another member to perform an act with respect to the component, and responsive to the act, providing at least one of an entry to a game and an award to the member.

According to another embodiment, the award includes loyalty points awarded to a loyalty program account of the member. According to another embodiment, the component includes a widget that is placed by the member on a member page accessible through the social network. According to another embodiment, the game includes a sweepstakes.

According to another embodiment, the method further comprises an act of awarding the member one or more entries into the sweepstakes responsive to the one or more actions performed with respect to the component. According to another embodiment, the method further comprises an act of providing at least one of a game and an award to the member responsive to another member including the component on the another member's page accessible through the social network.

According to another embodiment, the method further comprises an act of providing at least one of a game and an award to the member responsive to a determination of a quality level of a social network of the member. According to another embodiment, the method further comprises an act of presenting an interface to the member that indicates information regarding the sweepstakes. According to another embodiment, the method further comprises an act of presenting an interface that permits an administrator of the game and the award to manage an administration of the game and the award.

According to another aspect, a computer readable medium is provided comprising computer-executable instructions that when executed on a processor performs a method for administering a social network in a distributed computer system, the method comprising acts of providing a component that is selectively associated with a member's social networking content; and based on one or more actions performed with respect to the component, providing at least one of a game and an award to the member. According to another embodiment, the method further comprises an act of permitting another member to perform an act with respect to the component, and responsive to the act, providing at least one of an entry to a game and an award to the member.

According to another embodiment, the award includes loyalty points awarded to a loyalty program account of the member. According to another embodiment, the component includes a widget that is placed by the member on a member page accessible through the social network. According to another embodiment, the game includes a sweepstakes.

According to another embodiment, the method further comprises an act of awarding the member one or more entries into the sweepstakes responsive to the one or more actions performed with respect to the component. According to another embodiment, the method further comprises an act of providing at least one of a game and an award to the member responsive to another member including the component on the another member's page accessible through the social network.

According to another embodiment, the method further comprises an act of providing at least one of a game and an award to the member responsive to a determination of a quality level of a social network of the member. According to another embodiment, the method further comprises an act of presenting an interface to the member that indicates information regarding the sweepstakes. According to another embodiment, the method further comprises an act of presenting an interface that permits an administrator of the game and the award to manage an administration of the game and the award.

According to another aspect, a computer system is provided for administering a social network, the system comprising a social network; a component that is selectively associated with a member's social networking content in the social network; and a component, responsive to one or more actions performed with respect to the component that is selectively associated with a member's social networking content in the social network, is adapted to provide at least one of a game and an award to the member. According to another embodiment, the system further comprises a component adapted to permit another member to perform an act with respect to the component selectively associated with the member's social networking content, and responsive to the act, providing at least one of an entry to a game and an award to the member.

According to another embodiment, the award includes loyalty points awarded to a loyalty program account of the member. According to another embodiment, the component selectively associated with the member's social networking content includes a widget that is placed by the member on a member page accessible through the social network. According to another embodiment, the game includes a sweepstakes.

According to another embodiment, the system further comprises a component adapted to award the member one or more entries into the sweepstakes responsive to the one or more actions performed with respect to the component selectively associated with the member's social networking content. According to another embodiment, the system further comprises a component adapted to provide at least one of a game and an award to the member responsive to another member including the component selectively associated with the member's social networking content on the another member's page accessible through the social network. According to another embodiment, the system further comprises a component adapted to provide at least one of a game and an award to the member responsive to a determination of a quality level of a social network of the member.

According to another embodiment, the system further comprises an interface that indicates information regarding the sweepstakes. According to another embodiment, the system further comprises an interface that permits an administrator of the game and the award to manage an administration of the game and the award.

According to another aspect, in a distributed computer system, a method is provided for collecting and processing player information, the method comprising acts of creating, in the distributed computer system, a profile of a player; collecting, by a plurality of computer systems in the distributed computer system, a plurality of data elements relating to the player; and storing the plurality of data elements in one or more storage entities associated with the distributed computer system. According to another embodiment, the method further comprises an act of collecting demographic information related to the player.

According to another embodiment, the method further comprises an act of collecting behavioral information related to the player. According to another embodiment, the method further comprises an act of collecting data regarding online activity of the player. According to another embodiment, the method further comprises an act of collecting data regarding offline activity of the player. According to another embodiment, the method further comprises an act of determining at least one of an affinity, a preference, and a predisposition of the player based on one or more of the plurality of data elements relating to the player.

According to another embodiment, the method further comprises an act of creating, in the distributed computer system, a profile of a business. According to another embodiment, the method further comprises acts of determining a geolocation of the player; determining at least one of an affinity, a preference, and a predisposition of the player based on one or more of the plurality of data elements relating to the player; and determining at least one matching profile of a business to the player, at least based in part on the geolocation of the player and the at least one determined affinity, preference, and predisposition of the player. According to another embodiment, the method further comprises an act of indicating, to the player, the at least one matching profile.

According to another embodiment, the method further comprises an act of indicating, to the business having the at least one matching profile an indication of a match. According to another embodiment, the method further comprises an act of displaying an advertisement to the player responsive to the determination of at least one matching profile. According to another embodiment, the method further comprises an act of displaying, on a display of a portable device located at the geolocation of the player, the at least one matching profile.

According to another embodiment, the method further comprises an act of accepting, from the player, an indication of at least one of an affinity, a preference, and a predisposition of the player. According to another embodiment, the method further comprises an act of determining an incentive offered to the player based on the at least one determined affinity, preference, and predisposition of the player. According to another embodiment, the method further comprises an act of determining an incentive offered to the player based on the at least one affinity, preference, and predisposition of the player.

According to another embodiment, the method further comprises an act of determining a score of the player. According to another embodiment, the score indicates a capacity of the player to spend money. According to another embodiment, the method further comprises an act of performing an action with respect to the player based on the at least one determined affinity, predisposition and preference of the player. According to another embodiment, the method further comprises an act of performing an action with respect to the player based on the at least one determined affinity, predisposition and preference of the player.

According to another embodiment, the score indicates the value of the player. According to another embodiment, the score indicates an affinity, predisposition or preference of the player. According to another embodiment, the method further comprises an act of performing an action with respect to the player based on the at least one determined affinity, predisposition and preference of the player.

According to another aspect, a computer readable medium is provided comprising computer-executable instructions that when executed on a processor performs a method for collecting and processing player information in a distributed computer system, the method comprising acts of creating, in the distributed computer system, a profile of a player; collecting, by a plurality of computer systems in the distributed computer system, a plurality of data elements relating to the player; and storing the plurality of data elements in one or more storage entities associated with the distributed computer system.

According to another embodiment, the method further comprises an act of collecting demographic information related to the player. According to another embodiment, the method further comprises an act of collecting behavioral information related to the player. According to another embodiment, the method further comprises an act of collecting data regarding online activity of the player.

According to another embodiment, the method further comprises an act of collecting data regarding offline activity of the player. According to another embodiment, the method further comprises an act of determining at least one of an affinity, a preference, and a predisposition of the player based on one or more of the plurality of data elements relating to the player. According to another embodiment, the method further comprises an act of creating, in the distributed computer system, a profile of a business.

According to another aspect, the method further comprises acts of determining a geolocation of the player; determining at least one of an affinity, a preference, and a predisposition of the player based on one or more of the plurality of data elements relating to the player; and determining at least one matching profile of a business to the player, at least based in part on the geolocation of the player and the at least one determined affinity, preference, and predisposition of the player. According to another embodiment, the method further comprises an act of indicating, to the player, the at least one matching profile. According to another embodiment, the method further comprises an act of indicating, to the business having the at least one matching profile an indication of a match.

According to another embodiment, the method further comprises an act of displaying an advertisement to the player responsive to the determination of at least one matching profile. According to another embodiment, the method further comprises an act of displaying, on a display of a portable device located at the geolocation of the player, the at least one matching profile.

According to another embodiment, the method further comprises an act of accepting, from the player, an indication of at least one of an affinity, a preference, and a predisposition of the player. According to another embodiment, the method further comprises an act of determining an incentive offered to the player based on the at least one determined affinity, preference, and predisposition of the player. According to another embodiment, the method further comprises an act of determining an incentive offered to the player based on the at least one affinity, preference, and predisposition of the player. According to another embodiment, the method further comprises an act of determining a score of the player.

According to another embodiment, the score indicates a capacity of the player to spend money. According to another embodiment, the method further comprises an act of performing an action with respect to the player based on the at least one determined affinity, predisposition and preference of the player. According to another embodiment, the method further comprises an act of performing an action with respect to the player based on the at least one determined affinity, predisposition and preference of the player.

According to another embodiment, the score indicates the value of the player. According to another embodiment, the score indicates an affinity, predisposition or preference of the player. According to another embodiment, the method further comprises an act of performing an action with respect to the player based on the at least one determined affinity, predisposition and preference of the player.

According to another aspect, a system is provided for collecting and processing player information, the system comprising a component adapted to create, in the distributed computer system, a profile of a player; one or more components adapted to collect, by a plurality of computer systems in the distributed computer system, a plurality of data elements relating to the player; and a component adapted to store the plurality of data elements in one or more storage entities associated with the distributed computer system.

According to another embodiment, the system further comprises a component adapted to collect demographic information related to the player. According to another embodiment, the system further comprises a component adapted to collect behavioral information related to the player. According to another embodiment, the system further comprises a component adapted to collect data regarding online activity of the player. According to another embodiment, the system further comprises a component adapted to collect data regarding offline activity of the player. According to another embodiment, the system further comprises a component adapted to determine at least one of an affinity, a preference, and a predisposition of the player based on one or more of the plurality of data elements relating to the player.

Further features and advantages as well as the structure and operation of various embodiments are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF SUMMARY OF THE DRAWINGS

The accompanying drawings are not intended to be drawn to scale. In the drawings, each identical or nearly identical component that is shown in various figures may be represented by a like numeral. For the purpose of clarity, not every component may be labeled in every drawing. In the drawings:

FIG. 3 shows another process for collecting player information according to one embodiment of the present invention;

DETAILED DESCRIPTION

According to one aspect, a distributed system is provided for collecting, storing and analyzing player information. According to one aspect, a system is provided that collects player information from multiple sources such as gaming establishments, online sources, databases, web browsers, and other sources to create a model for a player. Such a system is capable of creating a view of that player, and the model may be compared to the models of other players to determine the potential worth of that player.

According to another embodiment, one or more ratings (or "scores") for a player may be created that is/are more indicative of player value than those created based on information collected from a single source. For instance, player information such as ratings, demographics, play history and other player information may be collected and stored by a player tracking or other type of system. The information may be stored in any type of storage (e.g., in a file system, in a database, in memory, etc.). Such a system may establish a holistic rating for player that is more clearly indicative of player worth, as a result of collecting information from multiple gaming establishments, among other sources. In one embodiment, such a score may be determined by a scoring engine that evaluates parameters of the model.

The following example systems may be used to implement various aspects of the present invention. It should be appreciated that other system configurations could be used, and such aspects are not limited thereto, unless specifically recited in the claims.

Figure 1:
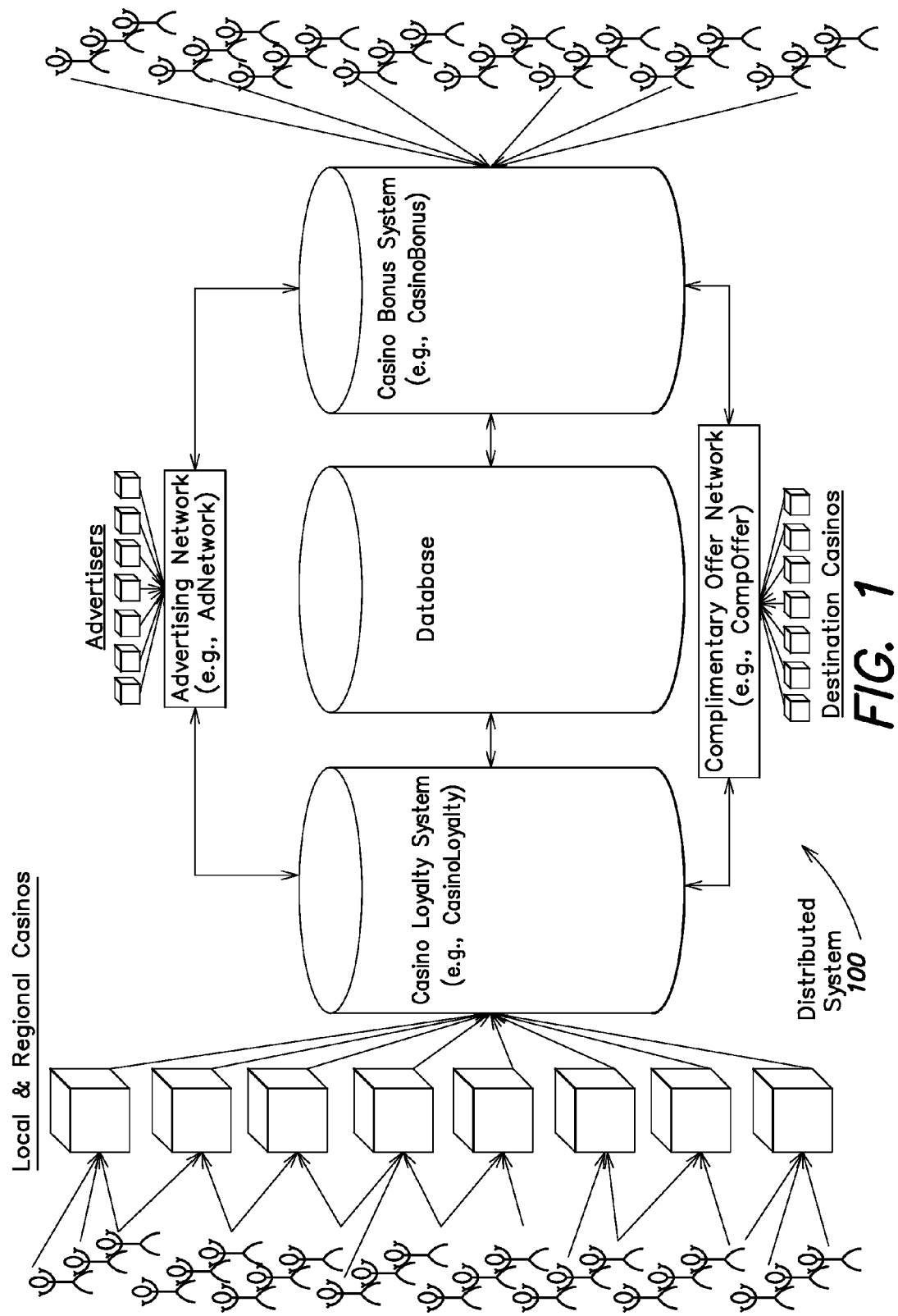
FIG. 1 is a block diagram of a distributed computer system according to one embodiment of the present invention.

FIG. 1 shows a distributed computer system 100 capable of collecting, storing, and analyzing player information in accordance with various embodiments of the present invention. As shown, a collection of systems interact in a distributed computer system referred to herein as an "ecosystem." The collection of systems may include, for example, a casino loyalty system (e.g., a "CasinoLoyalty" system as discussed more fully below), an advertising network (e.g., an "AdNetwork" system), a consumer website for attracting potential casino patrons (e.g., a "CasinoBonus" system), and a network that enables casino patrons to solicit complimentary offers (e.g., a "CompOffer" system). Such systems are shown by way of example in FIG. 1, although it should be appreciated that systems having other structures may be used to implement various aspects as described herein.

As distinct and separate systems, these systems provide significant value to their independent users and organizations (e.g., a casino operator). However, when integrated into an overall environment (e.g., an ecosystem) that provides the interfaces, rules, security, communications, data integration and analysis, additional features and benefits are realized. Some embodiments of the present invention address the mechanisms, rules and interactions of a set of interdependent systems related to casino loyalty programs and customers arranged in an ecosystem.

System Roles within an Ecosystem

One primary role of a consumer website for attracting potential casino patrons (e.g., as provided by a CasinoBonus system as shown in FIG. 1) is to attract patrons into an overall ecosystem (e.g., EcoSystem as shown in FIG. 1). According to one embodiment, information may be collected regarding existing or unknown players, for the purpose of evaluating those players. In one embodiment, the evaluation may include determining a predictive score for the player that measures the player's capacity to spend money in the system. Determination of that score may involve, among other things, determining information from the player from one or more public data sources, information offered by the player such as their affinities, preferences, and predispositions, behavioral data, location information, among others. To this end, the ecosystem may maintain a model of the player (or unknown player) and determine ratings or scores for the player based on a number of criteria presented to a scoring engine.

According to one embodiment, responsive to model information, the consumer website may determine a score or behavioral profile of the player (or unknown player), and responsive to the determination, the ecosystem may perform an action in relation to the player to cause them to interact with the ecosystem, either in an online or real-world form.

For instance, a particular person who has been targeted by the ecosystem may be shown, for example, advertising on an ad network (e.g., AdNetwork system as shown in FIG. 1), provided complimentary offers (e.g., via the CompOffer system shown in FIG. 1), provided an opportunity to participate in a specific casino's program (e.g., a CasinoLoyalty program as shown in FIG. 1), and/or provided an opportunity to interact with various ecosystem systems through which the ecosystem can collect additional player profile and player model information via online games, quizzes and polls, and/or other interactions with the player.

While a casino loyalty system (e.g., a CasinoLoyalty system) may be primarily a destination for casino patrons within the Ecosystem, the casino loyalty system may also provide valuable access to casinos and players for the other systems. Similar to how a consumer website (e.g., as presented by a casino bonus system) may attract patrons into the ecosystem and provide a value proposition whereby the patron provides personal information, a casino loyalty system may perform the same functions with casino operators. By providing a strong value proposition to casino operators, a casino loyalty system may attract casinos into the ecosystem and may solicit them to provide comprehensive information on their casino and player card members.

A purpose of both an advertising system (e.g., a gaming advertisement network as provided by an AdNetwork system) and a complimentary offer system (e.g., a casino-player auction system as provided by a complimentary offer system) within the ecosystem includes performing revenue-generating destinations/functions. By leveraging the patrons, casinos and detailed information provided by the other ecosystem components, these systems may be able to provide more compelling and targeted offers to patrons. The ecosystem further permits the parties (e.g., patrons/players, casinos, advertisers, etc.) to communicate, interact and generally share and improve relationships with each other within the ecosystem through communication within the ecosystem and for the collective system to determine what relationships will be defined between the parties.

Mechanisms for Integrating Systems

For the operation of the ecosystem according to one embodiment, there may be two primary mechanisms by which the independent systems are able to communicate and share information—a database (e.g., centralized database, distributed database, etc.) and/or shared application programming interfaces (APIs). Such methods may be used to exchange information between information providers and communication consumers. Various parties may function within the ecosystem as a consumer or provider of information at various points, and may derive benefit through the sharing of information.

Shared APIs and tools may allow the systems to communicate and according to one embodiment, may execute the following functions:

Exchange patron information among system components, entities, roles, etc.
Exchange casino information
Exchange third-party promotional information
Enter ad campaign information (content and pricing/bid data)
Report ad campaign results
Report ad inventory levels
Enter promotional offer information and assignment rules
Determine promotional offers in real time
Assign promotional offers to patrons
Facilitate game sponsorship, awards and results
Transfer/purchase/auction of points
Merging of patron/player information
Determine scores for players
Create a model for a player
Identify and deliver desired players According to one embodiment, the database structure may receive and store information from the various systems in a compartmentalized fashion so that proprietary data can only be retrieved and utilized per data security and use rules. At the same time, data from all sources may be merged to develop a holistic view of the patrons, casino operators, ad campaigns and operation of the overall system. The data may be then summarized or sanitized into a form that maintains data security while still providing valuable information to the various systems. By sharing this data between the systems, a casino loyalty system may be able to provide more valuable patrons to casinos; a complimentary offer system may be able to provide a more comprehensive patron profile to third parties; an advertising network system can target ads more directly to patrons, casinos, etc.; and a casino bonus system can improve customer experiences.

Data Security and Use Rules

According to one embodiment, it is appreciated that it may be important for various implementations to provide security of player data and other data (e.g., casino-owned proprietary data). In one example, of importance to an ecosystem are the concepts of data security and rules for use of the data collected by the four systems. Casino-owned, proprietary information regarding patrons, promotions, and player club metrics is integral to the operation of a casino loyalty system. On the other hand, one implementation of a casino bonus system may solicit users to provide their casino loyalty club information along with authorization to retrieve their individual data from the casino system. This data is clearly owned by the patron and, according to one embodiment, the casino bonus system may be provided access to the patron-owned data per a data use policy. In addition, the patron's use of all four systems (e.g., games played in a casino loyalty system, content searched in a casino bonus system, advertisements viewed in an advertising network system, offers solicited/auctioned in a complimentary offer system) adds to the information gathered on the patron. That is, the patron/player behavior and interaction within the ecosystem may be used as information that can affect future interactions.

To maintain the integrity of the ecosystem such that casino operators, patrons, advertisers and other third parties are willing to provide the required data, data security and use rules may be established. According to one embodiment, conventional data security mechanisms within communication systems and databases may be used. One implementation of an ecosystem may use a combination of restricted access, encryption, data sanitization and summarization to maintain data security.

However, in addition to the fundamental data security mechanisms, one example ecosystem may implement rules for use of the data. These rules may include, for example, the level of data shared between the systems at the discretion of the casino operators, patrons or third parties. As an example, a casino participating in the complimentary offer system might allow patron information to be shared with non-competitors in different markets. Conversely, a casino operator that operates in multiple gaming jurisdictions might only allow sharing patron information with sister properties. As another example, patrons of the casino bonus system may provide selective access to their information for receiving offers from the complimentary offer system.

Similarly, the ecosystem may establish terms of use and regulations that enhance and protect the integrity of the entire system. Terms of use and regulations may allow, for example:

advertisers and third parties equal access to patrons
casinos to share and access information on equal terms
patrons to provide and receive verified information
unauthorized and/or harmful use to be identified and eliminated In this way, access to information collected within the ecosystem may be regulated.

Collecting Information in the Ecosystem

Figure 2:
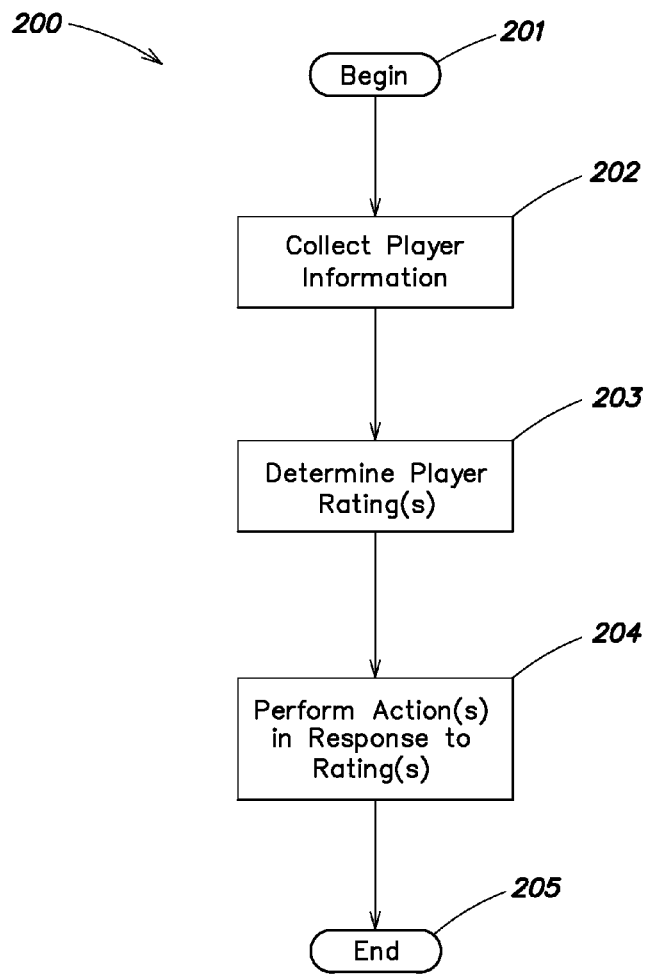
FIG. 2 shows a process for collecting player information according to one embodiment of the present invention.

FIG. 2 shows one embodiment of a process 200 for collecting player information according to one embodiment of the present invention. For instance, process 200 may be performed by one or more components of distributed computer system 100. At block 201, process 200 begins. At block 202, the distributed computer system collects player information. According to one embodiment, such information may include information provided by multiple gaming establishments, that, when analyzed, provide a more holistic view of a player. Further, the information may be collected from a number of components and sources within an ecosystem, such as from online sources, one or more casinos, one or more databases (e.g., demographic data, credit score data, etc.), web interfaces (e.g., from a person/player), social network interactions, online behavior at ecosystem related or external websites, or other source.

Information relating to the player may be used to determine one or more player ratings that measure a player's propensity to do something (e.g., at block 203). For instance, one type of rating may be indicative of the level of gambler a player might be, given the data collected for that player. In another example, the rating might indicate that the player is more inclined to play certain games at a particular level (e.g., information regarding the player indicates that he/she is likely to play blackjack at a estimated ADT). In yet another example, a player may have a certain tolerance for risk (e.g., to only gamble/lose certain amounts).

At block 204, one or more actions may be performed in response to the determination of player rating(s). For instance, that player may be offered a complimentary offer, may be presented a particular advertisement, may be sent a direct mail offer, or other action. In this way, the most appropriate action may be performed with regard to the player.

Figure 3A:
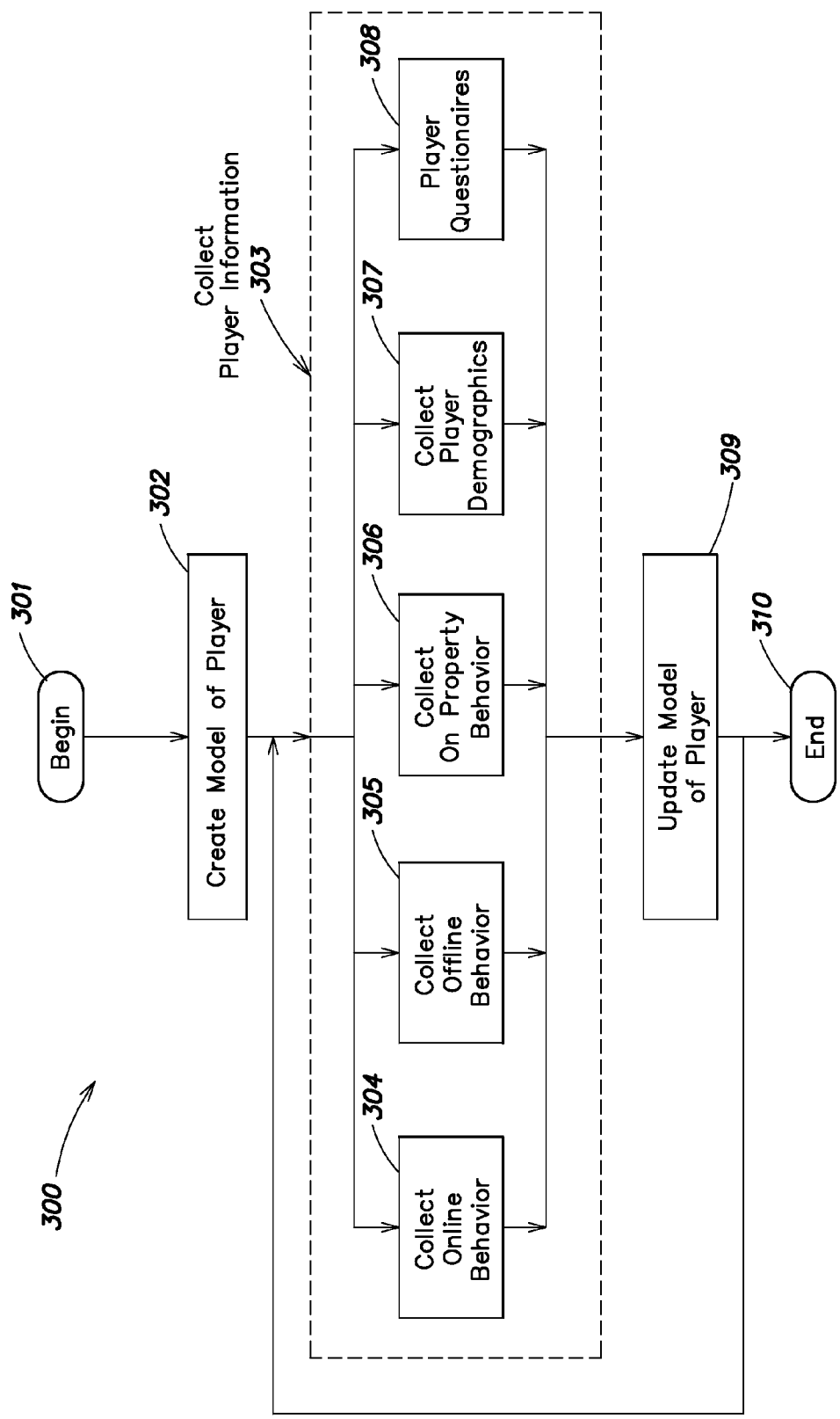
FIG. 3A shows a process for collecting player information according to one embodiment of the invention.

FIG. 3A shows a process 300 for collecting player information according to one embodiment. As discussed, a number of different sources may be used to collect player information. At block 301, process 300 begins. At block 302, a model is created that represents the player. Such a model may include, for instance, a construct that uniquely identifies a particular person or player. The construct may be indexed by a unique identifier such as, for example, Social Security number, frequent player identifier, or other indexing method that permits unique identification of a player. In some cases, depending upon the knowledge (or lack thereof) of a player's identification, that player may be tracked under a temporary identifier until the actual identity of the player is known. The player's identity may also be inferred based on other collected information (e.g., credit card, other supplied personal data).

At block 303, information about the player may be collected from various sources. For instance, at block 304, a player's online behavior may be observed and collected. In particular, information identifying what sites the player visits, their interests (e.g., from an online identity), their associations with other people/institutions (e.g., information from a referral network), may be tracked by the distributed computer system. At block 305, a person's offline behavior may also be tracked. For instance, a person's location (e.g., as determined through GPS/phone location) may be collected and used as player information by the distributed computer system. In another example, a player's behavior at a particular gambling property may be collected (e.g., at block 306), including what games a particular player plays, his/her betting history, win percentage, ADT in a particular gambling location, etc. As discussed, one or more additional sources of information about the player may be used, including demographics information (e.g., collected at block 307), player questionnaires (e.g., as collected at block 308), or other information.

At block 309, the model of the player is updated with the collected information. Acts of collecting information about the player (e.g., at block 303) and updating the model (e.g., at block 309) may continue indefinitely, as the overall view of the player is improved. At block 310, process 300 ends.

Figure 3B:
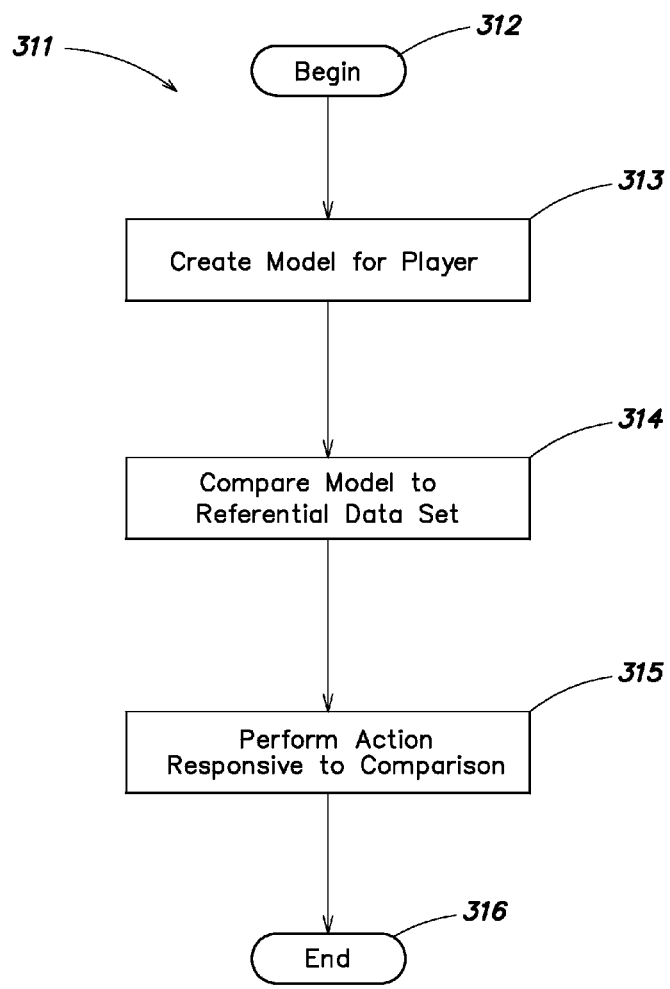
FIG. 3B shows a process for using a player model according to one embodiment of the invention.

FIG. 3B shows a process 311 for using a player model according to one embodiment of the invention. At block 312, process 311 begins. At block 313, a model is created for a player, such as the model created at block 302 in FIG. 3A. After a certain amount of data is collected and associated with the model, that model is compared with a referential data set which includes reference data from other players at block 314. In one embodiment, it is appreciated that some data elements that are associated with a player are more highly indicative of certain behaviors, and thus if such data elements are similar or are the same as other players that exhibit certain desired behaviors (e.g., the player has a propensity to gamble with a particular level of ADT), then that player may be determined to behave in a similar way. Responsive to this comparison, the distributed system may perform an action, such as making a complimentary offer to the player (e.g., an offer that the player is likely to accept given the comparison to other players), direct an advertisement to the player, or perform other actions.

Figure 3C:
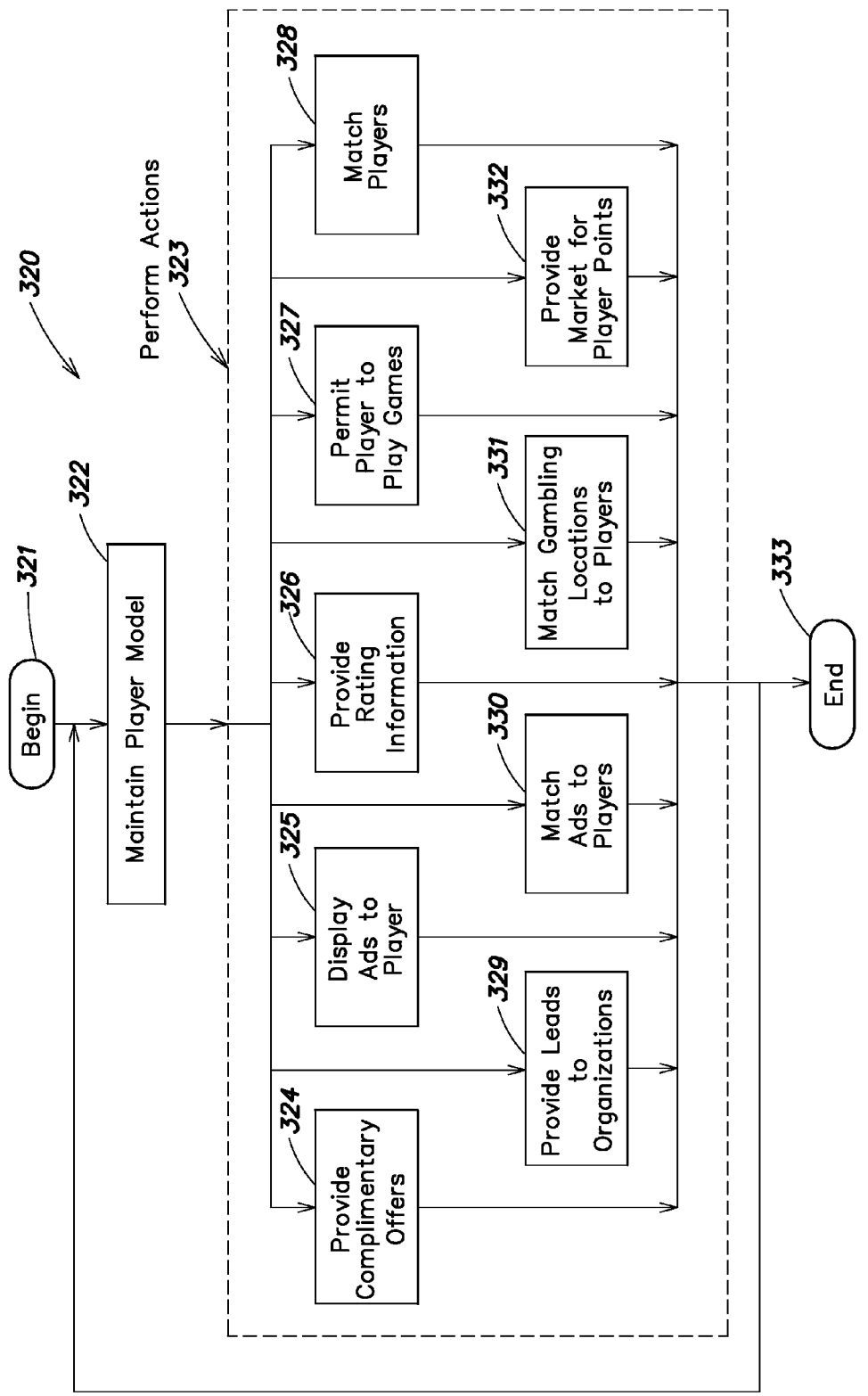
FIG. 3C shows a process showing example actions that may be performed by a distributed computer system according to one embodiment of the invention.

FIG. 3C shows a process 320 showing example actions that may be performed by a distributed computer system according to one embodiment of the present invention. At block 321, process 320 begins. At block 322, the system maintains a model of the player over time. As discussed above with reference to FIG. 3B, the model may be improved from various sources and over time. At block 323, one or more components of the distributed system may perform one or more actions. For instance, at block 324, the distributed system may provide one or more complimentary offers to players. The determination of what offer(s) a player gets may be determined, at least in part, based on the information maintained in the model and/or a comparison of information in the model to information stored in a reference database.

In a similar way, the distributed system may display one or more ads to a player (e.g., at block 325) responsive to information stored in the model and/or a comparison to other players' information in a reference database. At block 326, information may be provided as a service to entities such as gambling organizations, retailers, or other parties' interested in reaching the player. The distributed system may also permit the player to play one or more games, such as over the Internet and/or in a gambling location. Behavioral data observed while the player plays such games may be tracked and the player model may be updated.

Further, the distributed computer system may also permit a matching of players (e.g., at block 328), by organizations, or by the players themselves. For instance, players having commonality between player data may be permitted to contact each other using the ecosystem. At block 329, the distributed computer system provides leads to one or more organizations. For instance, the computer system may target one or more players as being receptive to a service or product. To this end, the distributed computer system may include one or more interfaces that permit third parties to search and generate such leads. In another embodiment, the distributed computer system provides a matching service by matching ads to players (e.g., at block 330). As discussed above, the ecosystem may be coupled to one or more ad networks that provide ads to be displayed within Internet-based applications. One embodiment relates to using the ecosystem as a conduit for ads that can be more efficiently targeted to players based on their models and reference data.

At block 331, the distributed system may serve as a matching service that matches gambling locations to players, based on their preferences and other information maintained about the player, and information that relates to the gambling location. In this way, players may be more easily referred to gambling organizations. Further, such matching information may be provided to such organizations as leads. At block 332, the ecosystem may be capable of trading player points among players. This capability may result in a higher use of player points, as well as increased revenues overall.

According to one embodiment, the system may be capable of tracking the outcome of the various actions and rating their success. For example, if an offer was provided via block 324, the system can track whether or not the player redeemed that offer, and how quickly they did so. In another example, if an ad was displayed via block 325, the system can track whether or not the ad was selected (e.g., clicked on with a pointing device) by the player. As shown in FIG. 3C, this information can then be used as inputs to update the player model and thereby refine the model to be more accurate.

Acts of performing actions based on player information (e.g., at block 323) and maintaining player models may continue indefinitely. At block 333, process 320 ends.

Player Models

According to one aspect of the present invention, the ecosystem is capable of building a model of a player. In one implementation, this player profile includes demographic, psychographic data, as well as contact information for the player. Data that is collected on the player may be selected in order to build a robust profile of a player. Goals of building such a profile include being able to measure not only the player's potential, but other very important factors related to the player such as risk tolerance, sensitivities to volatility and game/experience preference.

Scoring traditionally looks at the monetary value of a player only. Existing systems typically score a player based on their actual play. That is, a player only "achieves" their score through their play at the gaming establishment. According to one embodiment, it is appreciated that existing scoring methods do not have the capability of predicting the capacity of a player to achieve a score in the future. Players that are unknown to a gaming establishment are highly desirable, but as discussed above, many of the conventional methods for locating and attracting such players are insufficient (e.g., direct marketing, mass mailings, and other conventional forms of advertising). According to one embodiment, it may be beneficial to provide a complimentary offer that is guaranteed to win to a previously unknown player, thus providing an initial experience that is positive for the unknown player to encourage further visits.

According to one aspect of the present invention as more fully discussed below, a more predictive scoring method is provided that predicts the capacity of a player before that player has ever entered the gaming establishment (e.g., a casino). According to one embodiment, one goal of predictive scoring of a player is to assess the player's ideal, potential maximum value. In other words, what is their capacity to pay? How much are they able to and likely to spend gaming and consequently how much are they worth to the casino? This information is important information in determining how a player should be valued.

However, it is appreciated that not only is the potential spend value of the player important, but also important is the player's preferences and behavioral predispositions. In particular, it is appreciated that a profile that tracks a player's preferences and behavioral predispositions would be useful to determine how that player should be engaged (e.g., with offers, advertising, game types, play type, etc.). In one embodiment, a gaming profile is created and tracks player preferences and behavioral predispositions. This gaming profile may be stored and associated with the model of the player. These preferences and behavioral predispositions may be expressed directly by the patron or inferred by the system by looking at a number of inputs. Some example key indicators to be assessed and predicted may include:

Volatility Preference. For example, is the player more likely to enjoy many small, frequent wins, or does the player prefer less frequent but more significant wins?

Propensity to Risk. Does the player prefer fate or free will? In other words, games that are pure luck with minimal interaction (e.g., classic slot machine), or games where the player feels that he/she has some control over the outcome (e.g., table games).

Pace of Play. Does the player want game play to move fast, or does the player prefer to stretch the time?

These and other factors can be used to create a profile of the player that can be used to push the player toward specific gaming experiences that will maximize their enjoyment. For example, will the player enjoy blackjack vs. slots? Should the slot machine play be customized with options that add more free will vs. fate? Other preferences of the player can be accepted from the player (e.g., in an Internet-based interface), determined heuristically from choices the player makes within the ecosystem, or inferred from other player data (e.g., a person that smokes and makes over $150K is 60% likely to play roulette). Predictive scoring and/or profile information may be associated and stored in the model of the player. Further, information associated with the model may be used to determine such predictive scores and/or determine player preferences. According to another embodiment, a customized gaming experience may be determined by the system, which determines an experience produced for an individual or group based on a specific set of heuristics. In another embodiment, a personalized gaming experience may be determined, which determines an experience produced strictly for an individual based a specific set of inputs and heuristics relating to that individual.

Using this profile information assists the casino or other gaming establishment to realize the player's maximum capacity. According to one aspect of the present invention, both a potential score of the player and their profile are tracked within an ecosystem. For example, a player may have a very high score and a corresponding high capacity to play. However, if the player is predisposed to enjoy blackjack, but the casino sends them slot play incentives, it is likely that the player may never visit the casino to use the incentive. And, if the player does use the incentive, the player may likely have a non-optimal or even negative experience. In either case, the casino will realize only a fraction of the potential value that is indicated by the player's score.

In summary, the score indicates to the gaming establishment the player's capacity to pay and the profile indicates how to maximize the player's gaming experience. According to one embodiment of a system that provides incentives, the score is used to set the quality and value of the incentive, while the profile is used to select the type of incentive. For example, a player with a low score and profile that indicates they are a slot player might get $10 in free slot play. A player with a high score and profile that indicates they prefer blackjack might get a free hotel room and $50 in NCC. In both cases, casino is more likely to realize the player's maximum value.

Once the profile is built, the profile can then be used by one or more systems in the ecosystem. As discussed, the profile may be used by a gaming establishment to select a type of incentive offered to the player (e.g., from a group of possible incentives, one of which most closely matches the profile of the player). Although profiles may be used in the application of incentive programs, it should be appreciated that profiles may be used in other contexts where goods and/or services are provided to the player. In one example, the player's profile may be tied to an online directory of establishments that may be interested in providing goods and services to the player. For instance, when a player logs into the online directory, the ecosystem may associate their profile with profiles built for business and establishments in the directory. By extracting a geo-location, either in real time via a GPS, cell phone triangulation or other location-based technology, or through user inputted data, such as city, state, zip, etc., the ecosystem may associate the player's profile with a profile created for the businesses and establishments in the directory.

Once preference matches are made between the player's profile and the business and establishment profile, those matches can be displayed in a variety of ways through a variety of applications, devices and services (web applications, cell phone applications, vehicle mounted GPS device and direction applications, etc.). For example, a map representing Las Vegas can be rendered on a cell phone (e.g., an iPhone) and displayed to the player/user. Each preference match can then be plotted on the map, along with the user's current geographical location, or specified location.

The ability to profile a person and to match that profile to businesses is useful, because directories for cities like Las Vegas can be massive and finding establishments and businesses that directly match the preferences of a player can be a tedious process for a visitor that has limited time in the city. This technology gives a profiled player the ability to find establishments that suit their preferences, saving them time and money in locating such establishments. This type of matching is also useful when a person travels to a new area (e.g., one that the person has never visited), yet it is known what preferences that person already has in previously-visited geolocations. Those preferences, stored with their profile, may be matched with those of other businesses in the newly-visited area, and those matches displayed to the person.

Profiles may be used for other purposes, such as the display of ads to the user, offering targeted offers to particular players having certain preferences, matching games to players, or otherwise making connections between players, advertisers, gambling organizations or other entities.

A model may be used to store other data, such as information that ties a player/person to one more many player loyalty accounts. This account and the associated data can then be directly communicated to a CMS or Player system on property, either via an open protocol such as S2S (system to system), a closed proprietary protocol, or other methods. For instance, the model may be programmed to store the following data related to the player:

Play limited (make sure I do not spend more than $1000 on a slot machine per visit)
Do not contact (ad me to the do not contact or problem gambling list)
Smoking/Non-smoking preference
Game preferences
Please only contact me by email, no direct mail
Send me offers on rooms and restaurants
Notify me when you put new table games on the floor
Favorite Drink: Ketel One Vodka Martini, "Straight Up", Three Olives
I prefer offers from your Vegas properties
Married, I prefer offers that include my spouse The model may also have an associated login account having standard account data that can be changed or modified (e.g., by the player):

Username, handle, nickname
Email address
Contact information
Marketing opt-in, opt-out state While integrated into the player and CMS systems on property, this account can also be tied into other systems, including, but not limited to the following types of systems:

Email Marketing Management Systems
National Problem Gambling Hotline/Database/System
Promotional Marketing Systems
Hotel Reservation Systems
Lead Generation Optimization Systems
Direct Mail and ON-Demand Printing Systems
Internet advertising systems
Analytics systems Such systems may also have data that is used to update or augment the model of the player. Such information may be stored along with or separate from the model information (e.g., just a reference to external information may be stored).

Example Implementation Using Questionnaires

Figure 4:
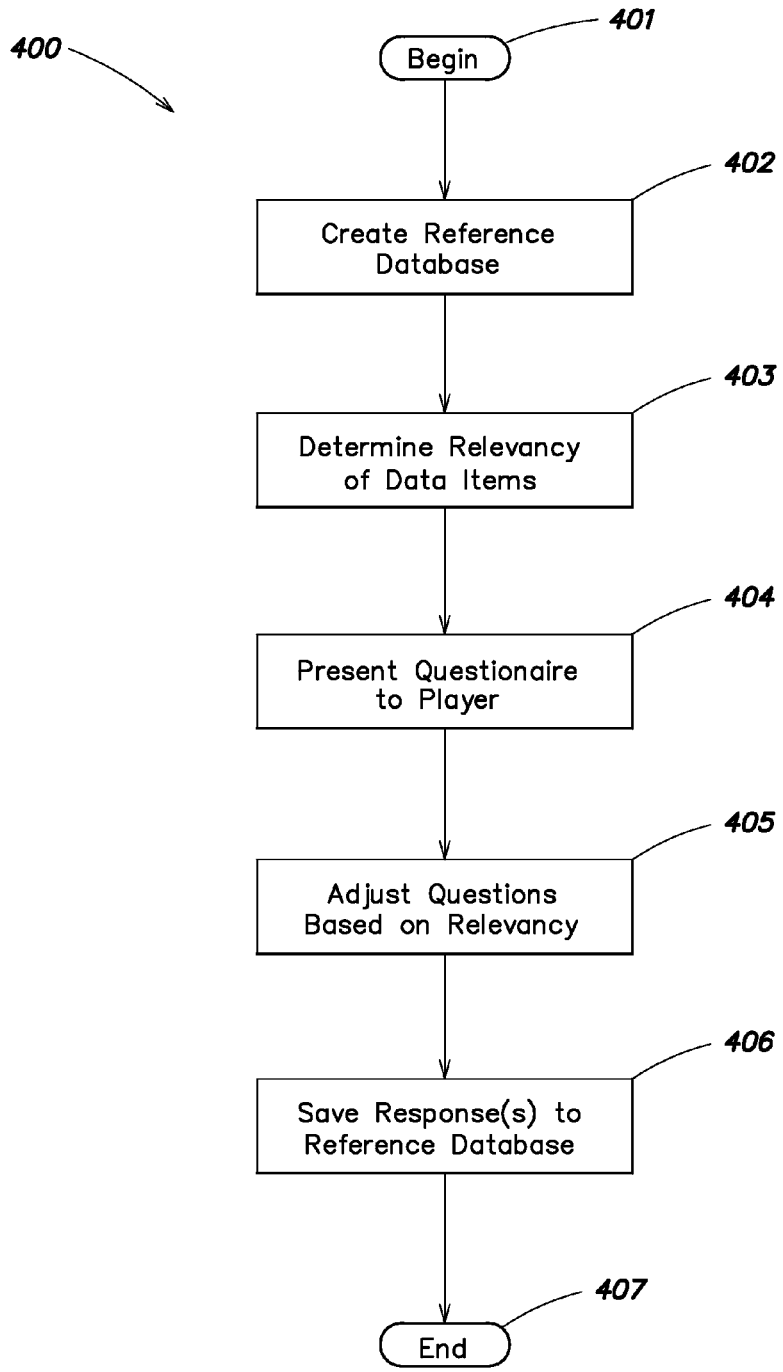
FIG. 4 shows a process for maintaining a model of a player according to one embodiment of the present invention.

FIG. 4 shows one example process 400 for conducting a questionnaire according to one embodiment of the present invention. For example, as discussed above with reference to FIG. 3A, one method for collecting player information may involve conducting questionnaires. Such questionnaires may involve posing one or more questions to the player through, for example, an Internet web page. It is appreciated that the quality of data collected from players could be improved if the players are not aware that they are being profiled or otherwise being observed. Such information may be retrieved and store with the model of the player maintained by the ecosystem.

The use of web-forms in the form of tests, quizzes and questionnaires has become commonplace as a web-based lead generation and qualification tool. Common application of these types of web-based forms can be easily experienced by interacting with modern online job interviews, auto insurance applications, online education applications, or "fun quizzes", gaming sites, and many other lead-generation and marketing networks.

It is appreciated that web-forms in the form of quizzes and questionnaires have a much more positive consumer perception than straight registration forms. They are perceived as games or "fun time wasters", which is very different than a standard registration form, which is often perceived as "invasive", "not trustworthy" or "spammy [sic]". Thus, tests, quizzes and questionnaires, are becoming much more successful at getting potential leads to volunteer a wide array of very personal information. This information can be very useful in determining the value of the potential lead. However, this method of gathering metrics and information on a potential lead has a major flaw; people do not always volunteer the truth.

To help alleviate this issue, a system (e.g., distributed system 100) may be capable of tying tests, quizzes and questionnaires to real world interaction and operation of a business (casino or lottery). In the context of this integration, the data collected with these tests, quizzes and questionnaires becomes far more predictive and the tests, quizzes and questionnaires can evolve to become far more efficient at collecting the appropriate data.

As shown in FIG. 4, questionnaires are generated and displayed to players and used to collect relevant player information. At block 401, process 400 begins. At block 402, a reference database is created (e.g., by one or more components of distributed system 100). At block 403, the relevancy of data items are determined. For instance, there may be certain elements of the database that are more relevant than other elements in measuring an attribute of the player. In one example, if the zip code is determined to by highly relevant to ADT, it may be preferable to pose that question to the user prior to other less-relevant questions. At block 404, the questionnaire is presented to the player in, for example, an interface of a computer system (e.g., a web interface).

At block 405, questions posed to the player are adjusted based on relevancy, and also based on answers provided in previous questions. For instance, if one answer to a particular question is highly relevant to ADT, then some lesser questions that are less relevant to ADT may be skipped. At block 406, the response(s) to the questionnaire questions are saved to the reference database. Thereafter, the relevancy of data items may be adjusted over time, responsive to answers previously provided by players. At block 407, process 400 ends.

Test, Quizzes & Questionnaires

Tests, quizzes and questionnaires can be generated by using a combination of one or many of the following methods: human or computer aided statistical analysis, regression tests, machine learning, evolutionary algorithms, etc, applied to datasets of potential questions and on-site customer interactions. One goal includes using these methods to produce tests, quizzes and questionnaires that are the most efficient at gathering the appropriate data and ultimately very accurate at predicting value.

Results from tests, quizzes and questionnaires, tied to the potential lead are combined with on-property engagement and interaction to determine accuracy of the individual questions in the test, quiz or questionnaire. The resulting data may be then used to fine-tune the test, quiz or questionnaire for the next prospect.

The form displayed to a potential lead can be determined by a number of factors. For instance, the referring website or page, the website they are visiting, the page of the website they are visiting, keywords on the page they are visiting, search terms typed into a search engine, by information volunteered, such as zip code/country/affinities/marital status/income/etc. or their geolocation determined IP address, cell phone, PDA, pocket computer, or personal computing device may be used.

According to one embodiment, it may be desired to track engagement both in the online environment as well as engagement in the real world (e.g., activity at a casino). To this end, one or many "tracking codes" may be applied to tests, quizzes and questionnaires. According to one embodiment, tracking codes are unique character strings and are applied to the entire session. The codes may also be encoded strings that when decoded and applied to a "processor" classify the visitor's potential value in relation to how they answered a particular questionnaire. The codes may have an additional more detailed encoding of each question in the questionnaire, how they answered each question and the particular version of the questionnaire. It should be appreciated that, according to one embodiment, this encoded string is not human-readable and can be printed in the form of a bar code, to enable easy scanning by most modern bar code readers. This allows modern hand-held computer device to read the code, transmit to a local processor or a processor accessible by a local or wide area network. In one implementation, the code is interpreted and a result is returned to the originating device.

An example of this process includes determining an encoded string which is printed on a web-based coupon. When the coupon is scanned for redemption at the property, an indicator is displayed on screen to the employee manning the customer service desk that this customer is a potential high-roller with an affinity for blackjack, to which the employee then determines it is appropriate to give the customer a more valuable reward to entice future behavior (i.e.: $100 NCC for table games vs. $20 NCC for slot machines). These "tracking codes" are also useful because they can then be associated to the customer's account. In the case of a customer tracking system, engagement can be tracked and associated to the test, quiz or questionnaire that the customer originally engaged with. Future engagement online can also be tracked with a visitor-specific tracking code. This additional code can be stored in a web session as well as in a client-side browser cookie or data object on disk. This tracking code can be used to tie real world interactions and behavior to a customer's online profile. Future tests, quizzes and questionnaires presented to the customer can be then customized based on this additional information.

According to one embodiment, it may be desired to move customers from online to offline (e.g., to a casino) and to appropriately provide incentives to that player to do so. As discussed, it may be useful to build and maintain a player profile. Information within the player profile can be created using tests, quizzes and questionnaires. A complete player profile may be built over time via one or more tests, quizzes, questionnaires, customer website interactions, and real-world customer interactions. These engagements may lead to some sort of registration and/or prompt the customer to take some desired action.

In some cases, the registration may be for a player club card and in many cases an incentive for participation may be attached to the registration. Because the test, quiz or questionnaire ultimately results in a score (discussed further below with respect to FIG. 5) and may also indicate customer preferences and affinities, this score, preference, and affinity information can be applied to a processor that determines an appropriate incentive for this particular lead. One goal here is to provide leads with the most optimally enticing offer available, based on how they performed in the test, quiz or questionnaire, how they have interacted online, and how they have interacted in the real world.

Player Attraction and Scoring

As discussed above, one aspect of the present invention relates to the attraction, scoring and delivery of players. This may be accomplished by an online ecosystem involving a number of distributed computer systems that connect players, advertisers, gambling organizations, lotteries, and other entities that are interested in locating, attracting, and interacting with players.

Figure 5A:
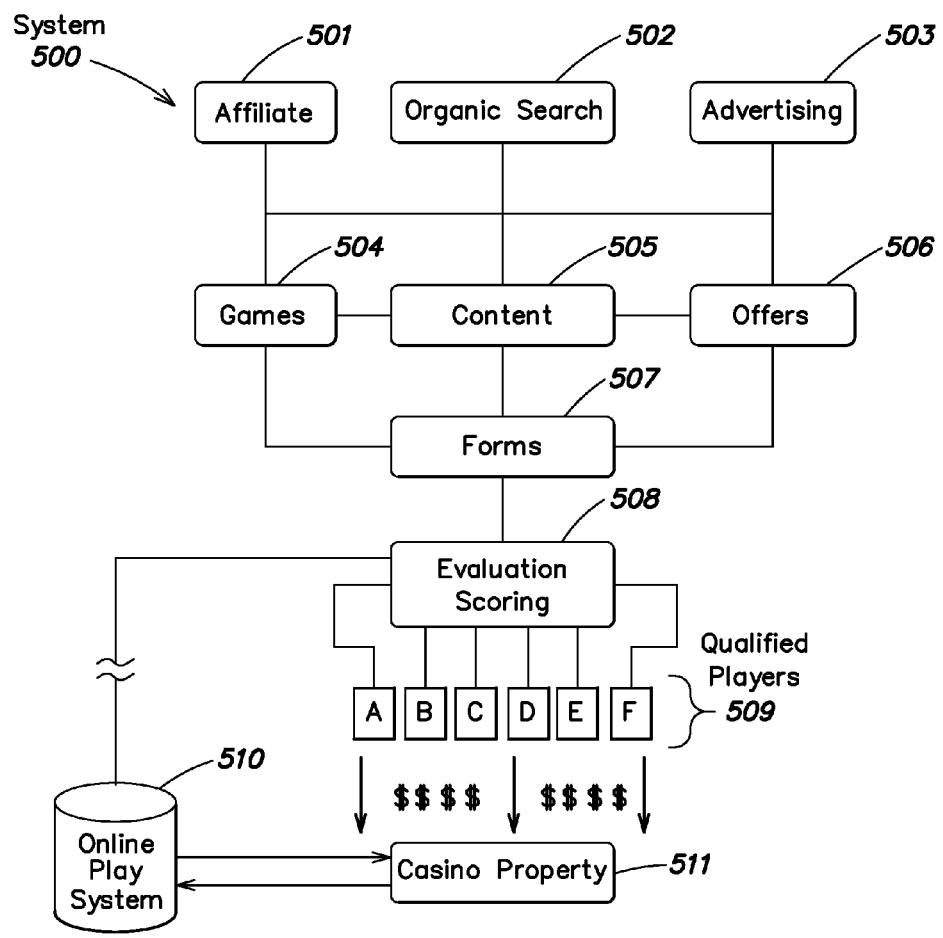
FIG. 5A shows a system for collecting player information and evaluating players based on that information according to one embodiment of the present invention.

FIG. 5A shows one embodiment of a system 500 that identifies, evaluates and delivers players. System 500 may include, for example, a number of systems that provide information to system 500, this information being correlated to players and permitting system 500 to locate and evaluate them. For instance, system 500 may locate player information through one or more affiliates 501, and through organic search of player information (element 502), conventional forms of online and off-line advertising (element 503). Further, information about player can be obtained through one or more online games (element 504), content viewed or provided to the player (element 505), offers extended and/or redeemed by the player (element 506), online forms (element 507), or any other method for obtaining information relating to the player.

As discussed above, a model or profile of the player may be maintained using this collected player information. Such information may be used to perform an evaluation or scoring of the player (element 508). Information collected relating to the player in addition to behavioral data (e.g., play in an online play system 510) may be used to identify one or more qualified players 509 that can be delivered to a casino property 511 or any other type of organization interested in reaching certain identified players.

Figure 5B:
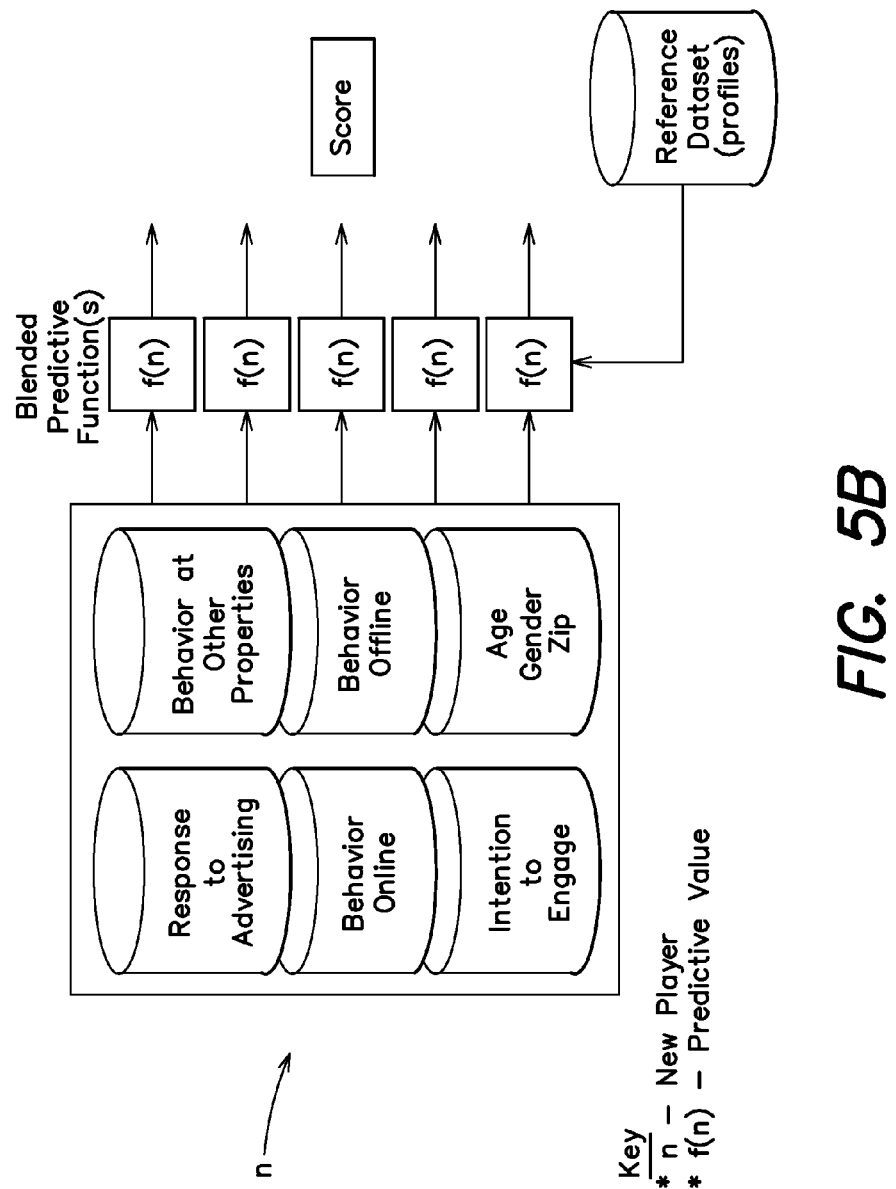
FIG. 5B shows a process for performing actions responsive to player information according to one embodiment of the present invention.

FIG. 5B shows one embodiment of one method for determining a rating or "score" for a player. As discussed above with respect to FIG. 2, player information may be collected and stored in a reference database or dataset. In one embodiment, the distributed system gathers as much data as possible from known players. If possible, this data may be linked to known metrics that exist outside the gambling location (e.g., a casino). Further, data that may be available related to their web history or other information may be associated with the player. These metrics may be associated based on common elements, such as demographic and psychographic data.

In terms of scoring a player, there may be one or more characteristics that may be scored or otherwise measured. For instance, in the case of a player that could potentially be a casino patron, it may be desired to estimate a number of characteristics. For instance, what is the player's capacity to spend in the casino, and how is this measured? What are the player's affinities, their likes and dislikes? What is the player's lifetime value to the casino and how is this measured? These and other questions about the player may be "scored," including, but not limited to the capacity of the player, propensity to gamble, the player's volatility tolerance, pace of play and other characteristics.

According to one embodiment, when a new player (n) enters the ecosystem, information is collected on that player is stored in the reference database (e.g., as stored in a profile of the player). As shown in FIG. 5B, a number of different sources may be used to collect information (e.g., response to advertising, behavior online, intention to engage, behavior at other properties, behavior offline, demographic data (e.g., age, gender, zip, etc.). Such information may be collected in various ways as discussed above (e.g., using a questionnaire via a web form). One or more elements of this collected information may have relevance to a property regarding the player that is desired to be measured by a "score" or other type of rating. Elements indicative of this "score" may be combined in a function f(n) that produces an output score for a particular player. In one embodiment, a reference dataset or set of profiles may be used as a basis of comparison to the collected player information, and the similarity to the reference set may determine what score is attributed to the player.

Further, the function that determines the score may be blended among the elements indicative of the characteristic to be measured. In one implementation, the blended function may be weighted to highlight elements that are more clearly indicative of the characteristic. The information may be submitted to a scoring engine that is capable of determining a score based on a number of inputs.

Scoring may involve a blending of several analytical methods. One goal of scoring is to produce the most optimal and error-free result possible. Although analytical methods may be used, it should be appreciated that other types of mathematical tools can be used to produce a score, including, but not limited to predictive modeling, scoring of models and forecasting. According to one embodiment, blending and comparison of these functional results is significant in producing an accurate score.

Predictive modeling is commonly described as a process by which a model is created or chosen to try to best predict the probability of an outcome. In many cases, models are chosen based on detection theory to try to guess the probability of a signal given a set amount of input data (e.g., given a received email, how likely is the received email spam).

A scoring engine can apply a blend of statistical techniques, including but not limited to Predictive Models, Decision Models, Descriptive Models, Linear Regression Models, Discrete Choice Models, Logistic Regression, Time-based Regression, Multinomial Logistic Regression, Probit Regression, Time Series Models, Survival & Duration Analysis, Non-parametric techniques, Machine Learning techniques, Support vector machines, Neural Networks, Radial basis functions, k-nearest neighbors, among others.

According to one embodiment of the present invention, a number of parameters may be identified that relate to a known "score" for a number of known players. This known information may be stored within the reference database and players having similar sets of parameter values may be identified as being more similar to other players that produce these known scores. In the case of a support vector machine, a learning machine may be trained on a number of known parameters for particular players that have known scores. Such parameters may be, for example, data elements as recorded within the reference database such as, for example, age, gender, zip, or other set of information that is correlated to a known score. Known scores for players may be modified from time to time as players exhibit different behavior within the real or online world. Once a learning machine is trained on a set of known data, that learning machine may be capable of predicting a possible score related to a player having particular parameter values (e.g., age, gender, zip, etc.). Using learning machines to estimate values or classify a particular data may be used in order to determine the relative score of a player to other known players or to predict and classify a player based on a limited set of information.

Once a score is produced, it is important to determine the accuracy of that score. Once this potential player starts producing on-property play history, statistical techniques can be used to determine the most significant indicators of value, when compared to the referential data set. It is also important to note that the difference between the player's actual value on property and the predicted value can roughly indicate the overall error in prediction. Adding this error as an element of the reference data set can help to make a stronger model for future predictions. In one example, a score of similar players has an error range of 5%-10%. Tracked play can also be added to the reference data set, along with significant indicators, to produce a stronger model for future prediction.

As discussed, scoring has many uses. For example, scoring may be integrated with online ad targeting in an effort to increase conversions. Once a player has been scored, the score can be used to entice the player to visit a website, complete a form, etc., by displaying a targeted promotion or advertisement based on their score. The score can be an integrated metric in an online advertising system or ad network and may be provided to that system. For instance, the score may be provided to the system or network via an API, a database, a cookie, or other similar transmission or storage mechanism.

Scoring may also be used with direct mail and customized direct mail messages to produce more highly targeted direct mail pieces or messages. A scoring service may also be used by a host of other applications, such as integrated promotions, within third party forms, etc. For instance, third party websites such as Travelocity, Orbitz, Hotels.com, among others, can use a scoring service in an attempt to better target offers and promotions to improve conversions.

Other uses for a referential data set include improving form conversions, by reducing average responses within a predictive model. In particular, predictive models can be used to derive average responses within a subset of that model. More concrete elements, such as zip code, sex, date of birth, etc. can be used to imply the results of more subjective elements, such as number of children, average income, affinities, etc. As an example, if by first collecting zip code, the average income and average education level can be derived from the zip code. Then, it may be possible to dynamically, or in step, eliminate those elements (that can be derived from other elements) from the form in an attempt to reduce the complexity of the application. Because the form can be simplified, submission of the form is increased as players are likely to answer a higher number of questions that provide relevant (not redundant) information.

Other more simple scoring methods may also be used to determine the score of a player. For instance, known play at other establishments can be used to score a player over time. How this play is measured and tracked may be significant. In one example, play of a player may be measured by only viewing a player's loyalty points and how they increase or decrease over time. These changes may be indexed against a database of known loyalty point values across properties, to determine the value of the player. Then, this data can be used to predict how a player might be valued at an establishment where play history has not been established.

In another example, the system may build a list of keywords that indicate an affinity for gaming. The system may perform data mining of publically available data sets, such as blogs, message boards and email systems for these keywords and then associating these keywords to identifiable indexes, such as email addresses, names and phone numbers of potential players. The number of relevant keywords can be used to better target marketing messages, including direct mail, email and web advertising.

Further, scoring may be applied to web pages. Based on a model of keywords to gaming affinities, pages can be scored and ranked based on the keywords that they contain related to those affinities. Then, users who visit these pages can be scored based on frequency and duration of visitation.

Also, a player's game usage may be monitored and used to determine a score. For instance, frequency, duration, average bet size, etc. of online casino games that are played by the player can be used to score a player's gaming affinities and their gaming knowledge. This data can then be used to target advertising, promotions and special offers, among other actions.

Figure 6:
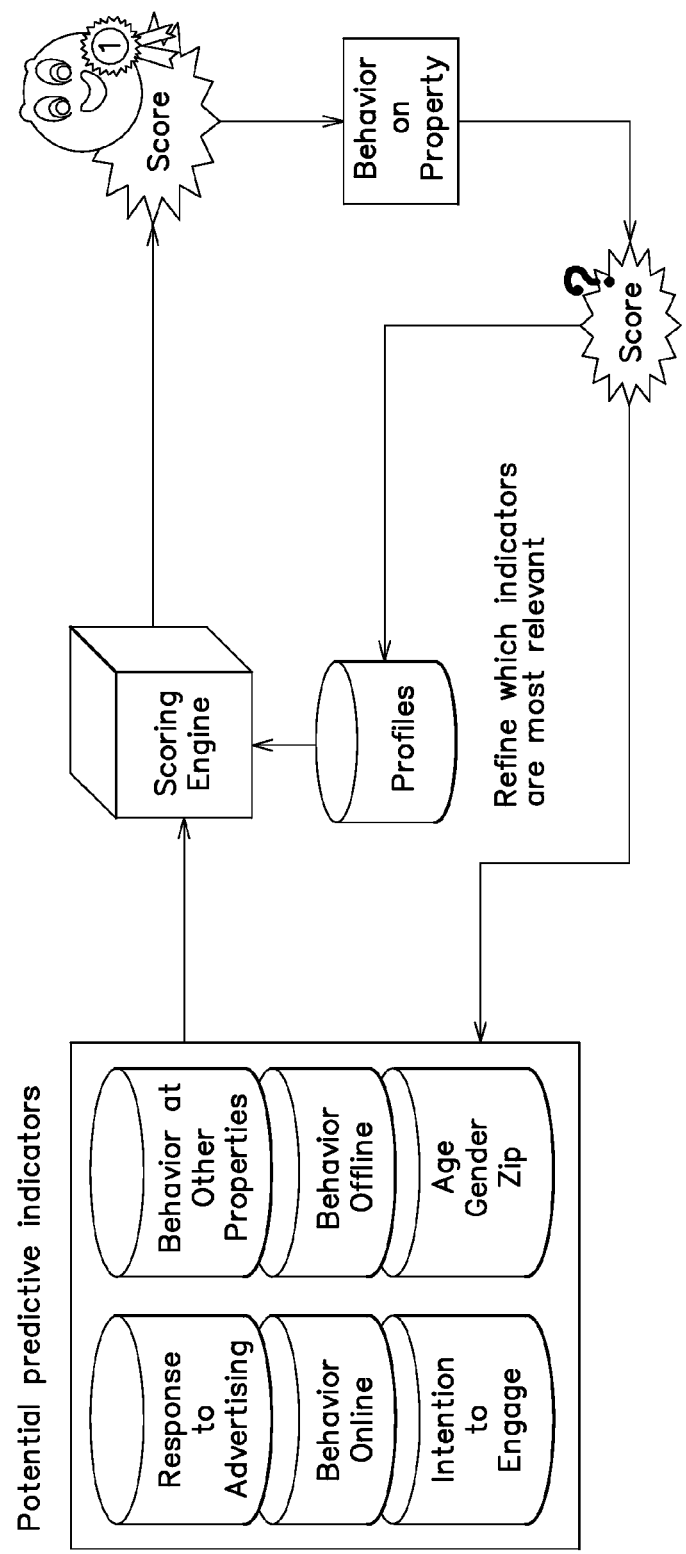
FIG. 6 shows a process for conducting questionnaires according to one embodiment of the present invention.

As shown in FIG. 6, a scoring engine may be used to compare a number of inputs reflective of the attributes of the player/person and profiles of other players that are potential predictive indicators of the future behavior of the player. As discussed, certain sources of information may be used to measure, for instance a player's response to advertising, online behavior, intention to engage, etc. These sources may be applied to a scoring engine that compares data inputs from these sources to one or more profiles. These profiles may have certain data elements that when present or at a certain value, indicate the presence or absence of the characteristic to be measured (e.g., propensity to gamble at a particular ADT).

Inputs for a scoring engine may include, for example:
Demographic Data
Psychographic Data
Social & Social Graph Data
Self-reported Data
Online activity
Offline activity
Casino/on-property activity
Advertising response/actions
Calls to, or requests for, action As discussed, there may be many different sources that provide this data. For example, demographic data may be provided through online and offline registration forms, questionnaires, surveys, third party data look-up services such as TargusInfo, census agencies that provided data, among others. Psychographic data may be provided by online and offline registration forms, questionnaires, and surveys. Social and social graph data may be provided by social networking websites (e.g, MySpace, Facebook, etc.), self-report and third-party reported memberships to specific organizations (AARP, AAA, Unions, etc.).

Self-reported data (data that comes directly from the player) may be provided by gaming related affinities and non-gaming and cursorily-related affinities. For instance, when a player offers information during a registration at a gaming facility, that information may be used to populate the model of the player.

Behavioral activity of the player may also be provided as an input to determine a player's score. For instance, online activity or behavior may be monitored by observing a player's website affinities, the duration the player spends on such sites, and site-specific activities (e.g., playing games, buying clothing, performing social networking functions, etc.). Further, the affinities of the player may be used to determine score. Such affinities may include self-reported affinities expressed through various websites, favorite books, favorite websites, collected bookmarks, stories or article topics shared using publicly accessible hyperlink social bookmarking and sharing services (e.g., del.icio.us, Digg, YahooBuzz!, etc.). Other online behavior may be used, such as overall Internet usage, access from particular geo-locations, etc.

A player's offline activity or behavior may also be tracked and used to determine a player's score. For instance, a player's travel history, self-reported or provided by third party data service, market affinities (shopping, brands, locations, etc.), and self-reported and publically accessible geo-location affinities, collected from geo-location data on information sharing, blogging or photo sharing websites may be used to determine player scores. For example, information identifying an average geo-location of all photos shared by a user on Flikr, PhotoBucket, or Picasa. Locations of travel destinations, restaurants and businesses reviewed by on travel and local search sites such as Travelocity, TripAdvisor, Yelp!, Yahoo Local and Google Local may be used to establish a location of the player at various times and frequencies. Further, a player's behavior in a casino or other on-property activities may be monitored (e.g., what games were played, how much was spent and at what rate, what other goods/services were purchased on the property, gaming affinities, average hotel say duration, response and redemption rates to specific promotions, offers and comps, player club membership level, player club membership activity, player visitation frequency, player average spend per visit, etc.).

Further, advertising response and actions of the player with respect to advertising may be used to determine a player's score. For instance, information such as the average exposure to specific targeted online advertising, average click through rates on specific online advertising, and average time spent viewing specific targeting advertising landing pages may be used to determine the player's behavior. Also, frequency information such as the frequency of response to targeted advertising, frequency of visiting online advertising landing pages, frequency of partially completing online advertising landing pages, frequency of fully completing online advertising landing pages, frequency of redeeming coupons and special offers online and offline, and frequency of responding to phone, mail, email and web-based questionnaires, polls and special offers may be used to determine player score.

Also, a player's calls to, or requests for, action may be used to determine player score. For example, a player's responses to email questionnaires and polls, or online forms, questionnaires, polls may be used by a scoring engine to determine player score. Further, data collected during various activities including pre-registration for loyalty club membership, during entry into a sweepstakes, during registration for a special offer, coupon or promotion, during a process of booking a vacation, flight or hotel room (either online or offline), during a phone-based questionnaire, interview or poll may be used.

There may be location or organization-specific information that may be collected that is indicative of characteristics relating to the player. In the case of casinos, information such as spend likelihood, visit likelihood, frequency of visits, associations with other players, lifetime spend and other location-specific information may be used to determine player score. For instance, information relating to spend likelihood may be determined using online gaming interaction and related data, data from customer relationship management (CRM) or Loyalty Club system(s), and self-reported intention to spend a specific value. Information relating to visit likelihood may be determined from responses and to specific online or offline coupon, offer or comp information, and/or data from CRM or Loyalty Club system(s) data. Visit frequency data and lifetime value data may be obtained directly or inferred from CRM or Loyalty Club system(s) data. Associated player data (e.g., the player brings the wife and kids, travels with one or more friends, etc.) may be obtained directly or inferred by average hotel room size, when booked online or offline, social and social graph data, and/or gaming website usage and interaction data. Data relating to spend outside the casino may be obtained from affinity data, either self-provided or gathered from third-party data services, granular data on credit card spend affinities and/or general credit card spend data related to specific market segments (dining, entertainment, travel, etc.).

As discussed, there may be many uses for scoring data, especially for interested third parties that wish to target such players. For instance, in the case of one or more casinos or other gambling organizations, such organization may desire to reach potential players. To reach such players, third parties such as casinos may be permitted to access scoring data according to one embodiment. For example, player data may be provided to casinos via a customer relationship management (CRM) interface. Such an interface may include a web interface, mobile application, text-messaging, email or other interface method or combination of methods. Casino interest in player(s) may also be initiated through a web interface, a text-messaging response, an email, a call to automated phone system, or a phone system operated by a customer service representative.

In one embodiment, the information may be "sold" or a referral/lead provided to the third party for value. The price for a particular referral may be based on the score of the player (e.g., their capacity to spend money). Also, historical sale prices of leads may be tracked by the system, and previous sales of similar lead types (e.g., with comparable scores) may be priced in a similar manner. Such information may also be "bid" on by a number of third parties in an auction setting. Leads may be bid on by third parties in real time in an online setting, similar to Ebay, bidding on keywords such as Google AdWords, or by using other forms of bid technology.

Third parties may also contribute to scoring, and such information may be maintained by the ecosystem and provided to other third parties. For instance, a third party referred to herein as a "referring partner" may be capable of providing a "rating" or score of the player while that player/person interacts with the third party. For instance, the third party may be a casino, and the casino includes computer systems that monitor the particular player when that player is on-property. Performance of the player (e.g., as the player interacts with the system and the property, data from the players interaction, such as response to sweepstakes, promo, comp, and/or ADT of the player after they have visited the casino) as determined by the casino is used to develop a score that represents the value of the referring partner (e.g., the casino). This information may be provided to the ecosystem and accessed by other third parties or users. A unique identifier may be assigned to referring partners so that their scoring information may be indexed and accessed.

In addition, the ecosystem may provide comparable players, such as those provided by casino loyalty and CRM system(s) and historical players that have already been through the system. The ecosystem may also reevaluate the model associated with existing players from time to time to keep an updated view of that player. For instance, when the player interacts with the ecosystem, data about how the player's performance (e.g., at a property) is fed back into the scoring engine to determine an updated score.

Figure 5C:
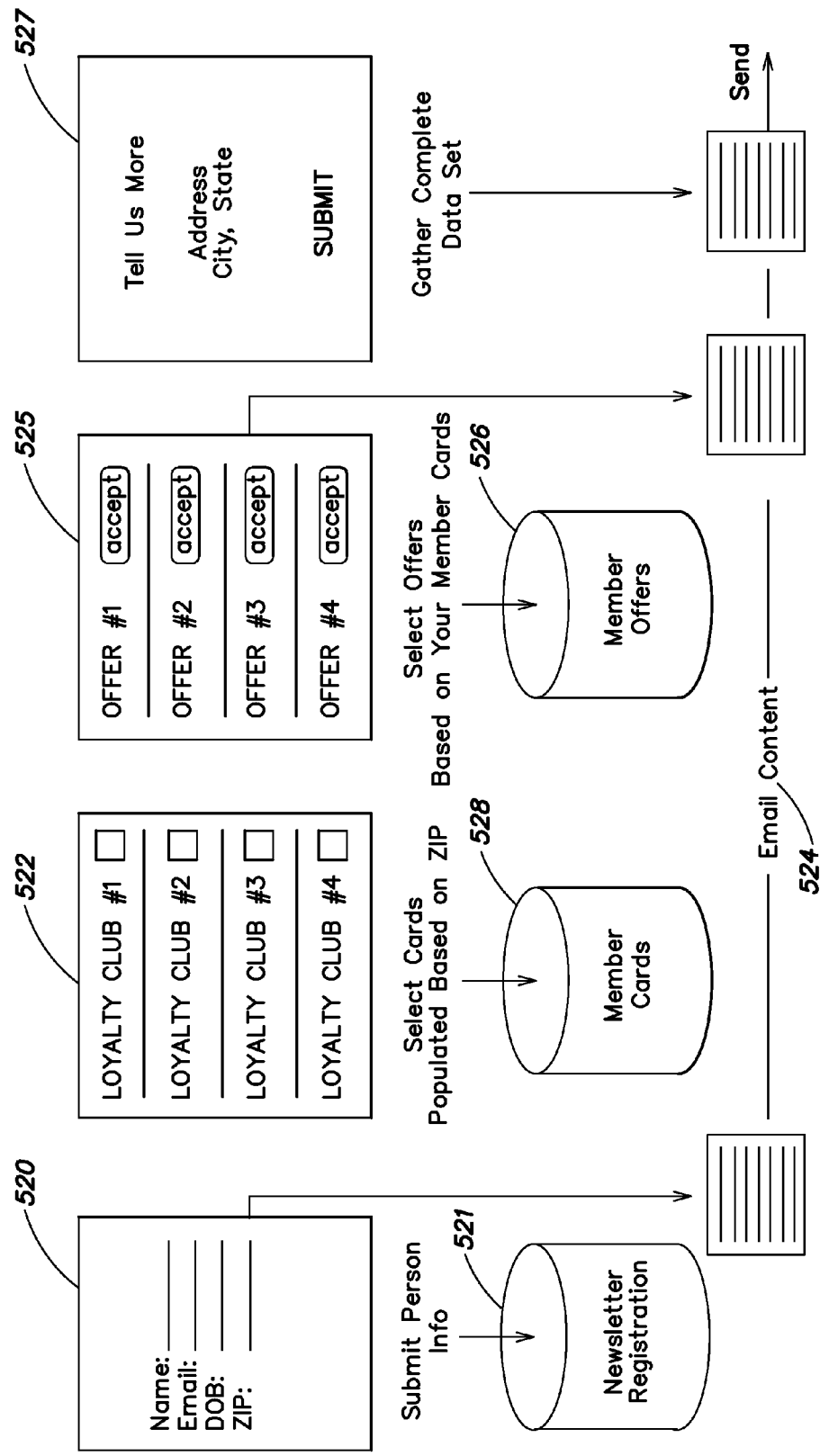
FIG. 5C shows a data collection process for collecting player information over a series of event according to one embodiment of the present invention.

For instance, as shown in FIG. 5C, an ecosystem may collect and evaluate a player over a series of events, while continually improving the profile of that player. For instance, the ecosystem may collect information submitted by a person (e.g., information 520 including the person's name, e-mail address, date of birth, and zip code as part of a newsletter registration process 521). In another event, the ecosystem may permit the player to submit loyalty club information 522 for the purpose of tracking and maintaining member card information 523. Based on the player's member card information, the player may be offered one or more offers 525 and may accept one or more of these offers (thus creating additional information that relates to the player's affinity and/or preferences). Further, in another event, the ecosystem may contain additional information through other data collection methods (e.g., a test, questionnaire, data entry form, or other element (e.g., a pop-up form requesting address, city and state information for the player)) that permit the ecosystem to create a fuller view of the player. Such events may include one or more communications to/from one or more systems of the ecosystem. For instance, information related to the player may be e-mailed between systems to communicate player information. Periodically, information collected about the player may be saved to the player profile.

FIG. 6 shows one example of a method for producing a score according to one embodiment of the present invention. As shown, a score may be determined by a scoring engine based on a number of potential predictive factors. In one embodiment, the scoring engine may be part of a consumer-facing website that interacts with known or potential players. Initial predictive scores and/or profiles may be generated based on processing loyalty databases, extracting indicators based on ADT, or other meaningful business metrics. The player may then have an on-property visit (or other experience or interaction with the ecosystem) that changes the view of the player. For instance, the player may have had a nominal initial score, but based on behavior on-property, the score may change, or otherwise indicate that their profiles need to be changed that indicate how future scores should be determined. In particular, the indicators by which particular characteristics are measured may be refined. In this way, feedback from player's engagements with the ecosystem may impact how players should be scored or profiled in the future.

According to one embodiment, scoring functions include two sets of data; an input data set and a basis, referential or historical data set. With these two datasets, one or more analytical methods may be applied, including but not limited to predictive analytical methods as well as a blend of multiple results from the application of multiple analytical methods to produce the best and most useful/accurate end result. Basis, referential or historical data sets may be determined as one or a combination of many of the data sets listed above, or custom data sets that can be correlated to specific data-points of the basis data sets.

Data relevancy may be determined for various elements of the referential, basis or historical data sets. It is appreciated that not all basis, referential or historical data sets are created equal. Thus, according to one embodiment, one aspect relates to loading this dataset into the scoring system and then providing a method to assign relevancy values and weights to specific data elements within the new data set. As well as providing relevancy values and weights to specific elements, a relevancy value and weight can then be applied to the overall dataset.

Optionally, the system may then display (e.g., using visual diagrams, 3d modeling, graphing, etc.) in real time, the overall affect particular referential values and weights have on the overall system. With regard to data accuracy, it is appreciated that some data sets are not as accurate as desired for the overall model. Similar to data relevancy, an accuracy value or weight can be applied to individual data sets as well as the overall data set.

When there is a change in basis, referential and historical data, this information may be indicative of trends. In particular, when basis, referential and historical data is significantly granular and the methods to gather and measure these data points occurs at a significantly relevant rate, any changes in specific data points can be used as a new and alternate set, to indicate trends. These trend sets can then be used by the scoring engine as basis, referential and historical data for scoring the potential for input data to follow that particular trend. Such a system would allow an operator the ability to select which trends are most relevant and apply those trends to the overall scoring function using relevancy values and weights.

Data updates may occur at any point in the ecosystem. However, it is appreciated that basis, referential and historical data sets can be updated based on several factors, including availability of the data, ease of accessibility to the data, update time values set in the system by the operator, and in real time, when new data is made available.

As discussed, data is fed back into the reference data set, so that scoring may be adjusted. For instance, when an input data set is applied to the scoring system/function, a result is produced. This input set is most likely related to a gaming candidate. A gaming candidate's engagement can then be tracked using various methods, including but not limited to a loyalty system. Property engagement can then be fed back into the system as a new element of a basis, referential and historical data element. When compared to the initial result produced for this candidate, this "feedback" can be used to help tune and adjust the overall scoring system/function to be more accurate.

According to one embodiment, an operator of this scoring system can create heuristics that associate actions to specific results. The heuristics can be specific to the result set(s) that are produced by the system. The actions can be, but not limited to, entering the input data set and the results into a database for further use, generating automatic emails, scheduling the printing and delivery of marketing materials, changing the details of a data record in a loyalty management system.

Figure 7A:
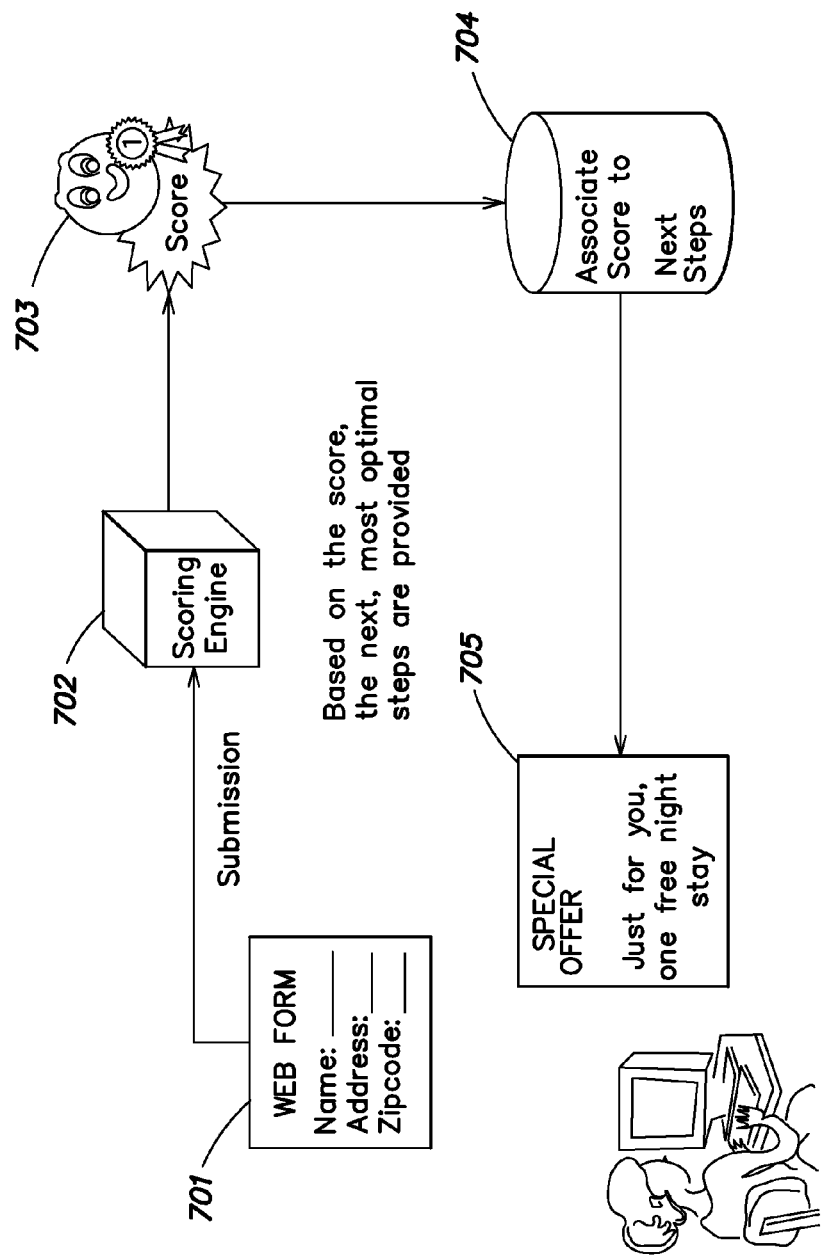
FIG. 7A shows a process for determining a score according to one embodiment of the present invention.
Figure 7B:
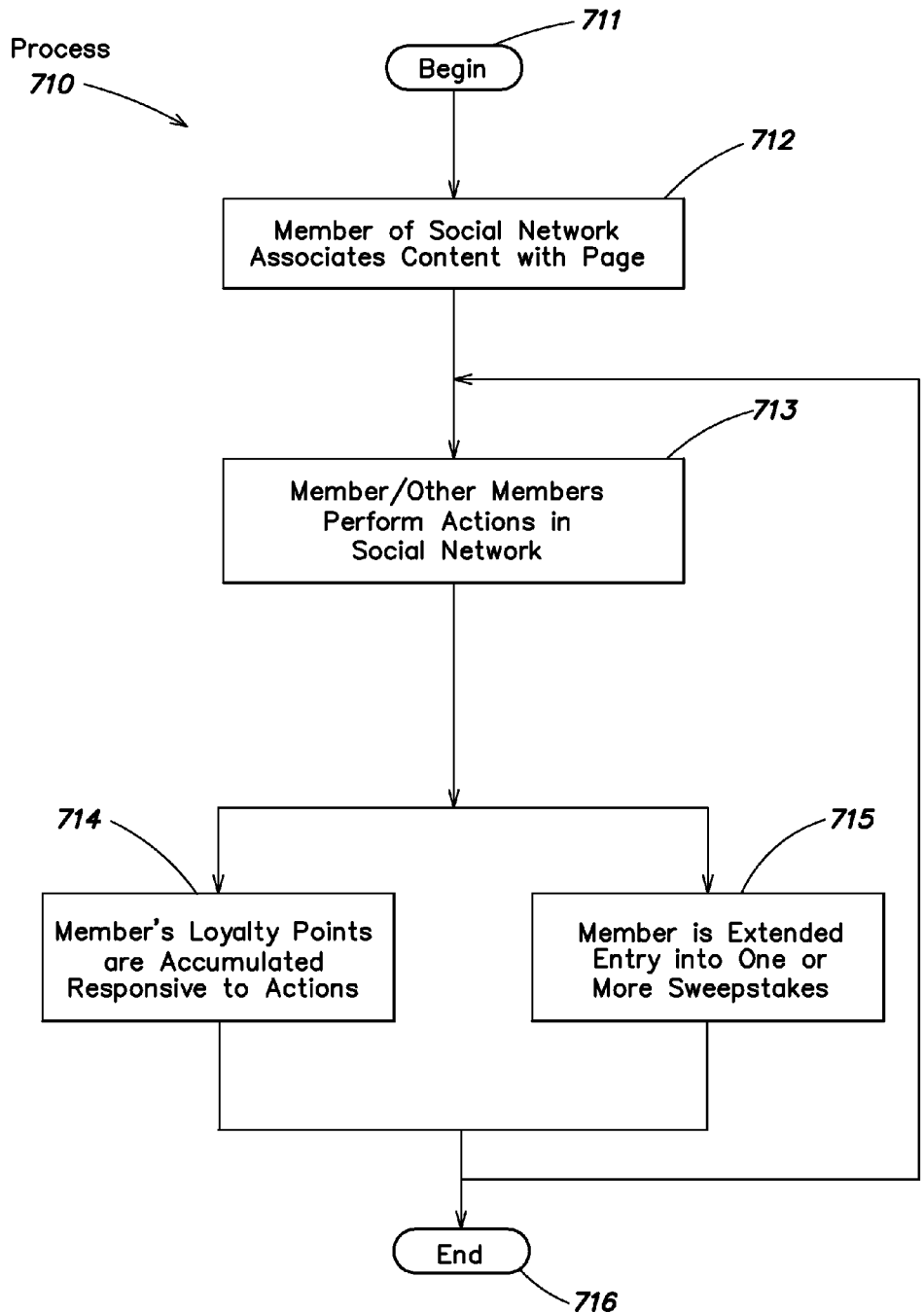
FIG. 7B shows an example process for integrating awards with a social network according to one embodiment of the present invention.

FIG. 7A shows one example implementation where a third party application might integrate with a scoring system, and take a resulting action responsive to the determined score. At block 701, the player may enter information (e.g., their name, address zip code, etc.) in a web form. This information may be requested, for instance, when the player registers at a third party website. At block 702, the submitted information is transferred to the scoring engine, which then provides a score associated with the player at block 703. At block 704, the score is associated with an action to be taken, which, according to one embodiment, may be determined based on rules, heuristics, or other function. As discussed above, one or more complimentary offers may be made to the player, based on the provided information (e.g., at block 705). In this case, based on the determined score, the most appropriate complimentary offer is selected and presented to the player (e.g., in the computer interface).

Social Sweepstakes and Rewards

Over the past few years, social networks have become commonplace on the Internet. As they continue to increase in popularity, they not only continue to attract a more youthful age group, but are increasingly used by people who are more mature in age. With this, there will be an increasingly greater opportunity for lotteries and casinos to market to their target audience, using these social networks.

According to one embodiment of the present invention, actions performed by a member within a social network are used to provide an award or entry within sweepstakes or other type of game. At block 711, process 710 begins. At block 712, a member of a social network associates content with their own personal page. For example, a member of a social network may have their own personal webpage associated with their online persona (e.g., a Facebook homepage), and the member selects to have content associated with that page. As discussed further below, that content may include a widget that, when activated, performs functions associated with a loyalty account and/or sweepstakes entry. At block 713, a member or other member of the social network performs an action in the social network that relates to the content placed on the member's page. For instance, another member may select or view the content on the member's personal page, causing a code element to be activated that increases that member's loyalty account or otherwise enters the member into one or more sweepstakes. For example, at block 714, a member's loyalty points are accumulated responses to actions performed by other members with respect to the content. In another example, at block 715, a member is extended an entry into one or more sweepstakes based on one or more member actions within the social network. It should be appreciated that any number of actions or relations within the social network can cause (or be configured to cause) increasing points or entry within any type of game, including a sweepstakes.

According to one embodiment, social networks may be used to implement sweepstakes by using mechanics and structure of a social network as the qualifier of entry into one or many sweepstakes or other type of game entry or award. As a member of a social network, the member is presented with the opportunity to place a content (e.g., a "widget") on the member's page. By registering for access to this content and placing the content on the member's page, the social network member qualifies him/herself to be eligible for entries into one of many Social Sweepstakes. The member is given the opportunity to select one of many potential available sweepstakes in which to participate. Once the sweepstakes is selected, the member is presented with content (e.g., a "widget" code) to place on their page.

According to one embodiment, once the content is placed on their page and activated, the member then starts accruing sweepstakes entries. In one implementation, sweepstakes entries may be accrued based on one or more functions derived from several factors. In one simple example, the system may accrue one sweepstakes entry for each unique visitor that visits the sweepstakes content placed on the member's page (e.g., the visitor selects the "widget" and five (5) sweepstakes entries if the visitors also signs up to participate in the sweepstakes and places the content (e.g., another "widget") on their own page. Other actions/relations may be created that trigger a sweepstakes entry for the member. A more complex set of factors that can be used to accrue sweepstakes entries may include the number of unique visits, the number of "friends" or other relation the member has in the social network, and/or the percentage of friends that also have sweepstakes "widgets" on their pages. To add incentive for participation and excitement, the value of the sweepstakes could also be adjusted based on similar factors. However, in one embodiment, the value of the sweepstakes could be a fixed value.

These sweepstakes can provide prizes such as, for example, monetary currencies, goods, services and well as loyalty points, coupons and other incentive currencies. According to one embodiment, a social network that implements social sweepstakes may include the following several components, a web visitor content (e.g., a component such as a "widget"), a social network member component, and a backend sweepstakes management component.

Regarding a web visitor content (e.g., a component), an individual browsing a particular page on the Internet (e.g., a member page located on a social network) encounters an element on the page displaying details of the sweepstakes. This information may or may not include the value of the sweepstakes, the total number of entries into the sweepstakes as well as links to how the visitor can enter the sweepstakes. There may also be additional information displayed related to partners or promoters of the sweepstakes.

Regarding a social network member component, a member of a social network, once registered for a particular sweepstakes, can visit a management page which will allow them to view the number of entries into the selected sweepstakes, when the next drawing will be held, and the number of times they have entered a sweepstakes. The management page may also permit the member to view other information associated with the sweepstakes, such as links to terms of services, privacy policies and sweepstakes rules and regulations. Further, the management page may provide redemption information that relates to redemption of a sweepstakes entry (e.g., links to information on how to redeem any winnings related to the sweepstakes).

A backend sweepstakes management component may be provided that allow entities that are providing or otherwise sponsoring the sweepstakes to manage the administration of the sweepstakes. In particular, advertisers, promoters, businesses, organizations and individuals interested in using sweepstakes as an advertising tool are provided access to a web interface that would allow each entity to sponsor each of the available sweepstakes. According to one embodiment, such an interface provides advertising opportunities to users, as ad buys can be placed through this web interface. In one implementation, the advertiser may be permitted to specify content, duration or frequency, as well as a click through URL for the advertisement. The advertiser would have no responsibility in the fulfillment of the sweepstakes, unless the advertiser is offering the prize for the sweepstakes (ex: free play at a casino, free trip, etc.).

It should be considered that a social sweepstakes does not have to be limited to members or any particular social or referral-based network. It can be appreciated that the Internet is, in and of itself, a giant social network, so the above can be applied to any content and data accessible on the WWW/Internet, including content and data rendered and accessible over cable, cellular, wireless, WiMAX and satellite networks.

Social rewards may be offered to members in much the same way as social sweepstakes as discussed above. In particular, a system may award loyalty and/or rewards points to a member based on their social network. In one implementation, the mechanics and structure of a social network are used as the qualifier for accruing such loyalty and/or rewards points. In the examples discussed above, content may be placed on a member's social networking web page (e.g., by placing a "widget" on the web page). By registering for access to this content and placing the content on the member's page, the social network member qualifies him/herself to be eligible for loyalty and/or rewards points. The member may be provided the opportunity to select a frequent player or other type of rewards program to accrue points in. Once the type of loyalty program is selected, the member is presented with content (e.g., a "widget" code) to place on their page. According to one embodiment, once the content is placed on their page and activated, the member then starts accruing awards points. In one implementation, points may be accrued based on one or more functions derived from several factors relating to the activity of the social network. As discussed above, a member may accrue points based on how frequently their page with the content is viewed, how frequently the content is selected, how many "friends" the member has, how may friends have added the content to their page, and other factors related to the social network.

Player Delivery

Various aspects of the invention relate generally to attracting players to an ecosystem and eventually, delivering them to gaming establishments. According to one embodiment, delivery of players may be accomplished by offering players incentives. As discussed above, because gaming establishments have a strong incentive to promote enjoyable visits, one aspect of the invention creates more intelligent incentives that increase the likelihood of an enjoyable patron visit or advance some other goal of the gaming establishment. These incentives may be in the form of intelligent non-cashable credit (NCC) or may take any other form such as coupons, vouchers, player card account information, or other forms that is able to alter or control the gaming experience.

One embodiment of this invention uses customer profile information to award incentives that create customized gaming experiences catered to the known or predicted conscious or subconscious predispositions or preferences of the patron. This type of targeted incentive serves to make the incentive more enticing to the patron, increasing the likelihood that the patron will use the incentive. It also makes it more likely that the patron will have a positive gaming experience and an enjoyable visit, because the gaming experience will more closely fit the experience suited to that patron.

In one example implementation, it may be known or deduced from profile information (or other information collected by the ecosystem) that a patron has a strong preference for games of skill rather than games of chance. In such a case, incentives may be provided based on the profile information that specifically direct a player to blackjack or video poker rather than roulette or slot machines. In another example, a player known or predicted to have a low tolerance for game volatility may be directed to specific electronic gaming machines (EGMs) in the gaming establishment that are configured to pay out small, frequent wins rather than machines that pay larger but more infrequent wins.

According to another embodiment, use of the incentive may alter the game itself to more closely match the known or predicted conscious or subconscious predisposition or preferences of the patron. The game may be altered in any number of ways. A few examples may be to use different pay tables, add, remove, or alter game features, add or remove game rules, add new or altered ways to win the game, or change the ascetics of the game. Again, this serves to make the incentive more enticing, increasing the likelihood of incentive redemption in the gaming establishment and also making it more likely that the patron will have a positive gaming experience and an enjoyable visit, because the gaming experience will more closely fit the experience suited to that patron.

In another embodiment, an incentive may contain additional information or provide a link to additional information kept in another system that indicates that a player enjoys highly volatile games. In this case, the use of the incentive in an EGM would cause the EGM to use highly volatile pay tables rather than the standard pay tables. In another example, if the patron profile indicates that a player prefers football to basketball, use of an incentive in a slot machine would change the game to use football team logos and branding rather than basketball team logos and branding. In another example, incentives used by a patron whose profile indicates that she prefers games with free will rather than pure chance may alter a slot machine to give the patron a choice of an additional way to win, such as choosing between doubling the payout on the $1^{st}$ or $3^{rd}$ line of a slot machine or picking which card(s) should be wild in a video poker machine.

Game play may also be altered for table games. For example, special NCC chips given to a patron who wishes to play blackjack may allow the patron to choose a wildcard or create an additional way to win such as an extra payout for a hand that contains 3 of a kind or all cards of the same suit. As another example, a patron using specific NCC chips to play craps may be allowed to make an additional type of wager that is not available to other patrons using regular chips.

In another embodiment of the invention, a gaming establishment may use incentives to direct players to a specific game, set of games, or a specific location in the gaming establishment. This may be an exclusive area in the establishment that, based on the patron's known or predicted profile, may be particularly enticing or enjoyable for the patron. Or, it may be that for marketing, branding, exposure, or other reasons the establishment wishes to drive traffic to or through a particular location within the establishment.

Another embodiment of the invention may use incentives to increase the odds that a new patron will win a minimum amount on their first visit to the gaming establishment. As an example, among other ways, this may be accomplished by combining this embodiment with other embodiments, such as using the incentive to direct patrons to specific EGMs that have higher payout tables, changing the pay tables or other features of EGMs to increase the odds of winning, or altering table game wagering rules to increase the odds of winning.

Another embodiment of the present invention relates to accepting player preferences directly from the player. For instance, during a registration process, the player may input, through an interface of a computer system (e.g., a web interface), that the player prefers table games. Such player preference information may be associated and stored in the model for the player, and incentives may be selected for the player that are consistent with the preference information. Such information may also be obtained through Aggregation of Data According to one embodiment, a system and method may be provided for aggregating gaming related compensation offers, loyalty point balances and win/loss statements over an electronic medium or network of qualified casino patrons who choose to participate in one or more gambling loyalty programs.

Figure 8:
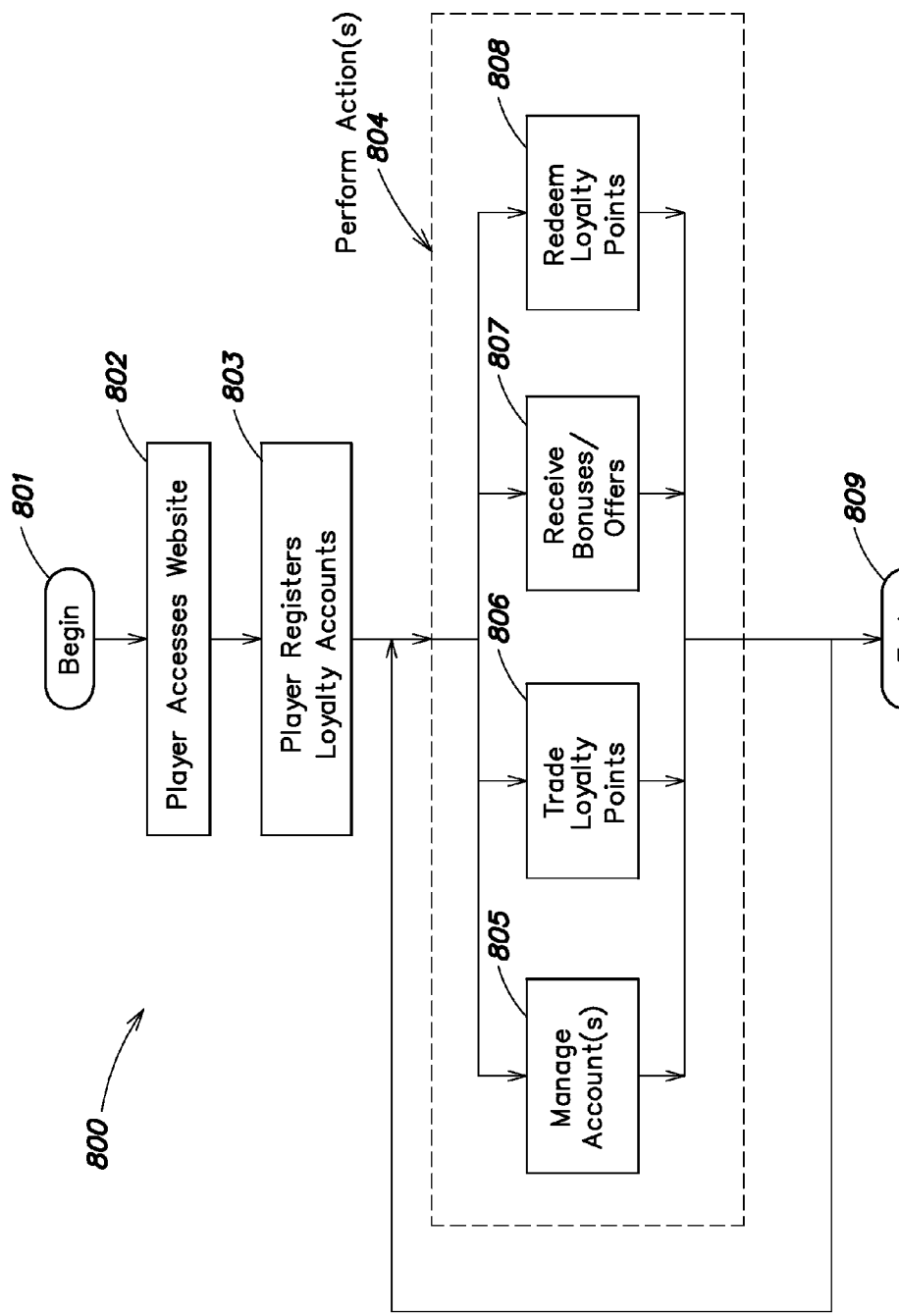
FIG. 8 shows a process for managing loyalty point accounts according to another embodiment of the present invention.

FIG. 8 shows an example process 800 for managing loyalty points within an ecosystem according to one embodiment of the present invention. At block 801, process 800 begins. At block 802, a player is permitted to access a website. Such a website may be presented by a server associated with the ecosystem. The website may permit (e.g., at block 803) the player to register one or more loyalty accounts with the website, so that the player may track and otherwise manage their loyalty point programs from a single point. To this end, the player may provide authentication information that permits the ecosystem to obtain loyalty point information (e.g., a username/password). The ecosystem may then be configured to obtain the loyalty account information from the organization (e.g., the casino), such as through an API, a data exchange method, or user interface. The ecosystem may be capable of scraping information periodically from the player's loyalty account with or without the player involvement so as to keep a current view of the player and to provide more accurate scores.

In exchange for access to such information, the player may be permitted to perform a number of actions with respect to the player's loyalty accounts (e.g., at block 804), such as managing one or more loyalty accounts (at block 805), trading loyalty points, either with the ecosystem or other players (at block 806), receiving bonuses, offers, ads or invitations from the ecosystem (at block 807), redeeming loyalty points for goods and services (at block 808), among other actions. Actions performed by the ecosystem may be executed indefinitely, as the player interacts with various elements of the system, acquires loyalty points, interacts with various organizations and gambling locations, among other interactions with the ecosystem. At block 809, process 800 ends.

Further aspects of a loyalty account management system may include one or more of the following, either alone or in combination with other features. For instance, a qualified person (e.g., a patron who is a member of a gambling loyalty program) may be either invited to join the system or may find the system by other methods. Compensation offers may also be targeted to people that do not participate in loyalty programs or other type of membership program. The qualified person may be required to pay the system a one-time entry fee, monthly subscription or usage fee for access to the system.

To utilize the system (e.g., view aggregate compensation offers, loyalty point balances and win/loss statements), the qualified person may be permitted to complete a registration form whereby he/she is required to identify the gambling loyalty club(s) to which they belong and then input a unique key into a registration form to each gambling loyalty club that he/she is a member of. The unique key may be different for each unique casino, lottery or other lawful gambling establishment.

On behalf of the qualified person, the system may access periodically (e.g., hourly, daily, weekly, etc.) each specified account with the corresponding key and may aggregate all available compensation offers, loyalty point balances and win/loss statements and display the aggregated information in a user interface or series of user interfaces. The data may be collected from multiple accounts for a single player, and a more holistic view of the player's performance may be constructed as a result. By tracking the changing loyalty point balance and win/loss statement over time, the system can infer the relative worth of the qualified person to each disclosed gambling loyalty membership account as well as the total value of the qualified person based on all their accounts.

In one embodiment, the system makes offer redemption recommendations which include additional point purchase options, point exchange and redemption planning strategies and may combine them with other non-gambling loyalty programs (e.g., airline, car rental, credit card, etc. . . . ) to the qualified person based the available aggregated loyalty program offers.

Through a series of application interfaces between the system and the various gambling player tracking or patron management systems or other third-party loyalty systems, the system allows a qualified person to trade their loyalty points with other qualified persons, auction their points to the highest bidder or exchange loyalty points between the person's various loyalty accounts.

Also, according to another aspect, it is appreciated that most gambling venues, such as casinos, find it expensive and difficult to recruit new players to the extent desired and therefore focus a majority their attention and marketing resources on retaining existing players. In short, it is easier and cheaper to keep existing players happy than have to recruit new ones.

Therefore, in conjunction with player tracking systems and an instant bonusing option as described above, casino gaming operators have found it desirable to offer their patrons extensive loyalty programs that allow patrons to accumulate loyalty points based on how much they wager. The more the patron wagers, the more points a patron can accumulate. The accumulation rate, aside from the gross amount wagered, is determined by such factors as the odds of the game and any promotional programs (e.g., double point days) that are running in conjunction with the loyalty program. These accumulated points are typically converted or redeemed by the patron for goods, services or cash, or a combination of all three. These redemption options are generally known as the redemption catalog.

It is well-known in the industry that the two hallmarks of a good loyalty program are the clarity and transparency of the loyalty program. For the loyalty program to achieve its purpose (e.g., foster a sense of ownership in the loyalty account and establish the parameters by which points are accumulated and redeemed), the program has to be easy to understand, the accumulation of points should be attainable, the point balance must be accessible, the redemption catalog should contain items that the participants value and the redemption process should have few, if any, encumbrances.

According to one aspect, it is appreciated that it would be beneficial to have an independent system that allows players to aggregate their various point balances as well as their win/loss statements into one easy to access, easy understand system and user interface. From the players' point of view, they can easily access their point balances (even if they have accounts at multiple establishments) and they can easily understand what redemption options are available at any given moment. From the gaming establishments point of view, the simpler and more transparent their loyalty program is the better the loyalty program will perform.

By tracking the changing point balances and win/loss statement over time, the system can infer the relative worth (e.g., visit frequency and spend per visit) of the player to each disclosed gambling loyalty membership account as well as the total value of the qualified person based on all their accounts. One knowledgeable about the gambling industry will appreciate that there is great value in knowing this information and utilizing this information to entice the patron to join another gambling establishment's player club. In doing so, the system could most likely provide a sign up bonus or inducement to the player that is of commensurate value to worth of the player.

According to another embodiment, it is appreciated that it may be useful to rate a player relative to other people in the same (or similar) player club(s). For instance, if a particular player has X points more than the average number of points for all participants at that casino, that player may be determined to be more valuable. Comparison to other players may provide insight into how the player club values people. Also, because a more accurate value of players may be determined, a more accurate relative comparison between players may be determined to permit organizations to more effectively target valuable players.

Additionally, there is great value in allowing a third party to aggregate point balances while providing application interface software/tools (APIs) that allow the player to trade, auction or exchange points between system providers and other participants so that they may optimize their redemption options. Furthermore, it would be highly desirable to expand the scope of the system to allow other non-gaming loyalty clubs to participate so that the player would have the widest possible set of redemption opportunities. For example, a player may be permitted to exchange rental car points for gaming points so the player could redeem the rental car points for a hotel room at the gaming establishment and vice versa. Also, it is appreciated that non-gaming loyalty club information may be used in addition to the gaming loyalty club information to obtain a view of the player. Thus, a wider view of the player (in areas other than gaming) can be used to determine player value.

In one embodiment, the ecossystem (among other system components) may provide an environment that serves as a clearing house for points. According to one embodiment, not only can the ecosystem manage points obtained via gambling-related activities, but can manage and track other point programs (e.g., airline frequent flyer programs, hotel loyalty programs, etc.) as well. According to one embodiment, players/patrons may be permitted to exchange different types of points for one another, bid on/purchase points, convert points between programs, among other transactions and functions. To this end, the ecosystem may provide interfaces and/or other types of tools that permit the players to perform such functions. For instance, the ecosystem (e.g., through a CompOffer system interface) may provide tools to match up potential trades between players/patrons (e.g., player X needs 50 points to reach a target point goal in a particular program A, player Y has 50 unused points in program A, but needs 100 points in program B, which player X has). Interfaces may be provided that permit players/patrons to view performance of others with respect to points (e.g., a leader board for points).

Other tools may be provided that permit players/patrons to communicate with one another. For instance, social networking tools or other types of communication tools may be provided (e.g., chat functions, tagging, ticketing, voting) to enhance the experience of the player/patron, and to facilitate their use of point-based systems.

Layering

Figure 9:
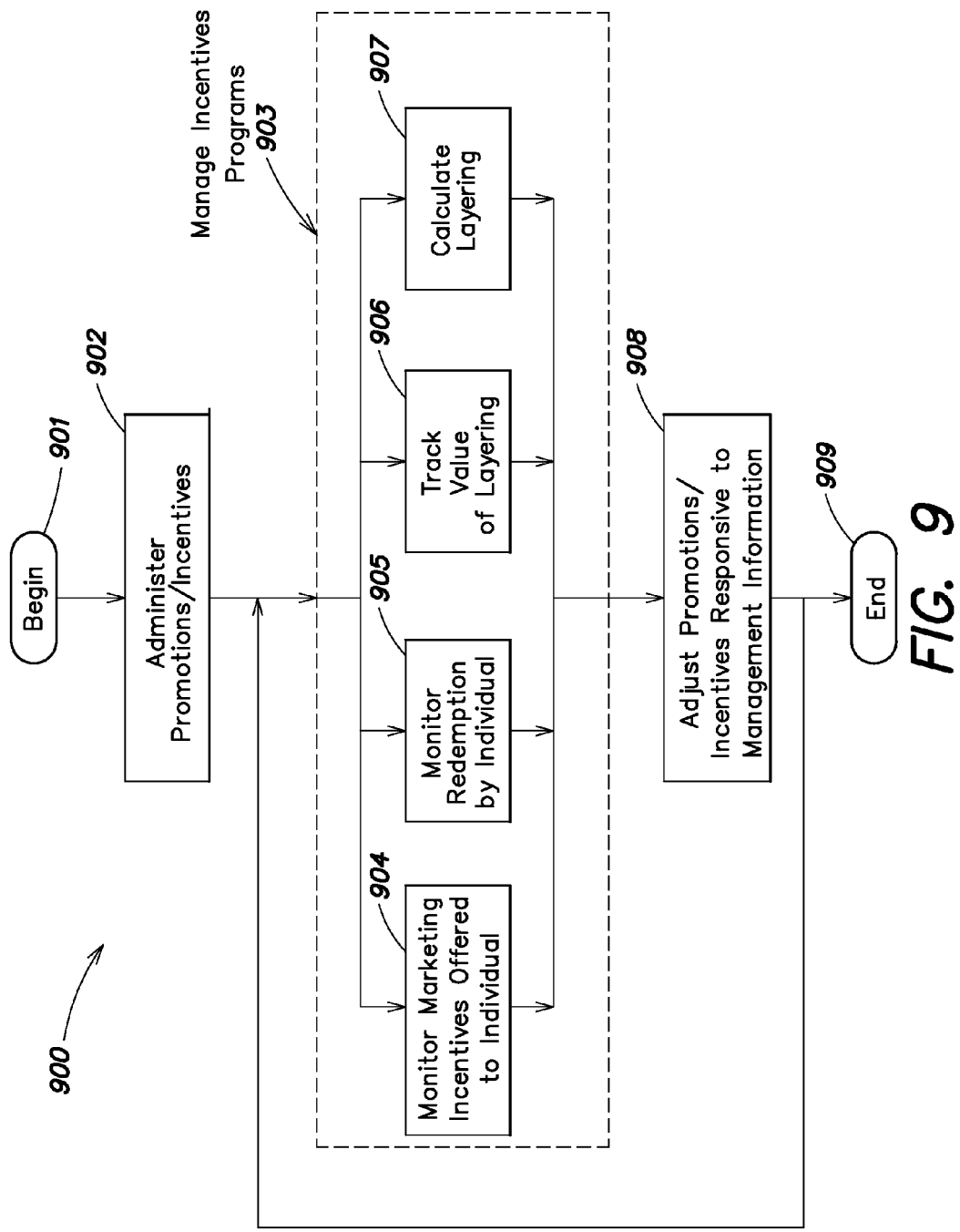
FIG. 9 shows a process for using scoring information according to one embodiment of the present invention.

According to one embodiment, the ecosystem may provide functions that permit an organization to administer complimentary offers, bonuses or any other amount of offers to a player in a strategic manner to optimize the spend performance of the player. As casinos compete for customers, their marketing campaigns become more sophisticated and the number of incentive programs available at any given time scales. Along with this, as casinos become bigger and more massive in scale, layering of individual incentives across divisions as well as across campaigns becomes increasingly regular. As casinos properties, promotions, coupons and other incentives become more sophisticated, there is a need for an analytical system that provides one or more of the following functions:

- Monitoring of multiple forms of promotions and marketing incentives being offered through multiple systems to any one particular individual.
- Calculation of overlap in time and value of incentives offered to any one particular individual
- Tracking of the redemption of those incentives
- Calculation of the amount of layering occurring across campaigns in relation to that individual Tracking and calculation of the value in increased layering and decreased layering To this end, one or more components of the ecosystem may be programmed to provide these various functions. For example, one or more components may be programmed to perform a process 900 as shown in FIG. 9. At block 901, process 900 begins. At block 902, an organization administers one or more promotions/incentives. For instance, such promotions may include, for example, one or more bonuses, complimentary offers, or other incentive programs. At block 903, an interface is provided to the organization that permits one or more management functions to be performed with respect to the incentives programs that are being administered as well and determining what additional incentives should be applied.

According to one embodiment, at block 904, a function may be provided that permits monitoring or tracking of all incentives that have been offered to the individual. In the case of a complex organization such as a casino having multiple properties and multiple campaigns, it may be useful to organize marketing to the individual, and to monitor and optimize incentives over time. Further, a capability may be provided that permits the redemption of incentives by the individual to be monitored (block 905). At block 906, the value of layering to the individual may be tracked and optimized based on the potential worth of the player. At block 907, the system may calculate a proper amount of layering to be applied to the individual to optimize their spend performance. For instance, if the player has not been contacted or made an offer in a certain amount of time, an appropriate offer may be made to the individual. Also, if a number of offers have been previously made, but the amount of those offers did not result in a conversion, the amount of future offers may be increased. Further, for those players whose potential value has decreased, or their theoretical spend is lower, the value of offers may be lowered as a result. Such adjustments in promotions or incentives may be made responsive to management information received regarding the player, their history, offer history, redemption history, among other information tracked within the ecosystem. At block 909, process 900 ends.

Advertising Network

Typical Internet advertising is based on search terms, site content, general demographics for website visitors, geolocation by IP address of the browsing computer and visitor activity within the site. All of these approaches may be based on the concept that the website displaying the advertising infers knowledge of the individual and their interests due to the anonymous nature of the website visit.

Some websites have overcome the anonymous nature of the Internet by providing access to content such as games only after the website visitor has provided personally identifiable information about themselves. The level of personally identifiable information required may vary among websites, but there is the added challenge of confirming the validity of the information provided. Many website visitors simply enter erroneous data or use pseudonyms and alternate information. Websites endeavor to make the content compelling and the value proposition strong enough so that visitors will enter the correct information, but in most cases short of entering credit card information to purchase goods or services, there is no validation of the information.

Aspects of the present invention address one or more these issues and expand the knowledge of the individual website visitor without requesting information such as credit card data that the individual might be reticent to give.

Most casino operators have implemented frequent player cards that are used to track individuals' play in the casino and to award complimentary offers for continued play. As an added feature of the player club, the members are provided electronic access to their point balances, win/loss statements, complimentary offers and other personalized data about their casino activity. This set of data provides a wealth of information about the player's activity that may not even be apparent to the player himself.

Additionally, because casinos continue to expand as entertainment venues that include wagering and non-wagering activities, the information gained from the player club information is ever expanding and includes data of value beyond the casino industry.

Furthermore, due to the ubiquitous nature of casinos, most casino patrons are members of multiple player clubs. Combining the player club information from various casino operators for an individual gives a holistic view of the patron that contains valuable information and insight into the patron's gaming activities, finances, entertainment choices, travel plans, big ticket purchases, etc.

Aspects of the present invention relate to soliciting individuals to provide their player card details for all casinos for which they are members of the player club. From that information, the system can automatically query the casino's player club database, either directly or through web services that are provided via the casino's website. Algorithms may be then used to correlate the information across the various casino operators and to develop an overall view of the patron.

Information that can be retrieved from the player/patron may include one or more of the following information relating to:
  demographic information
  point balances
  available offers
  win/loss statements
  casino visit recency and frequency
  average casino win per visit (known as Average Daily Theoretical)
  casino dining choices
  casino entertainment choices
  accepted/declined offers
  large wins
  casino play preferences
  play stop limits
  casino credit line
  links to other player club members
  behavioral data, such as website visits (e.g., to various interfaces to the ecosystem, other websites), games played (e.g., games offered in a free play setting), and other behavioral data Using such information across multiple casinos coupled with public data sources (e.g., using demographic info) and/or private data sources (e.g., Experian credit rating information), algorithms can be used to validate other user-provided data and develop holistic information about the patron such as:
  travel plans/affinities
  entertainment affinities
  financial status and median income
  value to other local casinos
  value to destination casinos
  overall gaming budgets, recency, frequency, intensity
  comparison to other patrons
  other aspects of the player/patron that would be of interest to other establishments such as financial institutions, automobile retailers, consumer goods providers, and other entities.

Interfaces and/or data may be provided to such entities to permit these entities to reach and/or target advertising to these player/patrons. Taking all this information into consideration, a profile of the individual patrons can be established, and website advertising, email marketing, direct marketing and telemarketing campaigns may be set up based on these profiles, the holistic data and the basic information. The campaigns may then be run by the website that solicits the player card information. Alternatively, the profile may be sold to the individual casinos (where the patron is a current or potential customer) for use on their website and marketing plans.

Although the holistic information on the patron could be used by all types of business and industries that utilize online and offline marketing campaigns, this information would be particularly valuable to the following industries:

casino
travel agencies
luxury goods
hotel
airlines
junket operators

Game-Based Play

According to another aspect, a method and system may be provided that allows qualified players in a game system to play games (e.g., play various single and multiplayer games of chance with real-time out come determination or predetermined outcome determination and single and multiplayer games of skill with real-time outcome determination), to win loyalty points and/or other gambling offers and/or alternate currencies to participating gambling establishments (e.g., casino, lottery or other lawful gambling establishments), and non-gambling establishments (e.g., airline, car rental, credit card, etc.) over an electronic medium or network where the end user apparatus is an electronic device (e.g., Computer, Mobile phone/PDA, Game Consoles, Digital Set-top box/Interactive TV, Handhelds). Such capabilities may be provided, for example, by a casino loyalty system (e.g., a CasinoLoyalty system as shown in FIG. 1), a consumer website for attracting potential casino patrons (e.g., a CasinoBonus system) or any other component of an ecosystem.

A qualified person (e.g., a gambling patron who is of age) may be either invited to join the system or finds the system by other methods. A qualified person, according to one embodiment, may be a person who is of age to participate in lawful games of skill and or chance and is a person who is or intends to be a member of a gambling establishment's (e.g., casino, lottery or other lawful gambling establishments) player loyalty club. A qualified player could be invited to join the system via a multitude of different methods including but not limited to an online ad, online search engine link, mobile device ad, direct mail solicitation, a commercial (e.g., as shown on television, radio, satellite radio/TV, movie theater commercial, elevator video message, etc.), in a gambling establishment message or sign, a billboard/outdoor signage, word of mouth, or by happenstance. Also, a qualified person may be, for instance, a person who is already a member of a player loyalty club, or has the requisite qualifications to become a member.

A qualified person may be allowed to access the system for free or required to pay a fee to access to the system or a combination of both. In the case where the player is required to pay to access the system, there may be many methods or business models that are commonly used. It should also be noted that the business models listed below are not necessarily the only ones possible. That said, the business methods or revenue models may include a "Try and Buy" model, a "Free Web Trial" model, subscription models, among other approaches.

The "Try and Buy" model may be the simplest model to understand, and is also the model historically associated with the Internet game industry. This model is also most similar to the shareware model that has been around for many years. Under this model, players may play a trial version of a game. Trial games are limited in some way, most commonly by time (a one-hour free trial is typical), but trial games may also be limited by features, by number of plays allowed, or by not allowing this game to be used to win something or by some other mechanism. Throughout play, the player is typically encouraged to purchase the full version of the game ("upsell"). In some variants of this model, the player may continue playing the feature limited version indefinitely, in others the player must sit through increasingly intrusive reminder notices that encourage the qualified person to purchase the game.

The Free Web Trial model is a variant on the "try and buy" model which includes offering a free web version of the game which can be played within a web browser. Web games can generally played over and over again, however they are typically very limited compared to the "deluxe" downloadable versions, with fewer features, less content, lower quality sounds and graphics, etc.

There are several types of subscription models in widespread use. For example, in the "All you can eat" model, the player pays a fixed amount per month in return for unlimited play of all games in the program. In one version of this model, the user must maintain the subscription in order to continue playing games. When the subscription ends the player's access to the games also ends.

Another subscription model includes the "Book of the month" model, in which the player pays a fixed amount each month in return for getting one (or more) games free. Additional games can generally be purchased at a discount.

In the "VIP membership" model, the player pays a fixed amount each month in return for special privileges. There may also be a "Pay-for-play/Ad Sponsored" hybrid model whereby a player inserts currency (cash or cash equivalents), tokens or sweepstakes entries into the game or the game system for each game play. One variant of this model is where advertisers, participating gambling establishments (e.g., casino, lottery or other lawful gambling establishments), and non-gambling establishments (e.g., airline, car rental, credit card, etc.) can buy the coins, tokens or sweepstakes entries and sponsor a game session that is then free for the players.

A "Tournament/skill-based" model involves qualified players paying a cash entry fee to enter a tournament and play a game. The tournament can be as small as two players, or as large as thousands of players. A player's score is posted on a leader board, and the winner (or, in larger tournaments, winners) receives currency (cash or cash equivalents like free slot play or chance to play for free in the gambling establishment), tokens, sweepstakes entries and or loyalty points to the various clubs to which they belong. In some instances, in order to be legal in the locations where such tournaments are offered, the games must be substantially skill-based, rather than relying on luck or chance; thus the name "skill-based" to refer to this economic model.

An "Item-Buy (micro transactions)" model is a model where players purchase items within the system. The items are typically electronic creations like badges, lucky charms and avatars.

According to one embodiment, to qualify as a player, the qualified person completes a registration form whereby he/she is requested to identify the gambling and non-gambling loyalty club(s) to which they belong and then input a unique key into a registration form for each loyalty club that he/she is a member. If they are not a member of a loyalty program and have the desire to be eligible to collect winnings, they can join the loyalty club(s) at that time.

For games that are chance based and require the player to initiate the wager, the system may only allow the player to wager currencies that are lawful (e.g., sweepstakes entries). For games that are substantially skill based, the system may allow the player to wager any of the lawful currencies that they have banked in their account.

On behalf of the qualified person, the system may confirm their membership in their declared loyalty clubs by accessing their declared account(s) or, if they are not a member but they wish to join a particular club, the system may create an account on their behalf.

Players can compete in various games and win currency (cash or cash equivalents like free slot play) and or loyalty points to the various clubs to which they belong. Some games may require an initial wager to gain entrance (see above) while others are free to access. Players can participate in non-gaming activities to earn currency (cash or cash equivalents like free slot play) and or loyalty points to the various clubs to which they belong. Examples of how to earn currencies may include the following:

Filling out player surveys
Viewing advertisements from third party advertisers or participating in gambling establishments (e.g., casino, lottery or other lawful gambling establishments), and non-gambling establishments activities either on property or over a network
Agreeing to receive emails or other communications from third party advertisers or participating gambling establishments (e.g., casino, lottery or other lawful gambling establishments), and non-gambling establishments
Customizing the player's user interface
Creating a home page/social networking page
Recruiting other qualified players to the system
Earning badges or other designations of success within the game system Through a set of application interfaces, participating gambling establishments (e.g., casino, lottery or other lawful gambling establishments), and non-gambling establishments can offer or stake prizes (e.g., sponsor the game or contest) for each game where the value of the prize is based on the qualified player's worth or perceived worth to the sponsor.

The qualified player may redeem prizes either online or at a physical establishment or they may barter, exchange, auction or give away their points. Through a set of application interfaces, participating gambling establishments (e.g., casino, lottery or other lawful gambling establishments) in the system can credit or deduct points, offers and or currencies based on how the player chooses to treat their prize.

The qualified player may set up a web page in a social networking environment and host their own gaming system whereby other qualified players can compete in the same manner as the larger game system. One difference in such a system is that the player who owns the page is staking the prizes or using the system tools to allow sponsors to stake the prizes.

Through a series of tools or application interfaces, the system can also allow the qualified player to group other willing qualified players together to diversify risk in a game in exchange for a share of any and all winnings from that game.

The system may also permit advertisers to reach the qualified or potential players of a casino, or display any other content. For instance, the system may have a website through which qualified players access, and ads may be displayed to such players (e.g., responsive to information collected regarding the players, their performance, their determined value, etc.). Other information displayed to players may include frequent player points leader boards that display top players that have earned frequent player points, and any other gameplay aspects. The system may also be adapted to display non-gameplay aspects related to the casino, such as locator information for gaming locations, player experiences/stories, chat with other players, and other content that enhances player experiences.

Further, multiplayer games could be provided that allow different advertisements/awards to be provided based on player location. For instance, a multiplayer game may have multiple sponsors based on geography, or other parameter (e.g., the player's profile). In another example, players countrywide are permitted to play a Bingo game, but winners in the Northeast region (or other location) are permitted to play slots at Mohegan Sun (a sponsor) while winners in the Las Vegas area are permitted to play slots at Harrah's Las Vegas.

Complimentary Offer System

As discussed, a system (e.g., a CompOffer system) may be provided that permits a player to receive complimentary offers. In one embodiment, these offers may be offers to the player to travel to or otherwise visit a gaming establishment. To this end, a website or other computer-based interface may be provided that may permit the player to solicit offers from multiple gaming establishments.

According to another aspect, an online system in which multiple gaming establishments compete for providing an entertainment package to the player based on rating information. In one example, a package could involve other providers, such as airlines, hotels, restaurants, etc. A package that is determined for a particular player could be based on rating of the player, either alone or in combination with other information collected on by the system. The value of the package may be determined based on one or more parameters of the player information.

According to one embodiment, the package offered to a player is a better package (e.g., of higher value) as establishments are competing for customers (and may have knowledge of each other, and the packages being offered). Also, the package offered is more accurate, as it could be based on more accurate rating information of the player as discussed above.

Further, the accuracy of the package offered is additionally increased, as it could be based at least in part on information provided by the player, including characteristics of desired destination, location, etc. (e.g., I am traveling to Las Vegas on Month, Day, and I like these types of games, etc.). Also, because the package is based on information provided by player, the package is more tailored to player desires, as conventional complimentary packages are typically determined based only on what the establishment determines as the package, not what the player wants. This contrasts to conventional promotions, which are determined based on what excess capacity the provider might have, rather than the parameters supplied by a person/player. Thus, according to one embodiment, a system may be provided that includes an interface that accepts player preferences, and based on those preferences, determines one or more complimentary offers to be presented.

Offers extended to players may also be rule-based, and may be determined by particular parameters (e.g., Extend offer to a listing of players traveling on these dates to location, of average rating greater than Y). Rules may be implemented by the system that can determine under what conditions offers are made on behalf of a gaming establishment or other organization. Further, the system may make available (e.g., through an interface, an API, or other method) certain searches/queries to gaming establishment. Such rule-based or search-related functions performed by the gaming establishment (instead of a potential player) may permit more effective marketing promotions (e.g., to raise business levels during slow periods, to move perishable inventory).

A set of interfaces may be provided that present to the user complimentary offers that can be accepted. Such offers may be determined automatically based upon the player information, what inventory is available, or a combination of both. There may be an associated set of interfaces for the organization(s) that provide(s) the offers, which may permit them to perform functions associated with managing offers. For instance, interface functions may permit the organizations to monitor, create, and modify offers provided to players. Organizations may also be provided tools that permit them to create unsolicited offers to the player, which can be presented in an interface of the complimentary offer system. Such unsolicited offers may be presented in various ways, including during a particular period of time when the offer is available, when the player viewing the complimentary offer system interface meets particular criteria, among other ways.

Further, the system may permit marketing to potential players in real-time. For instance, ads may be displayed to a player in a computer interface (e.g., in the display of a browser program) and may be based, at least in part, on information relating to the player. For instance, parameters collected from the player based on a complimentary offer that he/she wishes to receive may be used to determine one or more advertisements to be displayed to the player in the interface. Other information collected on the player (e.g., demographics information, behavioral data, etc.) may also be used to determine what advertisements should be displayed. Such advertisements may also serve as financial support for such a website, and revenue may be generated based on the advertising performance. Advertisers (e.g., through an advertising network as discussed above) may choose to target particular players (or classes of players) via a complimentary offer system and its associated interfaces.

Aspects of the present invention may be implemented, for instance, in one or more systems disclosed by way of example in U.S. patent application Ser. No. 11/841,754 entitled "METHOD AND APPARATUS FOR PROVIDING PLAYER INCENTIVES" filed Aug. 20, 2007, incorporated by reference herein in its entirety. Further, one or more aspects of the ecosystem may work with various aspects of incentives-based systems as described below. In particular, behavior of a player with one or more of the systems described below may be tracked and provided as inputs to a scoring engine associated with an ecosystem. Scoring results based on those inputs may be used to determine actions by the ecosystem, such as providing complimentary offers, bonuses, or other actions targeted to the player.

Incentives Awarded from Website Play

According to one embodiment of the invention, parameters are established by which persons are invited to play an electronic game at a website. Parameters may include, but are not limited to, terms of invitation, qualification, game play type, quantity and outcome schedule, required actions, time periods and redemptions. All invited persons may be grouped into a single category with shared parameters or various classes of persons may be created with each category given a specific set of parameters which may be different from parameters assigned to other categories.

According to one embodiment, invited persons that visit the website during a specified time period are allowed to play electronic games where awards may be earned and then redeemed at a gaming location within a specified time period.

For example, qualified persons are selected from a general list (e.g. white pages, third party email lists, direct mail lists), targeted lists (based on demographic, geographic, or economic criteria) or from the gambling location's frequent player database and invited to play an electronic game. As discussed above, one method of qualification may include determining a "score" for that person based on a number of inputs to a scoring engine. Based at least on that score, the player may receive a particular invitation.

Each invited person is assigned a quantity of game plays in which the outcome is predetermined, either for each individual game play or for a collective of multiple game plays, before that person is actually invited to play. Records indicating the quantity of games and their outcome are stored in a database and annotated to indicate the games are yet unplayed. Each record is linked to an identifier unique to the player to whom the games are assigned. In this example the identifier is the person's player tracking identifier. Next, the invitation is sent to the player, in this example via email or regular mail.

When the invited person visits the website, she identifies herself by entering her player tracking identifier which links the website game chosen by the person to her pre-assigned outcomes and those outcomes are revealed to the person as each game play concludes. The database record for that person is annotated to indicate each game that has been played. The person's performance of those games and their play behavior may be stored and used by an ecosystem and its associated scoring engine to determine a player's score with respect to one or more characteristics.

The person then visits a designated gambling location and redeems associated awards. If the award is game play credit, she may redeem at a gambling machine by inserting her player tracking card into the machine's card reader, after which the award is transferred to the gambling machine's credit meter, after which the person may use the credits to gamble.

If the award can not be redeemed as game credits at the machine directly, the person may visit a player club center and present identification, after which the award is manually or otherwise given. In other redemption alternatives the person may visit a redemption kiosk, a restaurant, a gift shop, a hotel representative or other place where the award may be redeemed.

Regardless of which manner of redemption is used, the database is annotated to indicate that the redemption was fulfilled so as to prevent multiple redemptions for one award. Further, the redemption may be tracked and reported to a layering management system as discussed above. Also, details of the redemption may be used by a scoring engine to determine an updated score of the player based on the redemption.

In another embodiment of the invention, qualified persons are separated into categories wherein each category may offer at least one parameter which is different in value from a parameter offered to persons in another category. This separation could be, according to one embodiment, performed using scoring information that reflects a persons' ADT or other characteristic.

As an example, a universe of players is divided, based upon historical play levels of each individual persons, into five categories. The highest tier, Tier 1, contains persons with an average daily theoretical loss, also known as Average Daily Theoretical or ADT, of at least $2,000. Tier 2 includes persons with an ADT of at least $1,200, while Tier 5 contains those persons with an ADT of at least $200. Tiers are not populated equally in this example, because far more persons reach the $200 ADT level than the number that reaches an ADT of $2,000.

The electronic games for all 5 tiers have possible outcomes of $100, $50, $25 and $0 but the likelihood of winning each specific award is different for each tier. Table 1 below indicates each award amount and its likelihood of occurrence for each tier. Of course, this is but one example of such a structure. It should be appreciated that, according to one aspect of the present invention, any number of tiers, and any number of persons per tier, and assignment of any number of outcome amounts with a probability of occurrence set to any desired value from 0% to 100% to each tier may be used. Further, other parameters may be included within such a table of category parameters and in any combination.

TABLE I

| Tier # | $100 | $50 | $25 | $0 |
|---|---|---|---|---|
| 1 | 30% | 50% | 15% | 5% |
| 2 | 20% | 50% | 20% | 10% |
| 3 | 10% | 40% | 30% | 20% |
| 4 | 10% | 30% | 30% | 30% |
| 5 | 1% | 25% | 44% | 30% |

In this example, each game outcome is determined by a random number generator, as is well known to those of skill in the art, which is selected as each game is played in accordance with the probabilities specified in parameters for the player's assigned category.

The awards of $100, $50 and $25 are paid as non-cashable credits, which are amounts of credit which may be gambled in a gambling location but may not be converted directly to cash. Awards won by wagering the non-cashable credits may be converted to cash or replayed in additional wagers.

Qualified persons are then invited to play electronic games on the Internet. The invitation may be extended through mail, email, personal invitation or other method.

Figure 12:
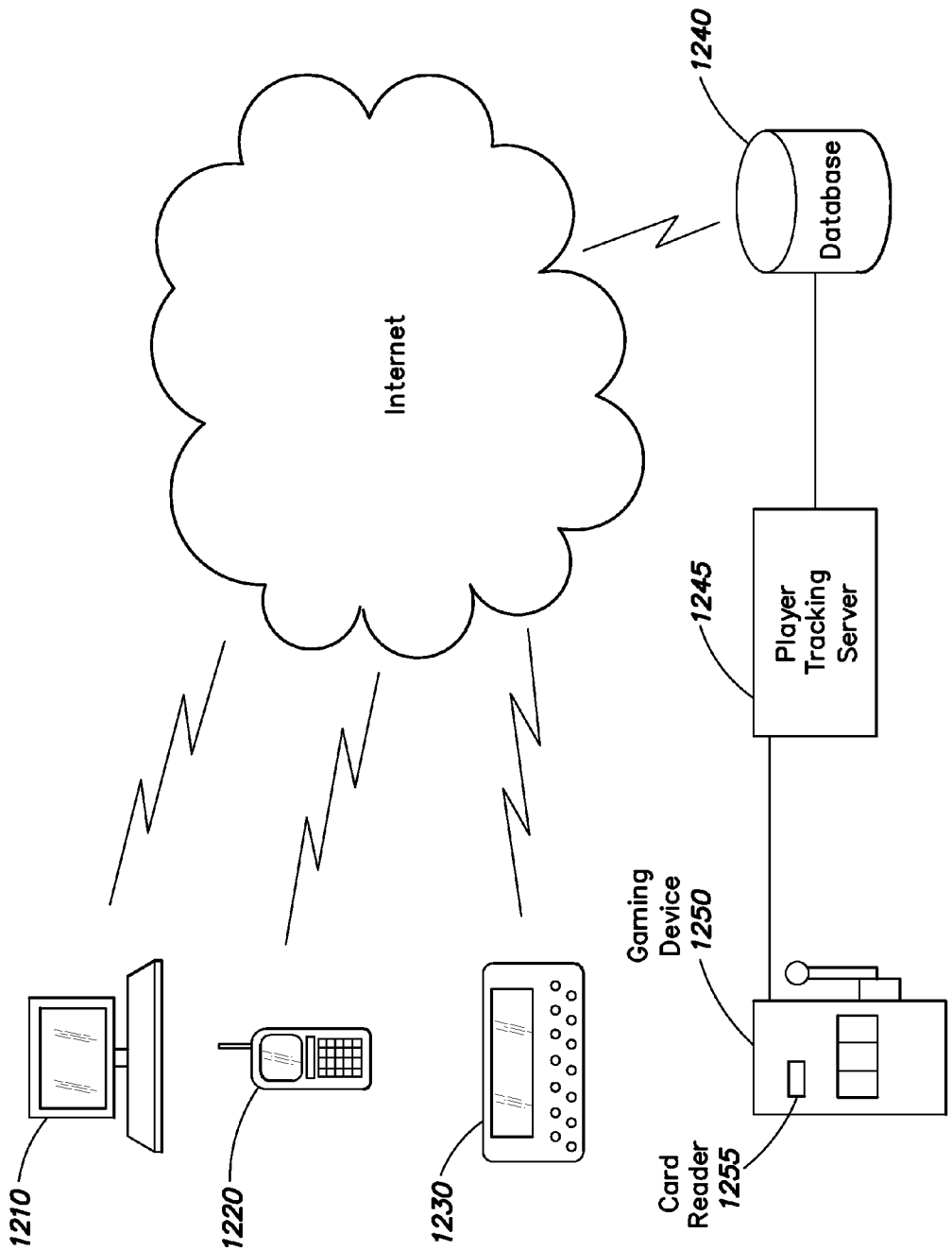
FIG. 12 shows an environment suitable for implementing various aspects of the present invention.

FIG. 12 shows an environment suitable for implementing various aspects of the present invention. As illustrated in FIG. 12, an invited person may then play electronic games at their home computer 1210, Internet enabled cell phone 1220 or other Internet device 1230. When the invited person first arrives at the website, she identifies herself by entering her player ID number, which is also assigned to the player tracking account at the gambling location. This identifier is used to index the player database 1240, where the person's electronic game parameters are stored in accordance to the category to which that person is qualified.

A small application program is downloaded to the person's computer, cell phone or other Internet-enabled device. This application randomly determines each electronic game's outcome according to the database parameters for that person. Award amounts from each outcome are stored in database 1240 along with annotations showing that an electronic game was completed. The person continues electronic game play until she exhausts her supply of electronic games, again according to parameters stored in database 1240.

To redeem the awards won, the player visits a designated gambling location and inserts her player tracking card into the card reader 1255 of any connected gambling device 1250. The gambling location's player tracking server 1260 reads the identity code from the inserted card and requests the identified person's award record from database 1240. The player tracking server then transfers the appropriate amount of non-cashable credit to the gambling device 1250, which makes said noncashable credits available for play. As each non-cashable credit is wagered, it is deducted from the award balance maintained on database 1240. According to one embodiment, when all non-cashable credits are exhausted, or time period parameters are exceeded, no additional non-cashable credit play is allowed.

As discussed above, various aspects of the present invention may be implemented within various environments. For example, instead of downloading an application to the person's computer, the game could be entirely resident on a server-based network. Further, the game could be accessed by the player through an interface such as the interface of the well-known Internet Explorer browser program or the well-known Firefox browser program available from Mozilla.

Figure 13A:
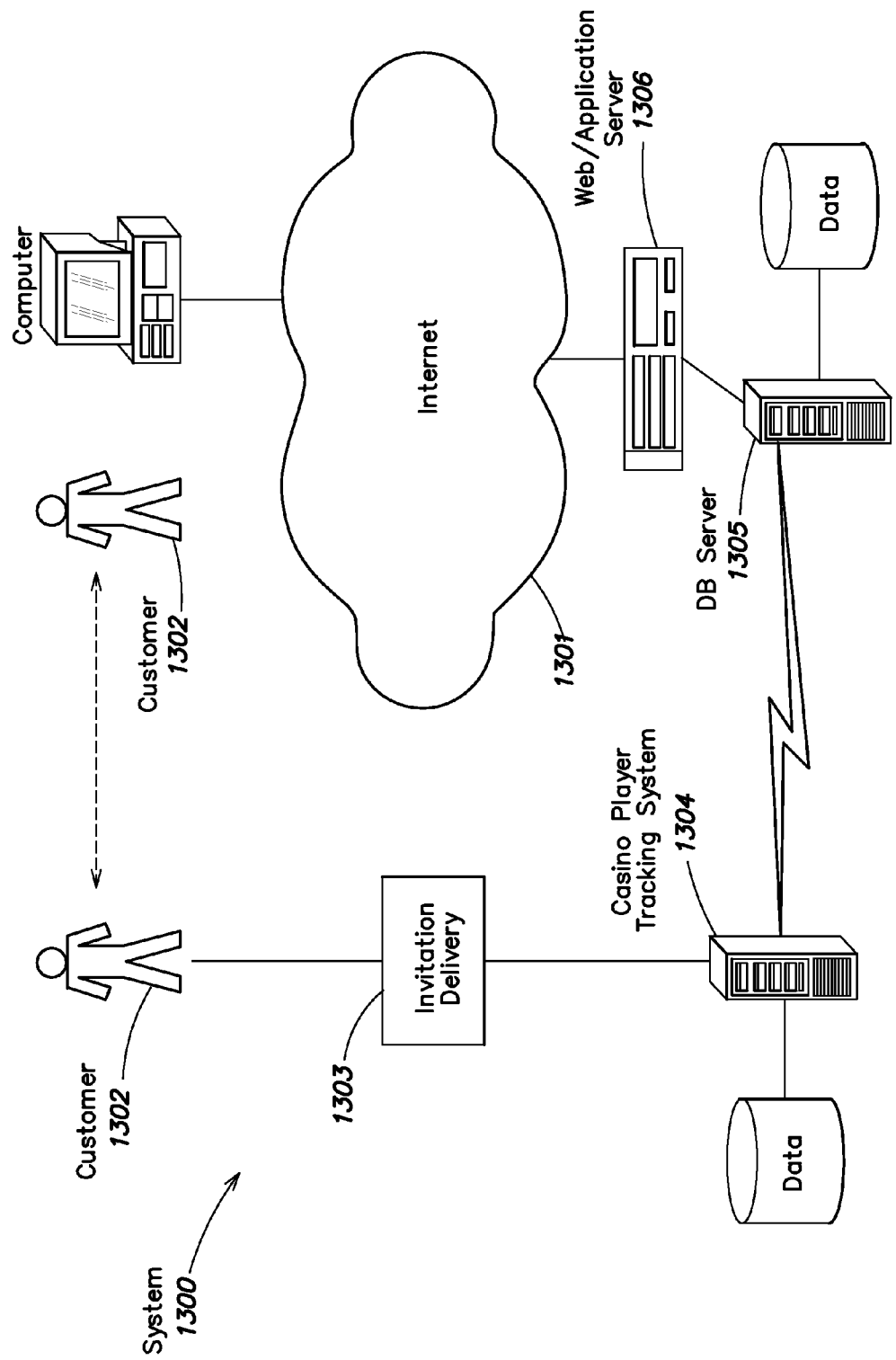
FIG. 13A shows another environment suitable for implementing various aspects of the present invention.

FIG. 13A shows another environment suitable for implementing various aspects of the present invention. In particular, FIG. 13A shows a distributed system 1300 in which a user or customer (item 1302) receives an invitation to play one or more electronic games. At block 1303, the system may deliver an invitation to the player. The invitation may be delivered using any of the methods previously described herein.

According to one embodiment, the player may receive an invitation to play the electronic game, and may play the electronic game on a computer (e.g., a personal computer (PC)). However, it should be appreciated that the user may access the electronic game on other types of computing systems, and the invention is not limited thereto.

As discussed, the user may play a game over a distributed network such as the Internet (item 1301). As discussed above with reference to FIG. 12, the game may be a web-based game that implements one or more server systems, such as web/application server 1306 and/or database server 1305. However, it should be appreciated that other types of Internet architectures may be used.

Further, according to one embodiment, the user that is provided the invitation may be identified in a player tracking system or another casino system. For instance, the user may be identified in a casino player tracking system 1304 as shown in FIG. 13A. Although player tracking systems are implemented in casinos, it should be appreciated that various aspects of the invention may be applied to player tracking systems implemented in other environments (e.g., slot parlors, racinos, amongst others).

Figure 13B:
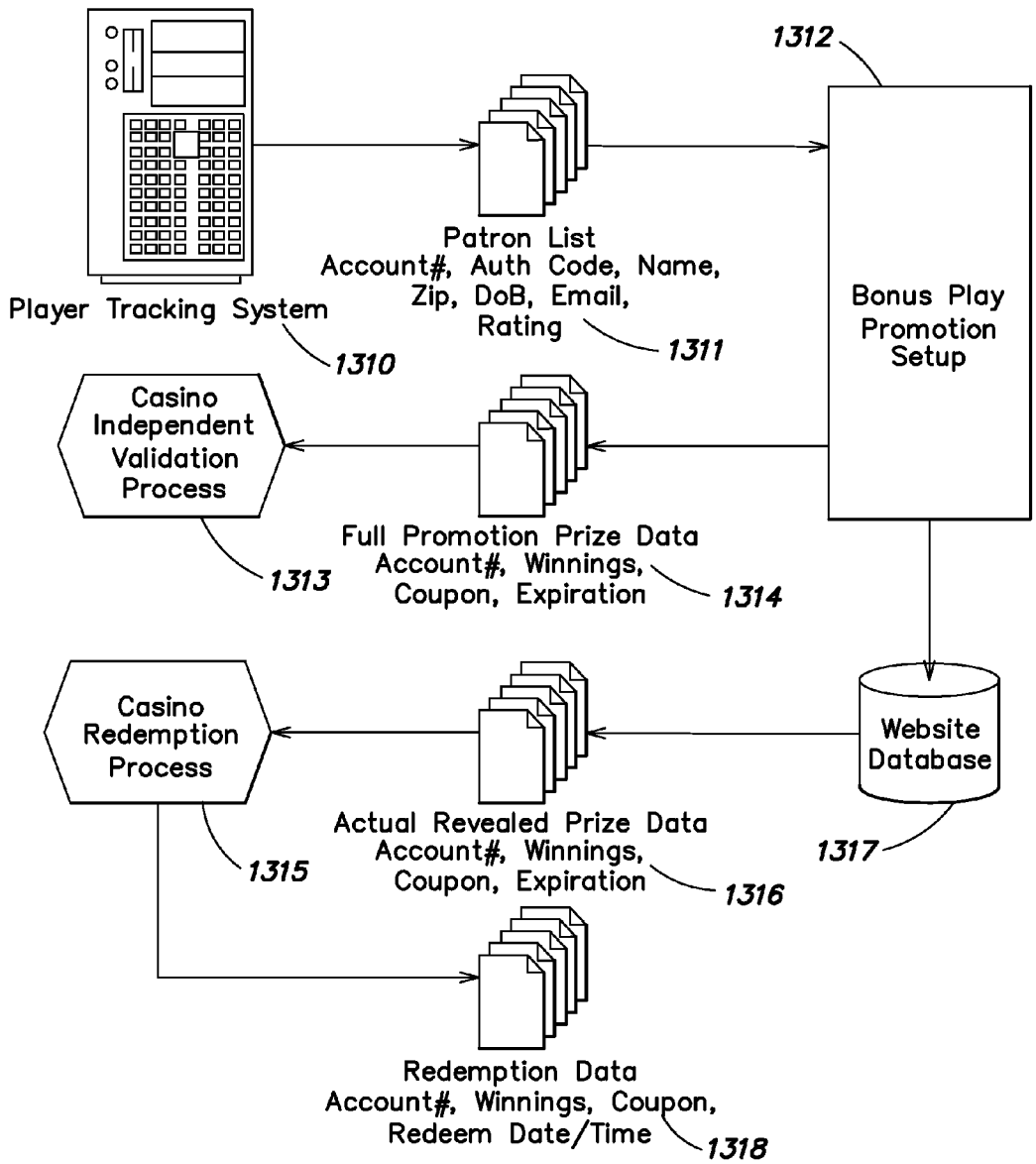
FIG. 13B shows one process for providing a player incentive according to another embodiment of the present invention.

FIG. 13B shows an example process for providing incentives according to one embodiment of the present invention. As shown, a player tracking system 410 may be used to conduct a promotion at a gambling location, such as a casino.

The promotion may be extended, for example, to players identified in a frequent player database or other list or data source. For instance, as shown in FIG. 13B, a patron list 1311 may be maintained which include an account number for the player (e.g., a frequent player identifier), the name of the player, information about the player (e.g., date of birth (DoB), email address) and any other information related to the player or determined by the casino about the player (e.g., the player rating, ranking, historical performance, etc.).

Based on the information maintained in patron list 1311 and/or any other information (e.g., action(s) taken by the player), a promotion (e.g., a bonus play promotion 1312) may be conducted that reviews the list 1311 and determines, based on the information relating to the players, a resulting promotion with associated prizes. As shown in FIG. 13B, prize data 1314 may be determined which associates the determined prize with the player. This could be accomplished, for example, by associating an identifier of the player (e.g., a player ID, frequent player account number, etc.) with a determined prize (or class of prizes) to be awarded to the player.

Prize data 1314 may include, for example, the account number of the player, any award or winnings associated with the promotion that are determined for the player (or class of prizes the player may win), a coupon or other code associated with the promotion, and expiration information (if any) associated with the promotion. Such data may be used to conduct a validation process by the gambling location (e.g., a casino) when such awards are redeemed by players.

Further, such prize data 1314 may be provided to an online game provider in order to conduct an online gaming experience. To this end, the casino may transmit or otherwise provide data 1314 to a Internet website system to be used to conduct the online experience. The website may store the data in a website database 1317. Thereafter, the player proceeds to play the online game.

As discussed, the award may either be predetermined, may be determined later through a sweepstakes or drawing, may be determined when the online experience is conducted, or at any time after the invitation is extended to the player. Actual revealed prize data 1316 may be maintained that tracks what prizes were awarded to which players. Such data may assist in the redemption and/or validation processes. Data 1316 may include, for example, the account number of the player, any actual awards or winnings determined for the player, and any coupon and/or expiration data associated with the promotion.

During or after the online game experience, the award may be revealed to the player, and the player is then required to return to the gambling location to redeem the award. At this point, a redemption process 1315 may be conducted (e.g., at the casino location). As a result of this process, redemption data 1318 may be generated which tracks the players who have redeemed their awards. Such data 1318 may include, for example, the player account information, the actual awards or winnings determined for the player, and any coupon data, and the redemption date and time.

As discussed above, based on an event that occurs (e.g., an action taken by the player, an occurrence with the gambling location, amongst others), an invitation may be generated and delivered to the user. As discussed further below, the invitation may be generated in response to an action.

Incentives Awarded Based on Specific Gambling Location Activity

According to another embodiment of the invention, the person must first take an action or participate in an activity at a gambling location or affiliated location in order to receive an invitation to play the electronic game. The action or activity can include, for example: wagering a proscribed amount of money, winning or losing a proscribed amount of money, activating a player club or frequent player account, reaching a bonus round on an electronic gaming machine, being awarded a mystery bonus from an electronic gaming machine, being present in the casino when another event occurs, playing specific casino games or electronic gaming machines, purchasing merchandise, attending an event, withdrawing money from a casino ATM, redeeming winnings, or any other action by a player. It should be appreciated that there is a wide range of ways that a person may take an action or participate in an activity at the gambling location or affiliated location, and such actions are contemplated for use with various embodiments.

The achievement of a qualifying action may be recorded automatically by a system such as a player tracking system, ATM machines, or gaming machines, or manually by casino personnel that observe the occurrence of the qualifying action or other method.

Invitations may be issued to qualifying persons by mail, email, personal invitation or other methods. Once a person receives an invitation, he/she may proceed to play electronic games and redeems any awards won, in the manner described above.

For example, a person wagering on a Wheel-of-Fortune slot machine may be provided an invitation when another person wagering at another Wheel-of-Fortune slot machine wins a spin of the wheel. In one example implementation, each time a wheel spin is won, all eligible Wheel-of-Fortune machines, being actively played, automatically issue an invitation for electronic game play. In this example, tickets may be printed by a ticket printer associated with the Wheel-of-Fortune gambling device, although it should be appreciated that the invitation may take other forms that may not be printed (e.g., an electronic invitation). Each printed ticket may include a code unique to that ticket. Among other parameters, the ticket code may directly or indirectly indicate the time, date, place, gambling device identifier and winning event that triggered the award.

The person holding the ticket may then visit a designated website where, after entering the invitation code, he/she is awarded a number of credits for electronic game play and presented with a list of electronic games on which she may spend the credits to play.

Each electronic game is associated with a pre-assigned category containing an award schedule and outcome probability. In one embodiment, some awards may be different for each category, and these awards may be assigned to all players of the category. Alternatively, each category could contain award values selected specifically for an individual person or a category of personal attributed. Other assignments (e.g., random) methods may be used that are alternative or used with the method discussed above. Credits are deducted for each game played and any awards won are accumulated in a record associated with the ticket or invitation identifier.

The person may be required to visit a designated gambling location and redeem the awards by presenting the same ticket or code used for electronic game play or a new ticket or code obtained after completion of electronic game play. As discussed, the player may be required to redeem the award at the casino or other gambling location, including any affiliated locations, such as, for example, a restaurant, gift shop, hotel, other gambling location or any other business affiliate of the gambling location. In one example, the coupon or code may entitle the holder to an amount of credit in one or more of the restaurants associated with the gambling location and the ticket or code is given as full or partial payment for a restaurant purchase. Other award/redemption combinations involving one or more gambling locations and affiliated locations are envisioned and are part of various aspects of the present invention.

In another embodiment of the invention, a person may initiate play at a specific website and win an outcome that may only be redeemed at a different website or a virtual world such as within Linden Lab's "Second Life" virtual world. A winning outcome there may require a person to then visit a specific place of business which may be a gambling site to redeem the outcome.

Purchase of Electronic Game Play

In another embodiment of the invention, qualified persons may purchase access to electronic games with outcomes that award prizes which may be redeemed in gambling locations, including any affiliated locations. For example, a person may pay $75 to access one or more electronic games where he can win awards of hotel stays, gambling currency, merchandise credit, or other prize. In a preferred embodiment, the player is guaranteed to win at least a minimum amount above the prize of entry. For example, by paying a $75 entry fee, a qualified person is guaranteed to win an award worth $125, though he could win even more.

Such prizes may be redeemed at a particular gambling location, affiliated location or group of gambling locations or affiliated locations. Other prizes may be redeemed at any gambling location or affiliated location. As discussed above and as used herein, the term "gambling location" should be construed generally to include any type of gambling location where wagering is permitted, including, but not limited to a land-based or other type of casino, a racetrack, racino, riverboat gambling, Internet gambling or any other environment can be placed.

The qualified person may elect to, or be required to, choose a specific gambling location, group of locations or affiliated location or groups of affiliated locations at which prizes will be redeemed before electronic game play begins. Alternately, qualified person may elect to, or be required to, choose a specific gambling location, group of locations, affiliated location or groups of affiliated locations at which prizes will be redeemed during electronic game play or after electronic game play is completed. In another embodiment of the invention, qualified persons may be allowed to begin electronic game play without cost but be required during, or after, game play to pay a fee.

One of skill in the art appreciates that collecting a fee from qualified persons makes a wider range of electronic game play economically feasible and realizes there are many possible permutations and combinations of when fees are paid, the value of prizes awarded and the locations at which prizes may be redeemed. All such permutations and combinations are useful within the scope of the invention.

Incentives Awarded in Multiple Steps

The process by which a person receives an invitation and/or redeems an outcome may include multiple interim steps of invitations and redemptions. In this case, the initial invitation process (as described in the section above describing incentives awarded from website play) may be initiated by the casino operator or as a result of an action taken at a gambling location or affiliated location (as described in the section above describing incentives awarded based on specific gambling location activity). In both these cases the process continues as described above, respectively. At the point where the electronic game is played, the outcome may include the invitation to play another electronic game or to take an action at a gambling location or affiliated location. At the point where the person is taking the action at the gambling location or affiliated location, the result may include the invitation to play another electronic game or to take another action, including an action to redeem an outcome. It should be appreciated that the processes and steps described in the selections above describing incentives awarded from website play and incentives awarded based on specific gambling location activity may be incorporated into this method, and in one example, are incorporated. It should be appreciated that the iterations could continue in a back-and-forth manner multiple times.

One aspect of the present invention relates to encouraging the person to continue to participate in the multiple, interim steps. In one example, the possible outcomes increase in value with subsequent iterations. The person may also be allowed to redeem an outcome at a certain point or to parlay that outcome for the chance to win something of higher value. Similarly, to encourage the person to continue to participate, there may be interim outcomes of value for the person to redeem that are additive to the final outcome.

Player Qualification Data Provided or Action Taken

A player may also be qualified to receive an invitation based upon data provided or actions taken in response to a separate invitation. The player may first be invited to play games for entertainment only (no redeemable outcomes). In order to play the games, the player would be required to register and provide personal information (name, address, date of birth, etc). From that personal information, the system would qualify the player for an invitation to play an electronic game which has a plurality of outcomes that could be redeemed at the gambling location or affiliated location.

The system could do this by comparing the personal information provided with a database of similar information. The database could include a correlation of demographic information with categories of player value to the gambling location. As an example, the system could utilize a database of median income by address to determine the potential value of the player. The system could also utilize algorithms to analyze the personal information to determine categories of player value to the gambling location. As an example, using an algorithm, the system could determine the distance between the gambling location and the player's home address. Players living closer to the gambling location may have a higher likelihood to visit the gambling location.

Further, as discussed above, data gathered regarding the player may be collected and provided to a scoring engine that compares the collected information with profiles created within the system. These profiles are associated with particular characteristics (e.g., propensity to gamble, theoretical ADT, etc.), and if the collected player data is more similar to a particular profile, then that player is more likely to have the particular characteristic to be measured.

The qualification of the player may also be based on actions taken while playing the games for entertainment only. As an example, players choosing to play specific electronic games (i.e. slot machines) may be considered more valuable to the gambling location. For those players, a different invitation with different possible outcomes may be provided. Qualifying actions could be based on games played, game strategies employed, or duration of play.

The first invitation is not limited to the play of electronic games for entertainment only. The invitation to take an action may be to sign up for a gambling location's frequent player card or any activity that solicits player personal information that could be used to estimate the player's value to the gambling location.

A qualification of the player may also be provided based upon gathered data, without the need for a player action. For instance, an invitation may be extended to the player based on player demographics without having the player play a game for pure entertainment. In one example, the player may be present to receive an award based on information collected about the player such as location or income level.

Player Qualification Indicators Other than Past Performance in a Gambling Location Introducing players with a propensity to enjoy the activity of gambling to gambling locations is a valuable action, particularly if that person has the financial means and time to gamble in significant volume. One aspect of the invention relates generally to estimating the worth of an untested person, or group of persons, by comparing their personal attributes or historical conduct with those of persons known to gamble at a particular volume. If the comparison yields enough matching characteristics, the untested person is considered to be qualified to receive inducements to gamble, so that a relationship between that person and a gambling location can be initiated.

The offered inducement may be the chance to play a game or electronic game. Alternatively, one embodiment of the invention includes an offer of inducement that does not involve playing a game or electronic game but that simply invites the person to visit the gambling location and is particularly valuable when the gambling location has no relationship or communication with the person, outside of this invitation. Finding qualified persons, especially those with a likelihood of enjoying the activity of gambling that have not visited, phoned or contacted the gambling location is a valuable benefit and the invitation alone may be sufficient inducement, or the person or persons may be offered an appearance fee, free or reduced airfare to travel to the location, free or reduced cost gambling at the location, free or reduced cost food, beverage, room or other such inducements, whether alone or in combination. It should be appreciated that there are many such inducements that may be offered, and all such inducements are anticipated as useful within the scope of the invention.

In one example, it is determined that persons with personally managed brokerage accounts often have an affinity for gambling. A list of persons with such brokerage accounts is obtained but it is too expensive to extend an attractive inducement to all members of that list because a significant portion of them do not have an affinity for gambling. However, it is believed that persons that reside in certain zip codes tend to have a greater amount of disposable income than the average of all people with qualifying brokerage accounts. A new list is created including only of those persons with a qualifying brokerage account that also live within one of the qualifying zip code areas and only those so qualified persons are offered the inducement.

One embodiment of the invention begins with a list of people that might have an affinity for gambling and then compares the persons on that list to one or more additional lists that also contain persons that might have an affinity for gambling. If the same person appears on two, or more lists, their likelihood of enjoying a gambling relationship with a gambling location is higher than for those appearing on a single list and therefore are more worthy of a particular inducement than the general population or persons that are members of fewer lists.

In another embodiment, a list of persons that currently do not play at a particular gambling location(s) is obtained. Invitations may be extended to them as a chance to play games on the Internet for prizes, at least some of which will incite the person to visit a gambling location. In one example, the games and prizes may be scaled according to a perceived value of player.

There are many other ways and methods by which to start with a list of people believed to have, as a group, a more likely affinity for gambling than the general population. There are many other ways to further qualify members of this initial list based upon other factors, to create a new list of people that will, on average, have a higher likelihood of an affinity for gambling in sufficient volume as to make them attractive candidate customers for gambling locations, and therefore worth the cost of providing an inducement in an effort to initiate a relationship between the person or persons and the gambling location.

Figure 10:
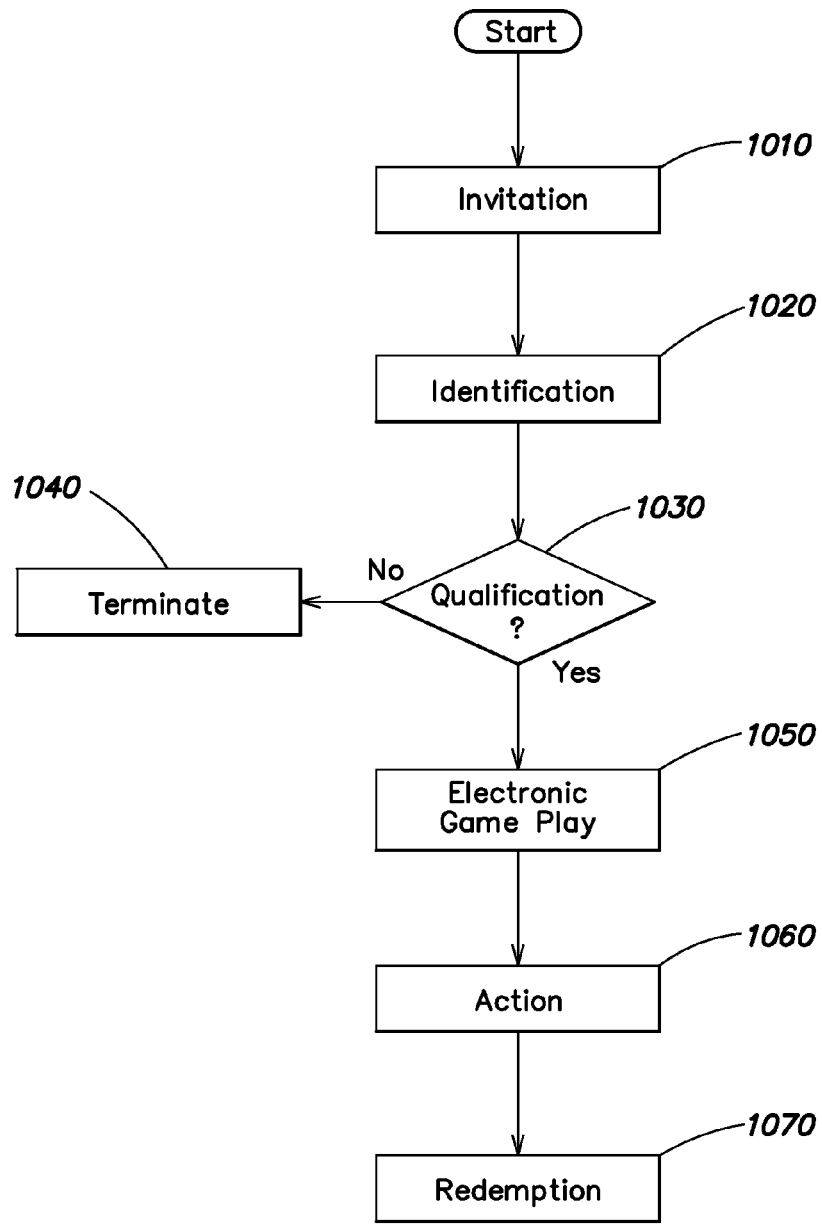
FIG. 10 shows a process for providing a player incentive according to one embodiment of the present invention.
Figure 11:
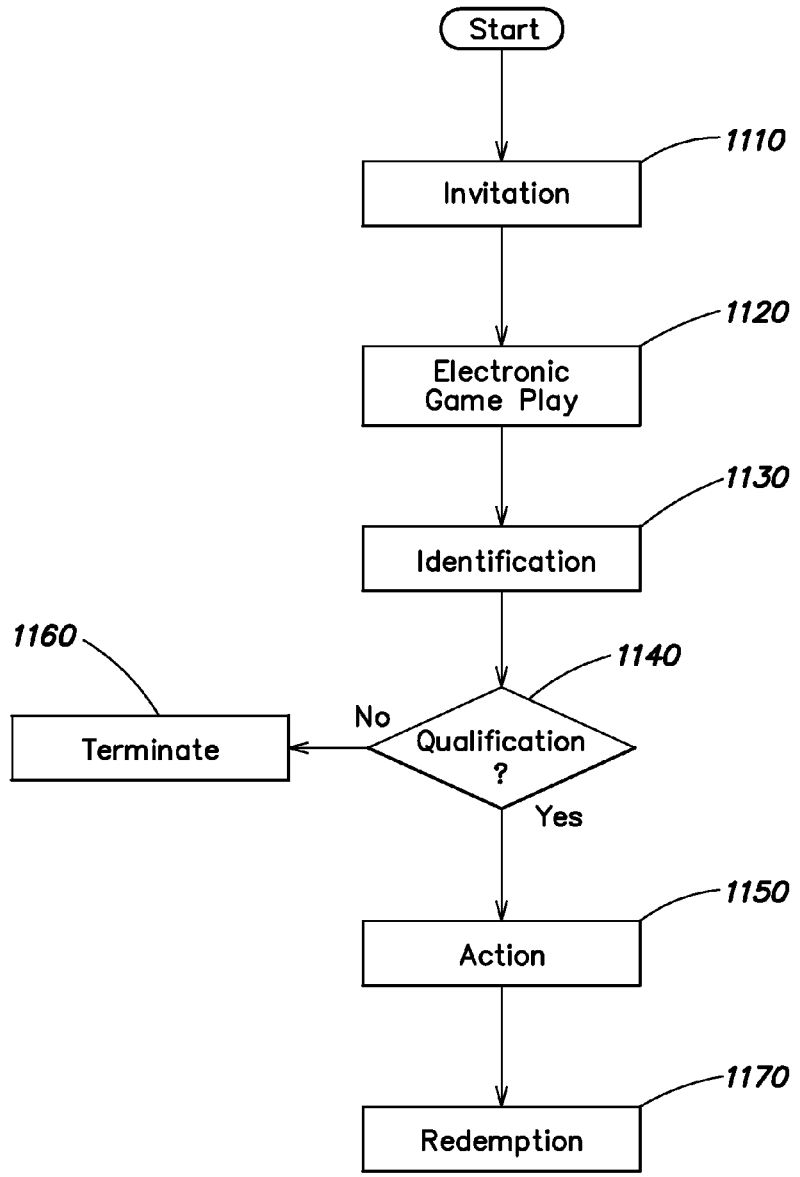
FIG. 11 shows a process for providing a player incentive according to another embodiment of the present invention.

In one embodiment, those qualified persons are invited to play a game using the structures outlined in FIGS. 10 and 11. Qualified persons of a given category may be provided different inducements than qualified persons of other categories. They may be offered a chance to participate in unique electronic games, the outcomes of which, determines the specific inducement offered. They may also or alternatively be offered a different set of game outcomes, different outcome award structures, different redemption opportunities or other differentiated offers in relationship to their category of qualification. It should be appreciated that there are many ways in which various aspects of the invention may be used to offer inducements based upon the category of qualification of a person or persons and the invention should not be limited to just the examples described herein.

Reveal-Based Gaming System Used to Provide Incentives

As discussed above, various aspects of the present invention may be implemented using an Internet-based computer system. One such system includes a reveal-based gaming system that may be used according to various embodiments, to provide additional incentive for a player to return to a gambling location. Such a system may be used to play one or more online games, which may be then used to incentivize a player to return to a gambling location (such as a casino). The game may be initiated by a player accessing a website by a gaming operator, after which the game may be played.

As discussed, the player may be invited to play the online game. Such an invitation may come from a direct mail invitation, email, website advertisement, issued ticket, coupon or other type of invitation. The invitation may, for example, include a code that permits the player to access the online game. The invitation may include any number of identifying information, including codes that may be associated with the player to which the invitation was extended. In some cases, there may not be a hard association of the invitation to the player (e.g., when advertising to a group of people), and the player when redeeming the invitation may be required to provide additional information identifying the player. Also, as discussed, the invitation may be sent responsive to a score determination, and play of the online game may be tracked and used to update a score of the player.

Figure 15:
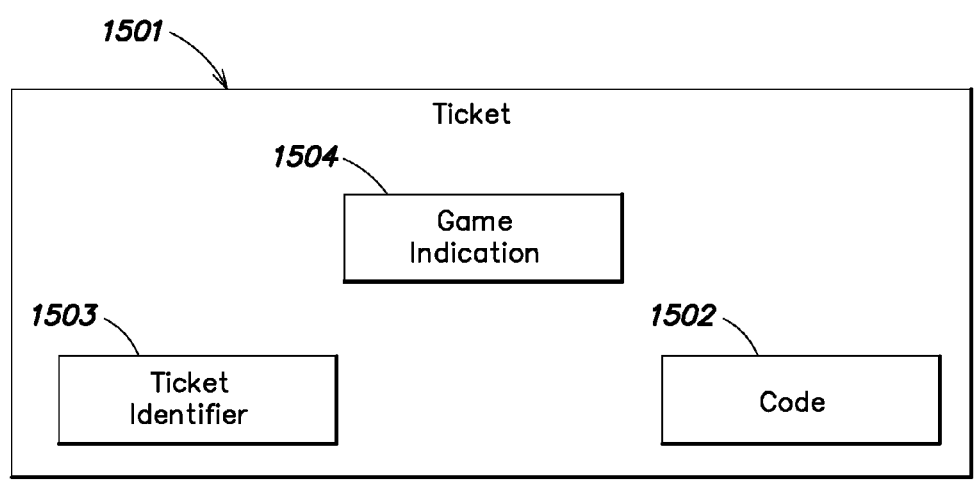
FIG. 15 is an example ticket that may be issued in association with a game according to one embodiment of the present invention.

FIG. 15 shows an example ticket 1501 that may be issued to a player, although it should be appreciated that an invitation may be extended to a player in other forms, and the invitation need not come in printed form. Rather, according to one aspect of the present invention, the player may need to be correlated to a particular invitation to permit the player to redeem any winnings, if awarded. Such a correlation may be effected using one or more codes, either printed or not, gaming pieces, any out-of-band messaging (e.g., a phone call) or other methods, and the invention is not limited to any particular form of an invitation unless explicitly recited in the claims.

In the case where the player is issued a scratch-type ticket, the player may scratch a surface of the ticket to reveal one or more indications. These indications may include, for example, a serial number of the ticket, an access code, or other indication (or combination thereof) that may be used to access the online game. Alternatively, the ticket may be a pull-tab ticket or other ticket type suitable for presenting indications to a player. In other embodiments, the player may be permitted to access a website to receive an invitation, may receive an e-mail, or may receive an invitation in a non-printed form as discussed above.

In the case where the ticket is printed, the ticket may include other indications (e.g., a decryption key or portion thereof as described above that may be used to decrypt game results). Also, the ticket may indicate to a player the number of plays of a second game (e.g., as played by the player on a computer system). For instance, in the case of a slot machine game, the ticket may indicate the number of spins that a player may be awarded by the ticket. In the case of a COLLAPSE-type game, the ticket may indicate the number of game instances (or plays) of the COLLAPSE-type game that can be played by the player. Further, as discussed above, the player may be permitted to play any one of a number of offered games, and the player may select different games to play to reveal results associated with game instances. For instance, the player may be permitted to play a number of different games, including, but not limited to games of chance, games of skill and chance, games of skill, casino games, card games, or any other type of game. In one embodiment, the player may be awarded during the online experience, an award which may be redeemed at the gambling or other redemption location (e.g., a POS location).

In one embodiment of the invention where a physical ticket is printed, ticket 1501 includes a code 1502 printed on a surface of the ticket that provides access to outcomes (e.g., prizes) stored on the server. As discussed, code 1502 may also include, as an optional feature to increase security, a key that may be used to decrypt the outcome. This outcome may be stored in a database stored on a server system. Ticket 1501 may also include a ticket identifier 1503 used to identify the ticket, and which may be used to identify the outcome associated with the ticket. Further, ticket 1501 may include a game indication 1504 that relates information relevant to a game played on a computer system. For example, there may also be stored, on the ticket, an identifier that indicates, to the player, the number of plays associated with an online game. In one example, a player is provided a ticket (e.g., for free) or otherwise purchases a ticket at a retailer or other POS location (e.g., in a casino). In the case where there is no physical ticket associated with the invitation, the invitation may itself have an identifier associated with the invitation. The invitation identifier may be unique to a particular player, or may be unique to a particular group of players to which the invitation is extended.

Figure 14:
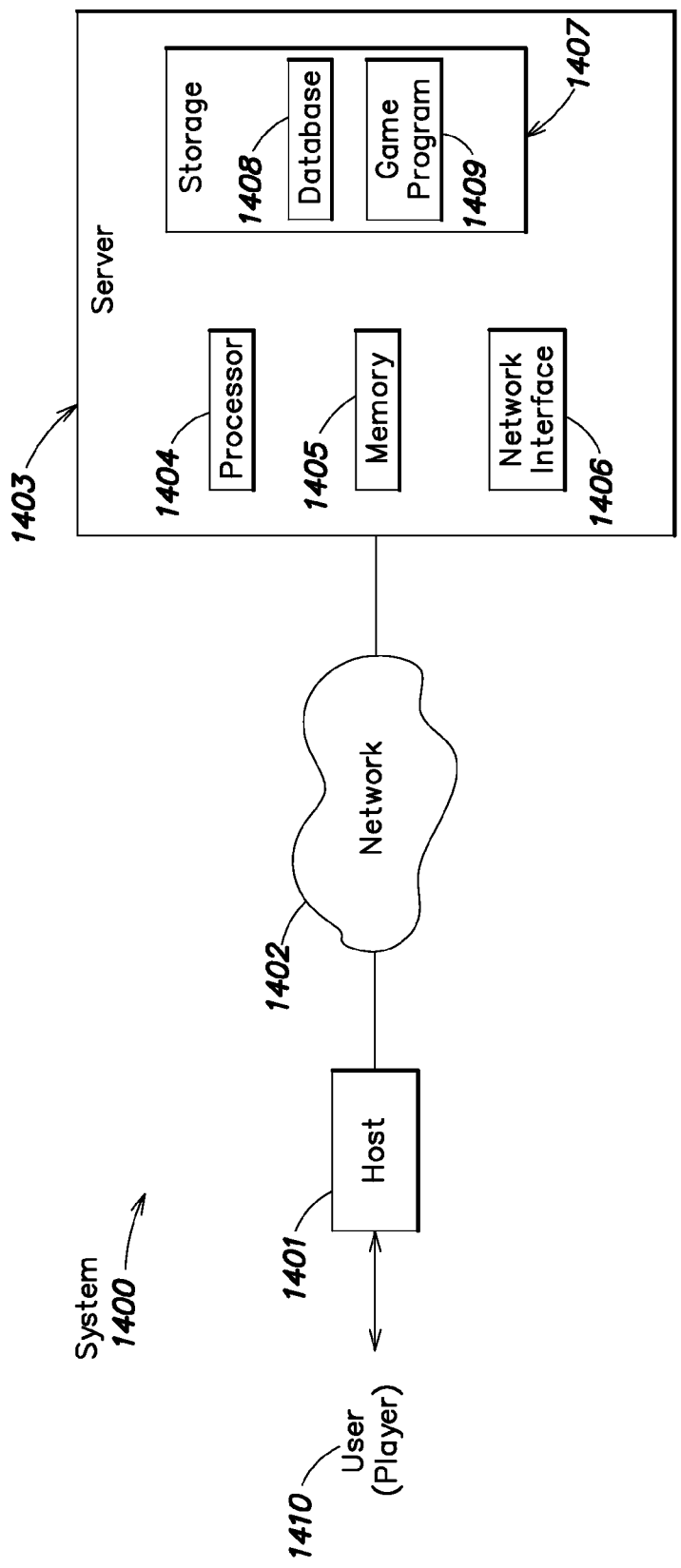
FIG. 14 is a block diagram of a system for conducting a game according to one embodiment of the present invention.

The player then proceeds to play a game on a computer system. FIG. 14 shows an example system 1400 according to one embodiment of the invention upon which a game may be played. The user (a player) 1410 plays a game through an interface of a host computer system (e.g. host 1401). Host 1401 may be any type of computer system that is capable of playing a game. The host may be, for example, a general-purpose computer system (e.g., a personal computer (PC)) that connects to a network (e.g., the Internet). Other general purpose computer system types (e.g., a PDA, a cell phone, set-top box, or other system type) may be used to play the game.

The computer system may be coupled to a server system 1403 through one or more communication networks 1402, including, but not limited to, the Internet. The server may provide a game program 1409 that is executed by host 1401 for playing the game. More particularly, game program 1409, when executed, may provide an online game that can be played by a user through an interface associated with host 1401. This online game may be, for example, a video slot machine, blackjack, or other online or casino-type game.

The game program may be stored, for example, in a computer-readable medium (e.g., a memory, storage, or other media) associated with server 1403 that provides game programs. For instance, the game program may be stored on a web server and downloaded to a client computer over the Internet. Game program 1409 may be one of a number of game programs associated with an online game experience. Different game programs may be selectively downloaded to the client, based on the type of game ticket issued, the game selected for play by the user, the type of client used, or other criteria.

Server 1403 may also be a general-purpose computer system, or any other type of computer system capable of authenticating tickets, providing game programs, and performing other game-related functions. Further, it should be appreciated that various game functions may be performed by one or more server systems. Server 1403 generally includes a processor 1404 for executing server-based game functions. Server 1403 may also include a memory 1405 for storing data associated with game programs. Server 1403 may also include one or more network interfaces 1406 that couple server 1403 to network 1402, which permit server 1403 to communicate with one or more hosts. Further, server 1403 may include one or more storage entities 1407, including disks or other media for storing data. In one embodiment, storage 1407 is adapted to store one or more game programs 1409 as discussed above. Server 1403 may have any number or type of processor that executes an operating system and one or more application programs. In one embodiment, server 1403 provides web server content to one or more clients for the purpose of accessing and playing the game.

Server 1403 may also include a database 1408 that is adapted to store one or more outcomes associated with a ticket or other gaming piece. As discussed, the outcome may be indexed using an identifier of the ticket.

Figure 16:
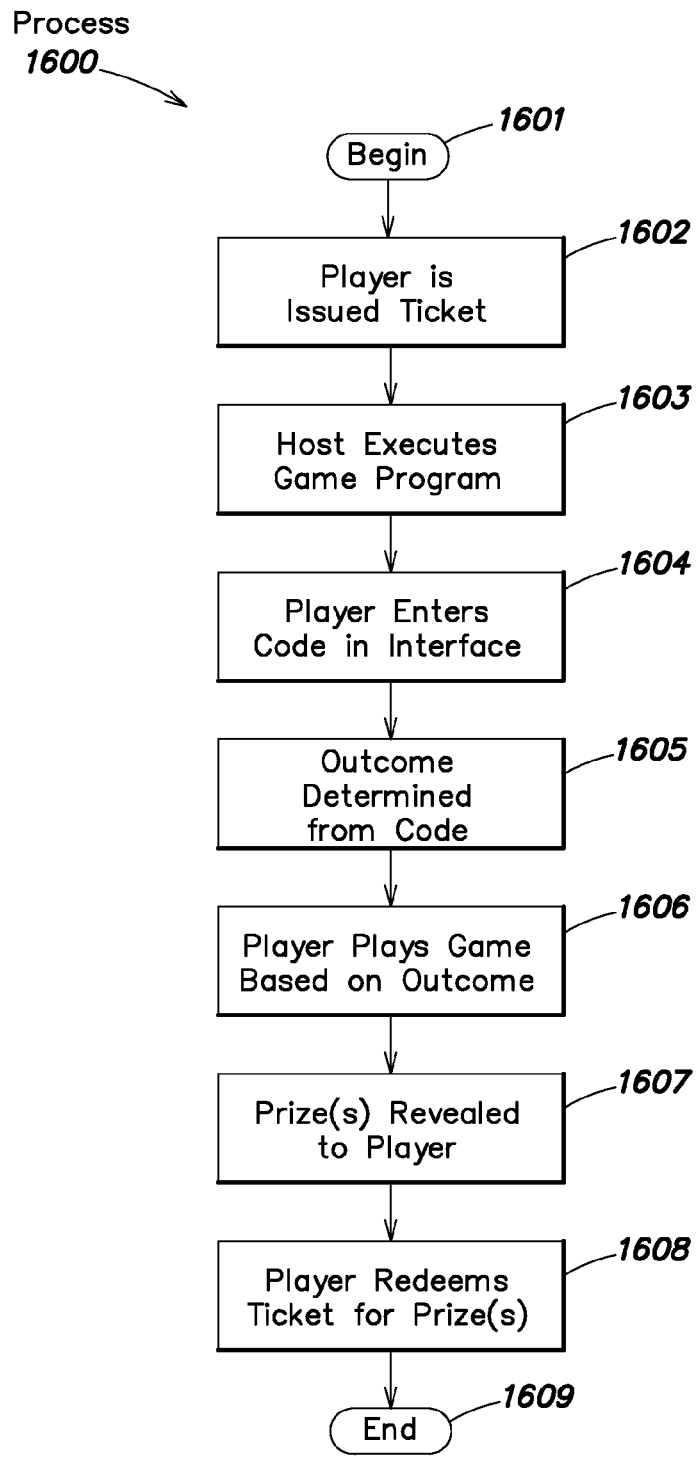
FIG. 16 is a flow chart of a process for conducting a game according to one embodiment of the present invention.

FIG. 16 shows one example process for conducting a game according to one embodiment of the present invention. At block 1601, process 1600 begins. At block 1602, a player is issued a ticket or is otherwise provided an invitation to play an online game (e.g., using any of the invitation methods described above). In one embodiment, a player may purchase or is otherwise provided a ticket at a retailer, casino, or other POS location. In another embodiment, the invitation is provided free of charge. As discussed, the invitation may be provided based on some qualification of the player.

At some later time and/or location, the player may play an online game on one or more computer systems (e.g., a PC or other computer system capable of playing games). For instance, at block 1603, a host computer system (e.g., host 1401) executes a game program. The game program may be, for example, an online game that includes one or more components downloaded over a communication network (e.g., the Internet).

As discussed, the ticket may include a code which is used to access the outcome of a game. This code may be printed on a face of the ticket as discussed above with reference to FIG. 15. In one example system, the player accesses a website that includes an interface in which the player may enter the code at block 1604. In the case where no physical ticket is issued, there may be other methods for associating a invitation to a particular player or group of players and an outcome of an award to be provided to the player and/or group of players.

This interface may be, for example, used to access the game, or may be any other interface (e.g., an interface used to access a download website used for downloading game software (e.g., game program 1409)). The interface may be programmed in one or more computer languages (e.g., an HTML, Java, Macromedia Flash, or other type interface) and may include a text entry box in which the player can input the code. The interface may include other ways of entering a code or other parameter (e.g., a glyph printed on a ticket) that allows the user to gain access to the game. It should be appreciated that the invention is not limited to any particular method for entering the code, or any format of the code, and that any type of code or method of entry may be used.

The player enters the code, and an outcome is determined at block 1605 based on the code. More particularly, there may be a mapping between the code printed on the ticket and an outcome stored on the server. This code may be stored, for example, in a database structure stored in database 1408 of the server. Database 1408 may be, for example, a relational database, object database, flat file database, or other organizational entities used to store and maintain data. Further a listing of winning codes may be furnished to an organization that provides the game (such as, for example, a state-run lottery commission, casino operator, etc.). The code may, as discussed above, include an optional decryption key that decrypts an entry stored on the server. This entry may indicate one or more outcomes of game instances.

The outcome of the game is then used by the online game to determine play of the game by the player at block 1606. For instance, if the stored outcome is "Win $50," the online game may present an outcome to the player that indicates that the player won a $50 prize. This presentation may be in the form of one or more reveals presented to the player while playing the online game at block 1607. The presentation may be progressive, in that the ultimate outcome (e.g., "Win $50") is achieved through a set of reveals or progressions through the online game. For example, in the case where a COLLAPSE-type game is played wherein items are collected for playing in a second level game, such reveal outcomes of each instance of the COLLAPSE-type game may be stored on the server.

As discussed, prizes may be distributed over game instances and/or items (or more generally, win opportunities) to maximize game interest and to entice the player to play each game instance associated with a particular ticket. For example, one approach may include providing to the player an early (relative in the series of game instances) indication of winning to keep the player interested. As the player plays more game instances, the magnitude of the prizes may be adjusted such that a level of game "drama" is increased. That is, prize values are adjusted among later game instances to provide relatively higher prize values in later games. Other approaches/distributions may be provided for increasing or maintaining game interest.

Once played, the player may redeem the ticket at the point of sale or other redemption location (e.g., a gambling location such as a casino) at block 1608. Alternatively, the player may be permitted to redeem the ticket without playing the game. Redemption may be permitted, for example, after a predetermined time. For instance, the player may be permitted to redeem a ticket after a set time (e.g., 10 PM), a particular time period after ticket purchase (e.g., 24 hours) or other absolute or relative time. This may be the case for a Keno or lottery-based system, where a Keno or lottery result is made available at a set time after the ticket or other type of invitation was provided to the player. Alternatively, tickets may be redeemed immediately after they are provided to the player to entice the player to remain at the gambling location. According to one embodiment, the player may be permitted to redeem the ticket (and winning result) any time after accessing the game. At block 1609, process 1600 ends.

Payouts may be determined by a pay table associated with the game. The number of tickets may be determined a priori, and a pay table that determines payouts may be allocated to the tickets. This allocation may be determined, for example, by shuffling the pay table and allocating results to tickets. The following is an example of a pay table that may be used with a game according to one embodiment of the invention:
Number of Tickets Issued: 2000
Ticket Price: $5

TABLE II

Example Payout Table

| Number of Tickets | Payout |
|---|---|
| 1 | $100 |
| 700 | $10 |

TABLE II-continued

Example Payout Table

| Number of Tickets | Payout |
|---|---|
| 500 | $5 |
| 100 | $1 |
| 600 | $0 |

Game Operator Return: $300 (3%) – expenses

As shown in the example above, a certain number of tickets may be allocated as winning tickets having a particular payout (e.g., an outcome). Some tickets may have no payout associated with them, and some may only have a nominal payout (e.g., a small award amount, free ticket, etc.). A small number of tickets may include a large payout as compared to the magnitude of other payouts. It should be appreciated, however, that payouts are not limited to money, but other types of prizes may be awarded including merchandise, credit, loyalty points or any other representation of value. As discussed above, it is appreciated that it would be beneficial to provide a great enough reward to encourage the player to return to the gaming location. Thus, according to one embodiment, the player may be provided an appropriate award that properly incentivizes the player to redeem their award (and return to the gambling location).

The odds of winning may be the type of odds experienced in actual (rather than computer-based) games. Alternatively, the odds of winning may not necessarily be "natural" odds of winning any particular type of game, but rather, the odds may be adjusted to obtain the outcome desired (e.g., by the gaming operator). The odds of winning, number of winning tickets, amount of payout per ticket, or other payout parameter may be any amount or number, and the invention is not limited to any particular odds of winning, number of winning tickets, payout amount or type of payout. However, according to one embodiment, the overall odds of winning, amount and type of payout, etc. may be similar to a game previously approved by regulators (e.g., scratch ticket games, Keno, bingo, etc.) so that the use of an additional game to display an outcome associated with the previously-approved game is scrutinized much less by regulators, and as a result, the approval of the additional game is less burdensome. To this end, a system associated with the previously-approved game may provide ticket and outcome information to a system conducting an online game (e.g. server 1403).

The code stored on the server (e.g., server 1403) may be used to determine game play as played on the computer system. For instance, the game outcome may be "Win $50." In the case of a slot machine-type game, the ticket may indicate that the player receives 10 spins of the slot machine. The outcome of each spin may be predetermined, and the game may retrieve information from the server indicating a predetermined sequence of game play as discussed above. In the case of a slot machine-type game, the predetermined sequence may indicate the winnings associated with each of the spins. In the case of a COLLAPSE-type game, the outcome of each instance of the second level game may be stored on the server and retrieved prior to game play.

In another example, only the overall outcome is predetermined (e.g., the total winning associated with the ticket), and the sequence of game play may be determined when the game is played. In the example above where the player is indicated as winning $50 over 10 spins, the $50 winnings (and any intermediate losses) may be allocated to the player at any point over the 10 spins. In the case of the COLLAPSE-type game, winnings may be allocated across game instances. In a further example, winnings may be allocated across items collected while playing the COLLAPSE-type game. Because the number of items collected may vary depending on the skill of the player, the distribution of prizes among collected items may be determined during game play by the game playing system. Thus, according to one embodiment, the player's skill (or lack thereof) does not affect the overall outcome of the game.

This allocation may be determined by the server, the game software executing on the client, or a combination thereof. Further, the game play may be randomized in that a further play using the same ticket may yield a different sequence of game states leading to the same outcome. For example, in the case of a slot machine game as described above, a player may be indicated as winning $50, but the sequence by which the player attains the $50 winning outcome may be different depending on various factors. Such factors may include a randomization function that determines results of individual game plays (e.g., in the case of a series of "spins," the result of each spin), or some other function. The series of intermediate outcomes may be stored in a database associated with the server as discussed above with respect to game outcomes. Also, the outcomes may be adjusted using a formula or rule-based approach during execution of the game to increase the game drama and heighten the game playing experience.

According to another aspect of the present invention, a player may purchase a ticket at a point of purchase (e.g., a convenience store) and the indication of a win/no win condition of the ticket is revealed on a different medium. For instance, a player purchases a scratch ticket in a convenience or other type of store. The prize that the player wins is not revealed on the scratch card itself, but rather the prize is revealed through another medium (e.g., on a home computer system, PDA, cell phone, etc.).

For instance, as discussed above, the player may be presented another game (e.g., a slot machine or COLLAPSE-type game as described above) that reveals at least a portion of the prize. The underlying prizes available via the reveals may be predetermined, in that the outcome of the game may be stored in one or more systems. The scratch ticket may reveal different numbers of plays (e.g., pulls in the case of a slot-machine type game, or game instances of a COLLAPSE-type game) the player receives. As discussed, the game could be any type of game, and the type and number of plays may be any number and may be selected according to the type of online game being played.

In one aspect of the present invention wherein a physical ticket is issued, the ticket may include authentication information that is used to obtain the reveals. In one example, the scratch ticket contains a secret key which is used to decrypt the results that are revealed to the player. That is, according to one aspect, it is impossible to determine if and what a particular ticket wins without having possession of the ticket (and therefore the secret key). In another example, the scratch ticket could contain only a portion of the secret key. The other portion of the key may be stored, for example, on a server and retrieved from a database (e.g., file, relational database, etc.) based on, for example, the serial number of the card. Mappings of serial numbers of tickets to encrypted results can be provided to the lottery, casino, or other provider for additional audit control.

Figure 17:
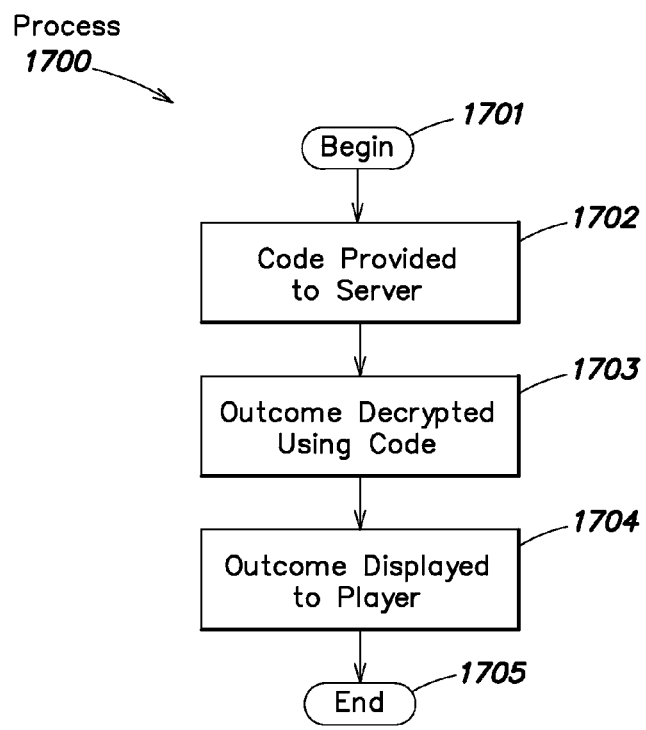
FIG. 17 is a flow chart of a process for conducting a game according to another embodiment of the present invention.

A process for performing secure access to outcomes is shown in FIG. 17. At block 1701, process 1700 begins. A server (e.g., server 1403) may store a number of outcomes in encrypted form, each of which outcomes can be accessed by a respective code. These outcomes may be encrypted, for example, using any encryption method (e.g., symmetric, asymmetric encryption) as is known in the art. At block 1702, a code is provided to the server (e.g., server 1403).

This code may be, for example, a secret code (e.g., a symmetric key, a private key) printed on a ticket and provided to the server by a user through an interface of a computer system as discussed above. The received code may be transmitted between systems using a secure transmission method (e.g., SSL) as is known in the art. The received code is used at block 1703 to decrypt the outcome stored on the server. This code may be any decryption key type that may be used to decode data, and may be of any format or length. The decrypted outcome may then be presented to a player at block 1705. The outcome may be displayed using any method. For example, as discussed above, the outcome may be presented through one or more reveals presented to the player during play of an online game. At block 1705, process 1700 ends.

Another aspect of the present invention relates to a lottery-based, casino-based, or any other type of software game that can be played over a network, such as the Internet. According to one embodiment, the system includes a purchase of a scratch-based or printed ticket by a player at a point of service (POS). A POS may be, for example, a place at which lottery tickets may be sold, including convenience stores or other locations where lottery products are provided. In an alternative system provided at a casino or other gaming establishment, a ticket may be sold to a player at the casino for play at a later time. In yet another embodiment, the ticket or other invitation type need not be purchased. Also as discussed, the invitation need not be printed and according to another embodiment, may be provided to the player with or without purchase.

The player receives the ticket or other form of invitation at the POS or other location (e.g., a casino), and proceeds to play a computer-based game at another location to reveal a result (or outcome) of the game. The computer-based game may be, for example, a casino-type game (e.g. slot machine, video poker) or other type of game, including amusement games or games of chance. In the case of the scratch or printed ticket, the result is not apparent to the player until the player plays the computer-based game. This game may be, for example, a software program that is downloaded and played over the Internet. Alternatively, other ways of accessing the online portion of the game may be used (e.g., PDA, cell phone or other method).

The ticket includes a code by which a player gains access to a result stored on a server that stores ticket information and results associated with each ticket. Such information may be predetermined at the time of ticket sale, or the results may not be known until a later time, after the ticket is issued to the player (e.g., in the case of a Keno, bingo, or other drawing-based system). The result may be determined by any number of factors, including but not limited to, data regarding the player (e.g., income, residence, etc.), the player's historical play at a gambling location, the player's play performance in an online game, or any other criteria that may be used to determine an award.

According to one embodiment, the code is an access key (or a portion thereof) that is used to access the result stored on the server. Further, the result (stored in the server) may be encrypted. For example, the code may be a private key or a symmetric key. The key may be transmitted by a client computer system to the server for the purpose of decrypting the result using SSL or any other secure method.

Because the decryption key is stored on the ticket, the gaming system is safer, as a breach of security of either the tickets or the server does not provide access to result information. More particularly, access to the lottery ticket database or other database type may not be accomplished without the ticket (used to decrypt the result). Further, the tickets may not be correlated to results without the lottery ticket database (because the results are stored in the database, not on the tickets).

In another example of the system, a portion of the key used to decrypt results of the game is stored on the ticket, and another portion is stored in the database of the server. In this manner, it is assured that possession of either portion of the key may not compromise the results.

However, it should be appreciated that the system does not require SSL or any other encryption/decryption method, a decryption key on the ticket, or the stored result on the server to be encrypted. Rather, the game can be implemented with or without these features. That is, access to the outcome stored at the server may be performed using only the serial number or other ticket identifier provided on the ticket or with the invitation.

The scratch-based or printed ticket may also include a second serial number or other identifier (e.g., an access code) in addition to the serial number or other identifier which is correlated to results on the server. A ticket may include both a serial number and a ticket identifier used by the system. According to one embodiment, it is appreciated that there may be security issues with using the serial number of a printed ticket (as printed on the ticket) to correlate to win outcomes. That is, in the case of a lottery-based system, the lottery provider may not allow any entity outside of the lottery system to have the ability to correlate outcomes to serial numbers. To this end, another identifier (e.g., a separate ticket identifier or access code) may be provided on a ticket to allow the system to index into an outcome database.

In one example system that works in association with a lottery system, outcomes for a game may be predetermined to comply with lottery rules. In this case, outcomes are predetermined and stored in a database. In an alternative environment where results are not permitted to be predetermined (e.g., in a casino), but rather are determined at a later time (e.g., by a drawing or other method), a ticket issued by a system in such an environment may have an associated drawing time when a game may be played. It should be appreciated however, that the award provided to a player may either be predetermined or not, and if not predetermined, may be the result of some later determination, such as a drawing, the result of a random number generator, etc.

Also, according to one embodiment, the player may be entered into a sweepstake or any other later-determined award based on an action that is performed in the gambling location. As discussed, the player may swipe his/her frequent player program number at a gambling location (e.g., a casino) and as a result, be entered into a sweepstake or other type of later-determined result. The result may be then later-determined (e.g., when the player participates in an online gaming environment), is presented the result of the sweepstakes which includes an award that may be redeemed upon return of the player to the gambling location.

In the specific case where the online game system is driven by a Keno game result, each ticket may be associated with a set of numbers in the Keno game, and the result of the Keno game is provided as the result for the online game. In one example, a computer system automatically picks numbers associated with the ticket at the point when the ticket is issued. Thereafter, when the Keno game occurs, the result of the Keno draw is provided to an online game system, which translates the Keno result to a game experience within another game (e.g., COLLAPSE, slot machine, etc.). It should be appreciated, however, that although the game of Keno may be used to drive an online game experience, other games (e.g., bingo) may be used.

The server (e.g., server 1403) may be capable of accepting, from the user, an input of the serial number and decryption key, and in response, providing the results associated with the particular ticket. The result or outcome of the game may be displayed to the player in an interface of the computer system (e.g., a client computer system such as a personal computer (PC)) used to play the computer-based game. For example, the outcome of a series of plays associated with the ticket may be stored in the server, and provided to the client, and the series of outcomes may be presented to the player during play of the computer-based game.

In another embodiment of the system, a payout of the ticket may be encoded on the ticket. For instance, if the ticket is a $5 winner, the amount of the win may be encoded on the ticket. In the case of the casino-based version of the system, the payout may not be stored on the ticket (as the payout is not predetermined), but rather the purchase price of the ticket may be stored on the ticket, or some other identifier of the ticket.

Figure 18:
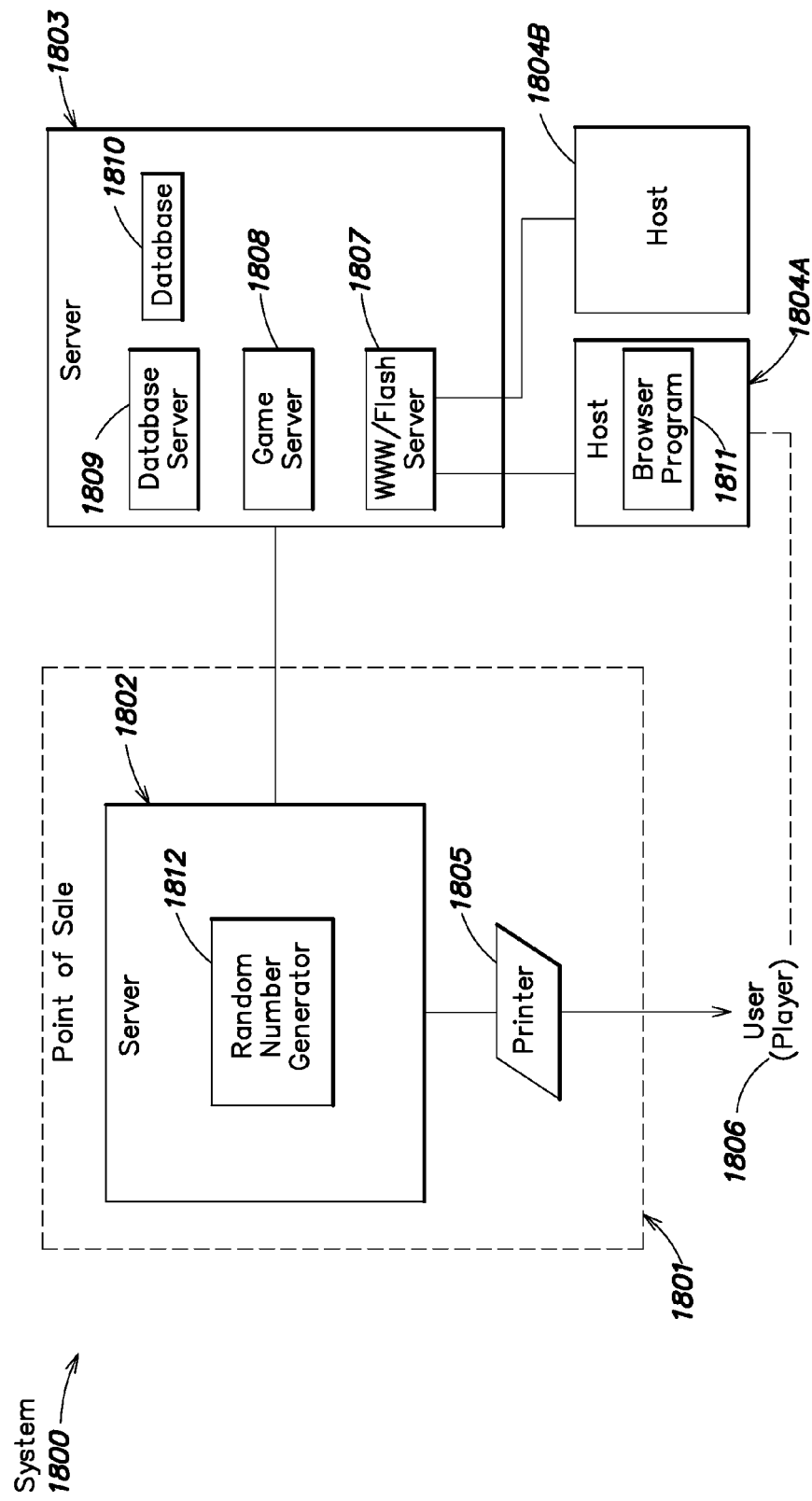
FIG. 18 is a system for conducting a game according to according to one embodiment of the present invention.

As shown in FIG. 18, a system 1800 may be provided having more than one server. For instance, a server 1802 provided at the point of sale 1801 is primarily responsible with issuing tickets to a user/player 1806. To this end, server 1802 may issue preprinted tickets or may issue tickets printed from an associated printer 1805. Such tickets may include one or more identifiers as discussed above with reference to FIG. 15. As discussed, another system such as a Keno or lottery-based system may be used to provide results to an online game system.

In one version of system 1800, the win/loss determination of a ticket may be driven by a later-occurring drawing. For example, a Keno-based, bingo-based, or other type lottery draw system may be used wherein the outcome of a particular game is not known until a future time (e.g., when a drawing occurs). In this case, the ticket identifier stored on the ticket may be an access code generated from ticket identifiers in the Keno-based system (e.g., by an intermediate system or the Keno server itself that can translate a Keno ticket identifier into another type of identifier).

Generation of an identifier separate from the Keno ticket identifier may be necessary for security reasons relating to the Keno system. More particularly, access to the Keno ticket identifiers may not be permitted by the system (e.g., the Keno server). In one example, a Keno system translates Keno ticket identifiers into access codes and results that are stored on the game server (e.g., server 1803). Thereafter, clients (e.g., hosts 1804A, 1804B) access results stored on the server based on their respective access codes.

As discussed above, one or more hosts 1804A, 1804B (e.g., general purpose computer systems) may communicate with a server 1803 over a network for the purpose of conducting a game. In one example, a host 1804A renders a browser window by executing a browser program (e.g., the Internet Explorer browser program available from the Microsoft Corporation). A user/player 1806 enters a URL address specified by an issued ticket in a window of the browser interface, and is directed to a website associated with server 1803. This website may be rendered by, for example, a WWW server process (e.g., server 1807) associated with server 1803.

Player 1806 may be instructed to enter an access code (and/or any other required information) to access one or more games in an interface presented through the browser. As discussed, server 1803 may validate the received access code, and provide any results stored in a database associated with server 1810. Once validated by server 1803, the user may be permitted to play one or more games. These game may be, for example, be programmed using one or more programming languages (e.g., Macromedia Flash) and may be downloaded to host 1804A and executed.

Also, outcomes associated with any games may be downloaded prior to game play. As discussed, examples of games include those that may be of the lottery-type (e.g., having a predetermined outcome) and those that are casino-based (e.g., having an outcome that is not determined at the time of sale of the ticket). In the case where a later drawing affects an outcome, a player may not be permitted to play the game until the drawing occurs (and until results are available at server 1803). In the case of a drawing that affects outcomes, drawing results can be communicated from server 1802 to server 1803. In addition, server 1802 may maintain a mapping from a ticket identifier (e.g., a serial number) to an access code provided on the ticket, and provide a mapping of outcome to access code when the drawing occurs. As discussed, such outcome information may be maintained in a database 1810 associated with server 1803 and may be accessed through a database server process 1809.

As discussed, the payout of the award may be displayed to a player in a number of ways. For instance, the payout of the ticket may be presented to the player through one or more reveals presented to a player during one or more plays of an online game.

For instance, in the case of a slot machine game, a player may be permitted, with the issue of a single scratch or printed ticket, a series of spins of the slot machine. The slot machine may, as the result of each of the spins, produce results that contribute to the overall payout to the player. For instance, after a single spin, a player may be presented an indication that he/she has won $5. The payout to the player as provided from the server database may be, for the series of spins, $50 overall, with particular outcomes for each spin. Additional spin results may provide the additional $45 that the player will receive. Additional spins may add, subtract, or have no affect on the contribution to the outcome of the game. These results of each spin of the slot machine game may be stored in the database of the server indexed by the ticket identifier, or may be randomly determined by the game program that renders the game. Further, as discussed above, the results of each spin may be "scripted" such that the game experience is more exciting to the player.

For example, in the case where the results of each spin are stored on the server, the series of results may be downloaded to the client at the beginning of the game as a series of entries, and the client may reveal each result as the player progresses through the series of spins. In the random method, results for each individual spin are not predetermined, but rather are determined by the client in a random manner. For instance, the actual outcomes of each spin may be randomly chosen among the possible combination of outcomes that may produce the required payout. In either case, the outcomes for each spin of the slot machine game is not stored on the ticket, but rather is stored at the server and downloaded just prior or during game play, or is determined randomly by the client. Alternatively, the client may determine the game experience based on a predetermined set of rules or formulas that, when an overall outcome is provided, allows the client to determine intermediate outcomes in a dynamic way. Because the game play and outcome are scripted, a player may also not play the game (and possible secondary games) to actually win. A player may purchase a ticket, wait until the ticket may be redeemed, and go to a POS to find out (and if necessary, receive) his/her winnings. A ticket may be allowed to be redeemed after a predetermined period of time after the drawing independent of whether the player has played the game. A ticket may be able to be redeemed after a predetermined period of time, from almost immediately to seconds to days or any predetermined time. For tickets with results dependent upon results of a particular Keno game or other event, the ticket may not be redeemed until after the event has passed.

In another alternative, the game results achieved by the online portion of the game may be separate from the award that is redeemed in the gambling location. For instance, the game may be a game for pure entertainment, having a result that is not correlated with the award provided to the player. However, the player may be required to play the online game to reveal the award.

Finally, after play of the online game, the player is permitted to validate the ticket or invitation at any gambling location (e.g., POS 1801 (for example, a lottery agent, casino, or other gaming establishment)) to redeem his/her winnings as indicated during the online portion of the game. According to one embodiment, the player redeems an award of non-cashable credits, cash, or other type of award that can only be redeemed at the redemption location, encouraging the player to return to the redemption location.

According to one embodiment, players are permitted to redeem their winnings only after playing the online portion of the game. The player, by playing the online portion of the game, sets status information at the server (e.g., server 1803). When the player attempts to redeem the ticket at the gambling location (e.g., POS 1801), the status information may be checked, and the player is permitted to redeem his/her winnings. To this end, server 1803 may communicate information back to server 1802 relating to game play.

For instance, server 1803 may collect information that indicates the sequence of game play performed at the client, and other player tracking information. In one example, tickets may be associated with a particular player, and the player may be awarded loyalty points or other credit for playing the game. Because the inventive game may award prizes such as, for example, a non-cashable credit for playing additional games, a complimentary offer, and/or promotional prizes, the inventive game may be used as a method for providing additional player incentives to return to a gambling location or other gaming establishment.

Online Reveal-Based Game Implementation

As discussed, various aspects of the present invention may be implemented in an electronic game. For instance, a player may be invited to play one or more instances of an online game (e.g., played over the Internet) in which the player may be awarded one or more prizes which may be redeemed at the gambling location. Such games may include games of chance, skill, or combination thereof. In one example, the game may include one or more instances of a COLLAPSE-type game as discussed above, however, it should be appreciated that any other game type may be used.

Taking a COLLAPSE-type game, a player is issued a ticket at a POS to play one or more instances of the COLLAPSE-type game. The ticket indicates an access code, and the player uses this access code to gain access to the system (e.g., from a host coupled to server 903 through the Internet). The player enters the access code in a user interface, and, once validated, is permitted to play the COLLAPSE-type game. As discussed, the COLLAPSE-type game is a version of the well-known game of COLLAPSE, which is a game of skill-based puzzle game. Optionally, the player is permitted to play, based on a single access code (and ticket), any one of a number of games available from server 1803. Such an option may allow a player to play different games for each game instance associated with the ticket.

Figure 19:
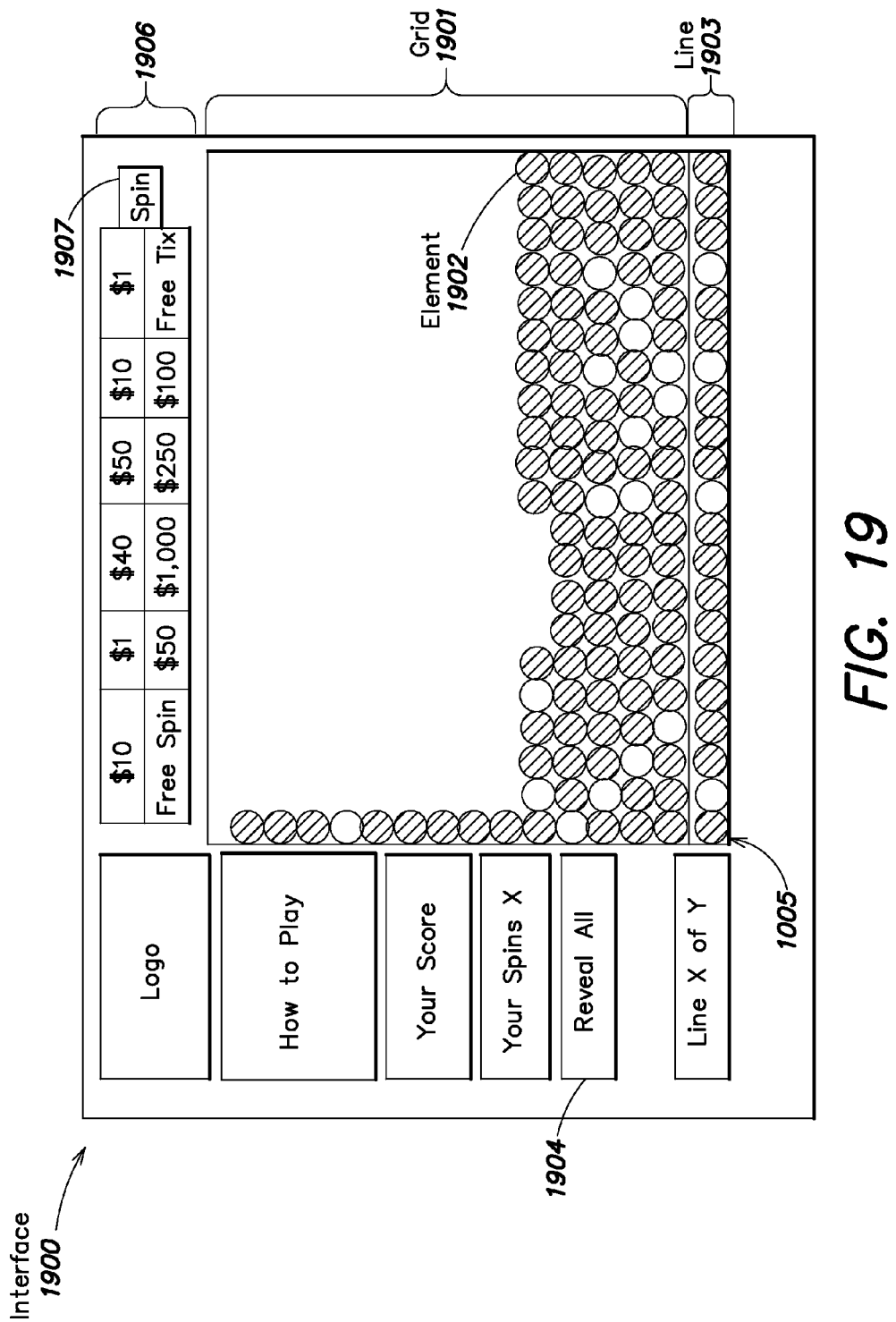
FIG. 19 is a game interface according to one embodiment of the present invention.

FIG. 19 shows an example game interface 1900 according to one embodiment of the present invention. The COLLAPSE-type game involves an interface 1900 that has a grid 1901 of elements (e.g., element 1902). Similar elements within grid 1901 may be identified by color, shape, or any other indication. One or more new lines of elements (e.g., line 1903) are fed into the bottom of the grid periodically.

A player removes groups of similar elements by selecting them within the grid, and the player is awarded points based on the number of elements removed. For example, similar elements may be indicated by color, and groups of similarly-colored elements may be removed from the grid. In one example, groups of three elements can be removed. Removal of larger groups of similarly-indicated elements may provide more points than smaller groups. It should be appreciated, however, that elements may have one or more indications that represent that they are similar, and the invention is not limited to any particular indication(s). Further, it should be appreciated that any number of elements may be removed as part of a group, and the invention is not restricted to any minimum number of element that may be removed.

Lines are moved into a preview area 1905 associated with interface 1900 that permits the player to anticipate what element types are being placed into grid 1901. Lines of elements may be moved into the grid at a predetermined rate, and the rate may be adjusted from time to time during game play. In one example, elements may be fed into the preview area from left to right, and when a line of elements is complete, the line of elements is pushed into grid 1901. The COLLAPSE-type game ends when the grid overflows with elements or a final line (e.g., of a predetermined number of lines) is fed into grid 1901. As an additional option, a player may bypass play of the COLLAPSE-type game by selecting a "Reveal All" element 1904 within interface 1900. Selection of element 1904 may cause the COLLAPSE-type game to end and may allow the player to progress to a second level game.

As discussed above, the second level of the game may be played with items collected during the COLLAPSE-type game. Also, as discussed, these items may be hidden within elements of the grid (e.g., grid 1901) and released as elements are removed. In one version of the game, items such as spins of a wheel or sticks of dynamite (a.k.a. "hotsticks") are located within elements in the grid. Items (spins, sticks, etc.) are accumulated and used in the second reveal-type game to reveal a payout or other type of prize. As shown in interface 1900, there may be a prize window 1906 in which prizes are awarded.

Window 1906 may indicate a number of available prizes, and may include an interface control (e.g., spin control 1907) that allows the player to initiate the second level of the game. Window 1906 may be a part of or separate from a window that includes grid 1901. After the player selects control 1907, window 1906 indicates what, if any, prize is won. Interface 1900 may also include an indication of the number of spins or other items remaining to be played by the player in the second level game.

In the example game discussed above having one or more elements containing hidden items (e.g., safes), sticks of dynamite or other items collected may be used to uncover the hidden prizes in the second level portion of the game. For instance, winnings (e.g., cash prizes) revealed within opened safe elements are awarded to the player. In one example, the reveal of the number of sticks awarded to a player may be randomized by the client computer, with at least one stick awarded to the player to allow the player to open at least one safe.

After play of the second level game, game play is returned to another instance of the first level game (e.g., the COLLAPSE-type game). The player may, however, choose to play a different game (e.g., a card game or other game) at the conclusion of any particular game instance. The player may be permitted to play further instances of the COLLAPSE-type game, with each level of the Collapse-type game leading to a second level wherein prizes are revealed. These intermediate prize amounts that are revealed with each instance of the COLLAPSE-type game, as discussed above, may be stored in a database of the server, and provided to the client prior to or during game play. Alternatively, intermediate prize amounts may be determined at the client in a random manner (e.g., by randomly selecting a possible combination of intermediate prize amounts that total the overall prize awarded to the player). In another example, a game may be determined dynamically by the game system or client based on one or more rules. These rules may be tailored so that the overall result is revealed by the game system in an interesting way.

For instance, the ticket may have an overall prize value of $50, and the prize awarded at each instance of the COLLAPSE-type game may accumulate to form the $50 prize. There may be a finite number of combinations based on the number of game instances to achieve a $50 prize, and the actual game experience presented to the player may be a random selection of the finite outcomes. In any case, the result of each game instance is either stored at the server or is determined randomly or dynamically by the client as discussed above.

According to one aspect of the present invention, it is realized that the time at which a ticket or other invitation type is activated (and therefore, may be played) is important. In the case of a casino-based game, where an invitation is provided at the casino (e.g., in the form of a ticket or other invitation type), it may be beneficial to include a delay between the time that the invitation is provided (e.g., purchase of a ticket at the casino) and a possible redemption of the ticket (on a return visit of the player to the casino) so that the game play associated with the ticket does not compete against other games offered by the casino (e.g., floor games). For example, in the case of a slot machine game, it may be preferable that such a game be activated after the player leaves the casino, or otherwise is not playable while in the casino so as not to compete with other types of slot machine games or other game types offered by the casino.

Further, another benefit of introducing a delay between ticket issuance and activation includes increasing the likelihood that the player plays the game at another location (e.g., at home), requiring the return of the player to the ticket redemption location to redeem his/her winnings. Because the player needs to return to the redemption location (which may be a casino), the possibility that the player will purchase additional tickets or play other types of games offered at the redemption location is increased.

According to one embodiment of the present invention, a COLLAPSE-type game is conducted that may include the following additional aspects, either alone or in combination:

The game begins with a fixed number of lines of colored elements already positioned on the game grid (e.g., grid 1901) and available to be selected by the user (or player).

New elements fill the bottom and/or the top of the screen, from left to right, one at a time, but are not available to be selected. When a row is complete, the line of elements is pushed onto the game grid and added to those elements in active play. Alternatively, new elements may fill the game grid from any edge, including from the right and/or left side.

Selecting the preview area as lines are being formed causes the preview area to fill with elements and the elements to be added to the active play area.

The user can clear elements from the active area by selecting any three or more same-colored elements that are touching.

When a user positions a selection device (e.g., a mouse pointer) over a group of elements that are eligible to be cleared, the group of elements changes in appearance.

When elements are cleared, the elements above fall downward and toward the center to fill any void created by removed elements.

When the user clears an element that contains a dynamite stick (or other item) in it, that stick is placed to the right of the game board for use in the second level game (e.g., a prize round).

When the stack of elements comes within a predetermined number (e.g., three) of rows of the top of the game area, a warning area flashes.

If the elements reach the top of the game area, the COLLAPSE-type game ends and the user is taken to the second level game.

If the user collects a predetermined number (e.g., six) of dynamite sticks, the COLLAPSE-type game ends, and the user is taken to the second level game.

The user begins the game with one dynamite stick collected for him/her.

At the second level game, the user is presented with a grid, 6 by 6, of safes.

The user selects a button and the first dynamite stick is used.

The stick begins at the top left most safe and moves over each safe in turn, from left to right, top to bottom, one at a time.

The safe that the stick stops at is blown open to reveal either a cash amount or other prize type or an indication that no prize is awarded.

If multiple sticks are available for use, each subsequent stick starts at the safe immediately after the safe that was blown open.

The sticks skip over safes that have already been opened.

At the conclusion of the game, the user is presented an indication that the second level game is over and an indication of any prize(s) awarded.

The overall result (e.g., payout) for purchasing a ticket may be predetermined (as in a scratch or other type of instant lottery game) or may be determined by a later event (such as a lottery, Keno, or bingo draw) that occurs after ticket issuance.

Frequent Player Tracking System Implementation

As discussed above, various aspects of the invention relate to providing incentives using a frequent player program. Frequent player programs for casinos generally involve players using frequent player program credits at the casino or affiliated establishment. Therefore, the player must visit the casino or other gambling location in order to use the rewards or incentives that the individual may obtain. However, there is no actual additional pull for getting the player to visit the gambling location.

Additionally, it is appreciated that constantly visiting a casino at a physical location may be inconvenient for a bettor, especially if the location is located far away from the bettor. However, with the advent of Internet-based betting sites and online casinos, land-based casinos and other gambling locations are at a disadvantage to obtaining bettors that can have other betting opportunities that are more readily available.

One aspect of the present invention relates to a method for providing additional incentives to a frequent player program member to visit a casino or other type of gambling location. One such method combines the ease of using the Internet or other remote communication technologies with the advantages of a frequent player program. In one embodiment of the present invention, each frequent player program member has a unique identifier (e.g., number or account name) and a password or passcode. In another embodiment of the present invention, the frequent player program member may be presented with special incentives for remotely swiping his or her frequent player program card (or by remotely entering his or her unique identifier and password) in a manner that the casino's frequent player program recognizes. A member may be able to remotely swipe their frequent player program card (or enter his or her unique identifier and password) using an audio-enabled, video-enabled, or card reader-containing device. For instance, a kiosk, telephone having a display, television, computer or handheld device may be used. This additional incentive, according to one embodiment, may require the member to return to the casino to redeem the incentive. The incentive may, for example, be in the form of a prize, credit, or other incentive that has value to the member.

The special incentive may be any program that is targeted exclusively to members that remotely swipe or otherwise use their frequent player program cards. The special incentive program may include, for example, extra prizes or rewards that are awarded to frequent player program members when they remotely swipe or otherwise use their frequent player program card. In one embodiment of the invention, the extra prizes or rewards are not provided to the member until he or she visits the gambling location. In another embodiment of the invention, the member must visit the gambling location within a specified period of time to obtain the extra prizes or rewards. For instance, the specified time period may be determined to be within a set time period of the membership card being swiped or within a set time period for the special incentive. For example, a player may be required to visit a gambling location within one week or two months of having swiped his or her membership card. In another example, the player may be required to visit the casino by a set date (e.g., Feb. 28, 2006) when the special incentive expires.

In another embodiment, the player is encouraged to swipe or otherwise use their membership card remotely as frequently as possible. In one example implementation, a system (e.g., system 1200) may determine incentives periodically (e.g., daily) which are then displayed to the player. These incentives are displayed to the player as indication of a win in the display of a remote system. Because the incentives are determined in a periodic manner, continued return by the player to the remote system interface is encouraged. For instance, if the period for determining an incentive is once a day, a player will be encouraged to use the remote system to see if they have won any incentive(s). In this way, both return to the casino and the remote interface is encouraged.

Figure 21:
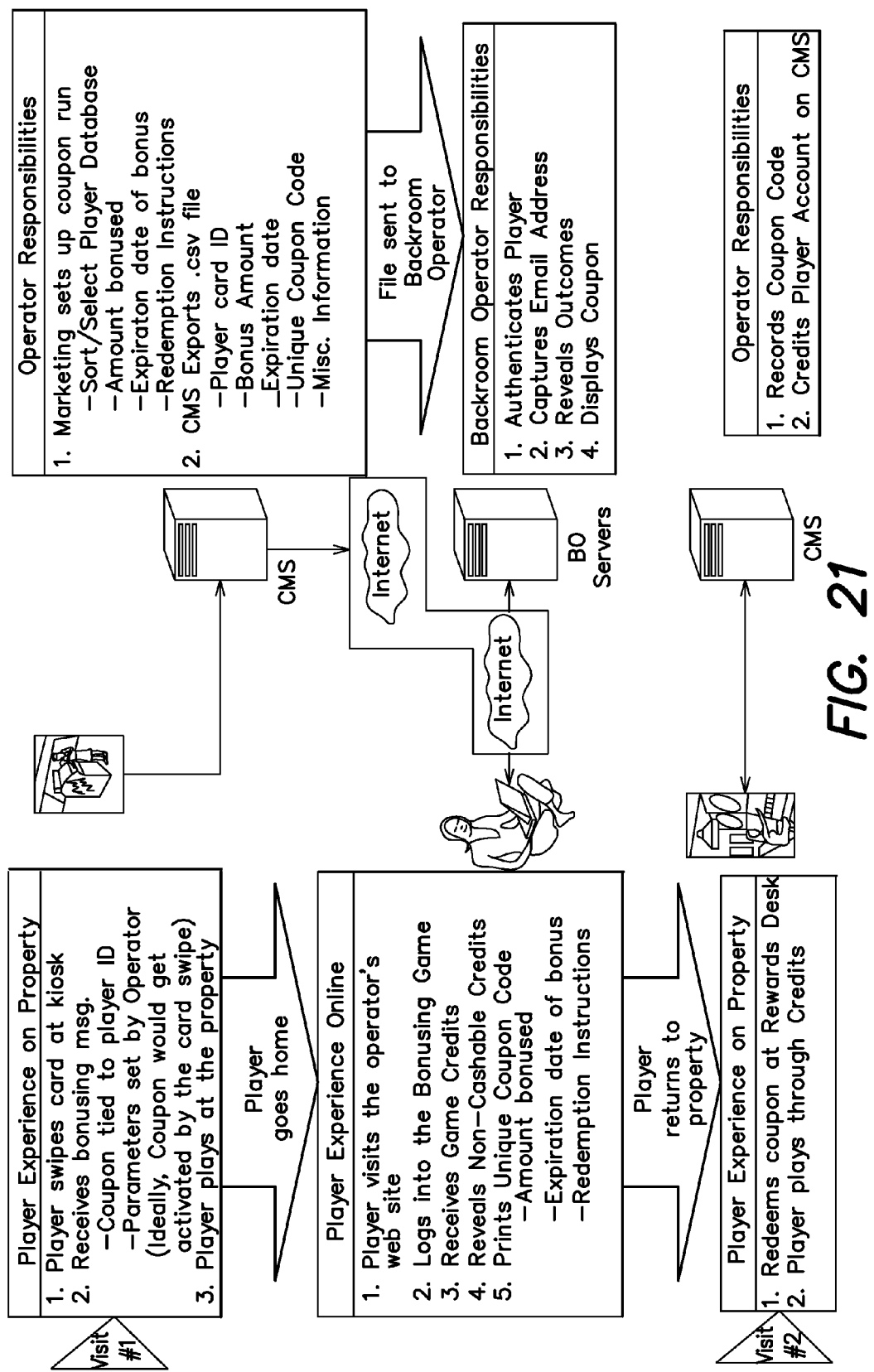
FIG. 21 is a block diagram showing an example of a system according to another embodiment of the present invention.

In one embodiment of the invention, a bonusing message may be presented to the player when the player swipes his or her frequent player card at the kiosk and a paper or electronic coupon may be activated for the player (FIG. 21). The bonusing message may indicate, for instance, that the player may be eligible to receive a prize (e.g., to be revealed online). The player may then proceed to an operator's website either on-site or off-site from the casino. When the player logs in, the coupon is activated to reveal the number of game credits a player has received.

Using the awarded game credits, the player may then proceed to play the game. As the player plays the game(s), the player reveals a prize (e.g., one or more non-cashable credits, complimentary offer(s), and/or promotional prize(s)) won by the player. When revealed, the prizes may be printed onto a coupon. In another embodiment, the prize may also have an expiration date, before which the prize may need to be redeemed (e.g., at a land-based or other type of casino or gambling location). In this manner, the player is incentivized to return to the gambling location to redeem the award or prize.

In one embodiment, the prize may be predetermined. For instance, the amount of non-cashable credits may be a predetermined number stored in a database. In another example, the prize may be limited within a predetermined range (e.g., number of credits, monetary value, etc.), and the actual awarded prize may be randomly selected from within the range. In this way, the award may appear to the player to be randomly determined.

In the case where the prize includes non-cashable credits, the player may then proceed to the land-based casino or other gambling location and use the non-cashable credits in any manner acceptable to the operator. An acceptable manner of use may include allowing the player to play standard casino games, slot machines, or any other type of game. Generally, non-cashable credits may be used for playing casino-based gaming machines.

In another embodiment of the invention, a player may receive an offer for game play or any other invitation by direct mail, e-mail, telephone, pager, fax or any other communication method (FIG. 20) rather than receiving a bonusing message by swiping a frequent player card. Such an offer for game play may, for example, direct the player to the operator's website and provide the appropriate information for logging into the website to play the game.

In yet another embodiment of the invention, a player may enter a sweepstake to win game play(s). The player may be informed whether they won or lost at the time of entry. Preferably, the player is entered into a sweepstake with a specified time of drawing. In another example, the player may be entered into only the next sweepstake drawing, a specified number of sweepstakes drawings or all future sweepstakes drawings.

Figure 20:
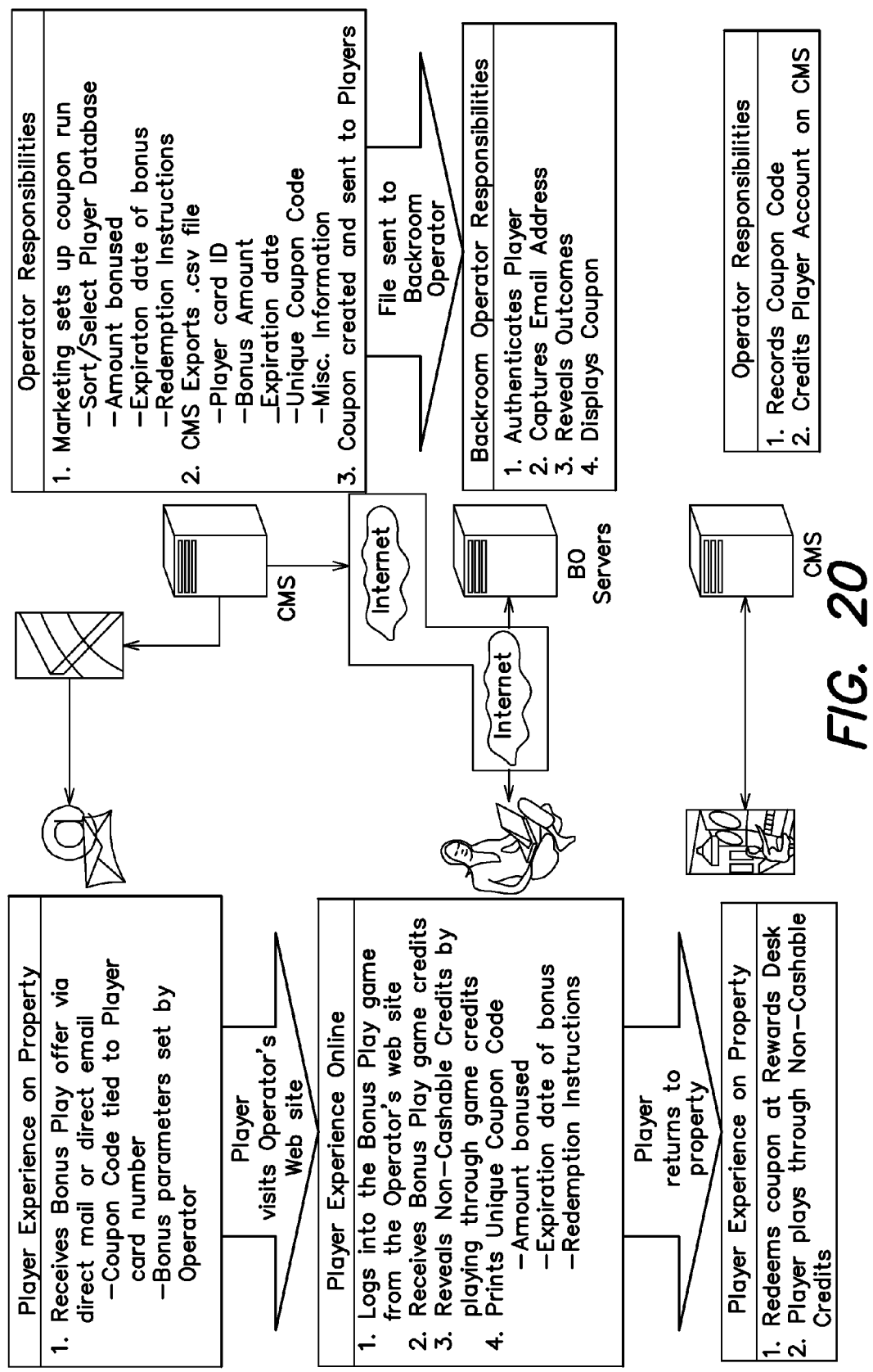
FIG. 20 is a block diagram showing an example of a system according to one embodiment of the present invention.

FIG. 20 shows one example of a method for providing incentives to a player. As shown in FIG. 20, the player may receive an offer or invitation via direct mail or direct email. In one embodiment, the player is provided a code (e.g., a coupon code) which permits the player to play an online game. The bonus or other award may be determined by the operator based on one or more parameters.

For instance, the operator may determine a number of players that are to receive a number of invitations to play the game. In one embodiment, players may be selected from a database (e.g., as identified by a frequent player account) and may be invited to play an online game. As discussed above, the amount bonused or awarded to the player may be determined based on a player's historical performance, information specific to the player (e.g., income, residence address, position, etc.). Further, to encourage the player to return to the gambling location or gambling property, an expiration date of the offer may be determined by an operator which encourages return to the property within a specific timeframe. Further, redemption instructions may be determined based on the bonus or invitation provided to the player.

According to one embodiment, various aspects of the invention are implemented on a casino management system or other type of gaming management system. According to one embodiment, the casino management system associates the invitation or bonus with an identifier of the player, such as for example, a frequent player program identifier. The casino management system or CMS may store a number of elements related to the invitation such as, for example, a player card ID, bonus amount, expiration date, a unique code associated with the offer (e.g., a coupon code), or other miscellaneous information related to the invitation extended to the player.

The CMS or other type of gambling management system may be coupled to other types of servers that are used to conduct the online gaming experience (e.g., server 1803 as discussed above with reference to FIG. 18). According to one embodiment, such servers may be operated by another entity referred to herein as the backroom operator or the backoffice operator. The backoffice operator may be, for example, a service provider to the casino or other gambling establishment that conducts the online game experience. In one embodiment, the CMS communicates a set of information to the backoffice operator such that the online gaming experience may be conducted. The backoffice operator may have a number of systems (e.g., backoffice operator (BO) servers) that perform a number of functions associated with the online gaming experience. In one embodiment, the backoffice operator and its systems receive information relating to the bonus offer or invitation that is sent to one or more players. Based on this information, the BO system may tailor the online gaming experience accordingly. The BO system may perform functions associated with authenticating particular players, obtaining additional information from the player such as, for example email address, revealing outcomes of the offer or any other game outcomes, and displaying and/or printing any coupons or other item that can be redeemed by the player upon return to the gambling property.

A player receiving the offer visits the operator's website or other facility for presenting the game to the player. In one embodiment, the player logs into the bonus play game from the operator's website. Thereafter, the player plays an online game. In one particular embodiment, the player may receive bonus play game credits that may be used to play one or more online games. As discussed above, the games presented during the online game experience may be any type of game, including but not limited to games of skill, games of skill and chance, or pure games of chance. In one embodiment, the games provided online similar to those offered on the casino property. In one particular case, the offer extended to the player is based at least in part on the play of the player of the online game. At some point during the online gaming experience, the player is provided a unique code (e.g., a unique coupon code) indicating the award provided to the player. Such an award may indicate, for example, the amount bonused to the player, the expiration date of the bonus, and any redemption instructions that are associated with the offer.

The player is incentivized by receipt of the offer to return to the gambling location (e.g., a casino property) so that the player can redeem the award. For instance, the player may redeem the award at a rewards desk located in the casino, or may be provided some other method for redeeming the award. For instance, the award may be a complimentary offer which can be redeemed at a hotel located on the casino property, the award may be non-cashable credits which can be associated with a frequent player account which are then redeemed at a gambling device, or any other appropriate method for redeeming the award at the gambling location. The operator may perform one or more actions associated with the redemption offer such as recording the redemption of the particular offer (e.g., recording the provided coupon code), voiding the coupon code for further redemption, crediting a player account on a casino management system, or any other function.

As discussed above, the invitation to play an online game may be provided in any manner and in any location. For instance, as shown in FIG. 21, the player, during a first visit of a gambling location receives an offer to play an online game. For instance, the player may take one or more actions at the gambling location (e.g., swiping a frequent player card at a kiosk) that initiates the presentation of an invitation to play the online game. For instance, a bonusing message may be displayed to the player, and the player may be provided a coupon which is associated with the frequent player identifier of the player. According to one embodiment, the bonus coupon is activated by the act of the player swiping his/her frequent player card at the property. Additionally, the player may play one or more games at the gambling location.

After the player leaves the gambling environment (e.g., the player returns home, leaves the gambling property, etc.) the player may be permitted to play the online game. Further, as discussed above, the player may be presented a bonus or other award that incentivizes the player to return to the gambling location. For instance, as shown in FIG. 21, the player during a second visit to the gambling location may be awarded credits to be used at the casino property during the second visit.

Figure 22:
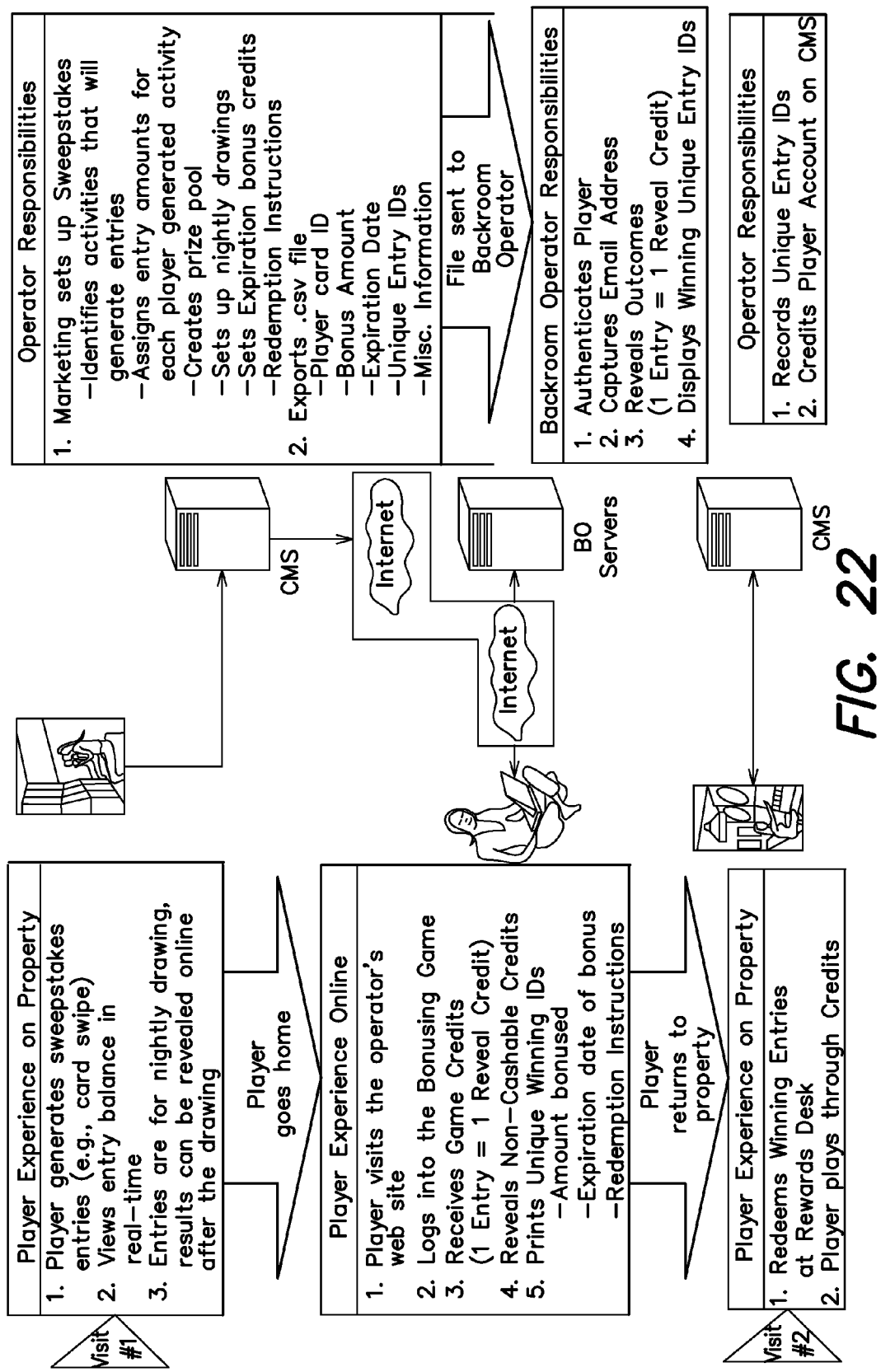
FIG. 22 is a block diagram showing an example of a system according to another embodiment of the present invention.

In yet another embodiment of the invention as shown in FIG. 22, the player may receive an entry into a sweepstakes during a first visit to the gambling location. The sweepstakes entries may be initiated upon one or more actions during the first visit of the player. Such actions may include, for example, a swipe of a frequent player card, one or more gambling activities performed by the player at the gambling location, or other player action. In one embodiment, the sweepstakes entries may be for a drawing that occurs at some later time. For instance, there may be drawings daily, nightly, etc. that may encourage the player to either remain on the gambling location property, or otherwise return to the gambling location after receiving the sweepstakes results.

In one embodiment, a computer system may be used to perform one or more remote operations. A computer system may be a single computer that may include a minicomputer, a mainframe, a personal computer, or combination thereof. The computer system may include any type of system capable of performing remote computing operations (e.g., cell phone, PDA, set-top box, or other system). A computer system used to run the operation may also include any combination of computer system types that cooperate to accomplish system-level tasks. Multiple computer systems may also be used to run the operation. The computer system also may include input or output devices, displays, or storage units. It should be appreciated that any computer system or systems may be used, and the invention is not limited to any number, type, or configuration of computer systems.

A computer system that executes operations according to various embodiments of the invention may include, for example, one or more system components. For instance, one system component may handle remote entry by frequent player program members. Another system component may handle the special incentives and a third system may handle payouts. Such a system may also be connected (e.g., by direct line or network) to other computer systems including systems for handling casino or hotel loyalty programs, reservations, in-room television viewing, gambling floor kiosks, or other systems. Connections to other computer systems may be performed using one or more of the system components described below.

A remote entry component may include one or more of a number of well-known systems. For example, a bettor may be able to enter remotely through an off-casino kiosk or other system that is connected to the remote entry computer system through an interface. In the computer, data may be stored in a database that is stored in the memory of a computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Examples of UIs that may be implemented with various aspects of the invention include a graphical user interface (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

Frequent player program member information may also be entered into a remote entry system component. Member information that may be input may include, for example, member name, address, telephone number and age, and payment information may include credit or debit card number or loyalty account information. Based upon the member information, the call center representative may verify that the member information is accurate.

Various remote entry systems and one or more user interfaces may be located on computer systems coupled by a network with the computer system(s) storing data having member, account and subscription information. As used herein, a "network" or a "communications network" is a group of two or more devices interconnected by one or more segments of transmission media or active communications equipment on which communications may be exchanged between the devices.

One aspect of the present invention relates to a method for providing additional incentives to a frequent player program member to encourage them to visit a land-based casino or other gambling location. One implementation combines the ease of using the Internet or other remote communication technologies with the advantages of a frequent player program. More particularly, a frequent player program member may be provided an incentive to return to the casino or other gambling location in a more convenient location to the member (e.g., at home, on a cell phone, PDA, etc.).

In another embodiment of the invention, extra prizes or rewards may be won through a sweepstake. In one example, the frequent player program member may be informed whether they won or lost at the time of entry. Preferably, the member is not informed of their winnings until he or she visits the gambling location to encourage more members (even losing ones) to visit the gambling location.

In one implementation, a computer system of a casino may automatically determine when a remote frequent player program member is a winner. Such a result may be automatically authenticated and verified by the computer system. In this instance, the computer system may then notify the member that he or she has won and what the winnings are. Notification of winning to a member may occur, for example, by mail, e-mail, Internet or other network, telephone, television, pager, fax, kiosk or any other method. In one implementation, the player may be advised of their winning during play of an online game. For instance, during play of an online game in which winnings are displayed to the player, the game program may be configured to reveal an indication of a win of an incentive. Displaying of the indication may occur, for example, within the game, or the display may occur within play of another game (e.g., a secondary game to the online game).

After a winner is authenticated and verified, the computer system may then notify other members of the win. Additionally, the computer system may display the member's identity and/or payout.

A member may be able to remotely swipe their frequent player program card (or otherwise enter his or her unique identifier and password) using an audio-enabled, video-enabled, or card reader-containing device. For instance, a kiosk, telephone having a display, television, computer or handheld device may be used. However, it should be appreciated that any other entry method may be used (e.g., by entering a member identifier manually into a computer system).

In one embodiment, a computer system may be used to operate most of this remote operation. A computer system may be a single computer that may be a supercomputer, a minicomputer, a mainframe, or a personal computer. A computer system used to run the operation may also include any combination of computer system types that cooperate to accomplish system-level tasks. Multiple computer systems may also be used to run the operation. The computer system also may include input or output devices, displays, or storage units. It should be appreciated that any computer system or systems may be used, and the invention is not limited to any number, type, or configuration of computer systems.

Figure 25:
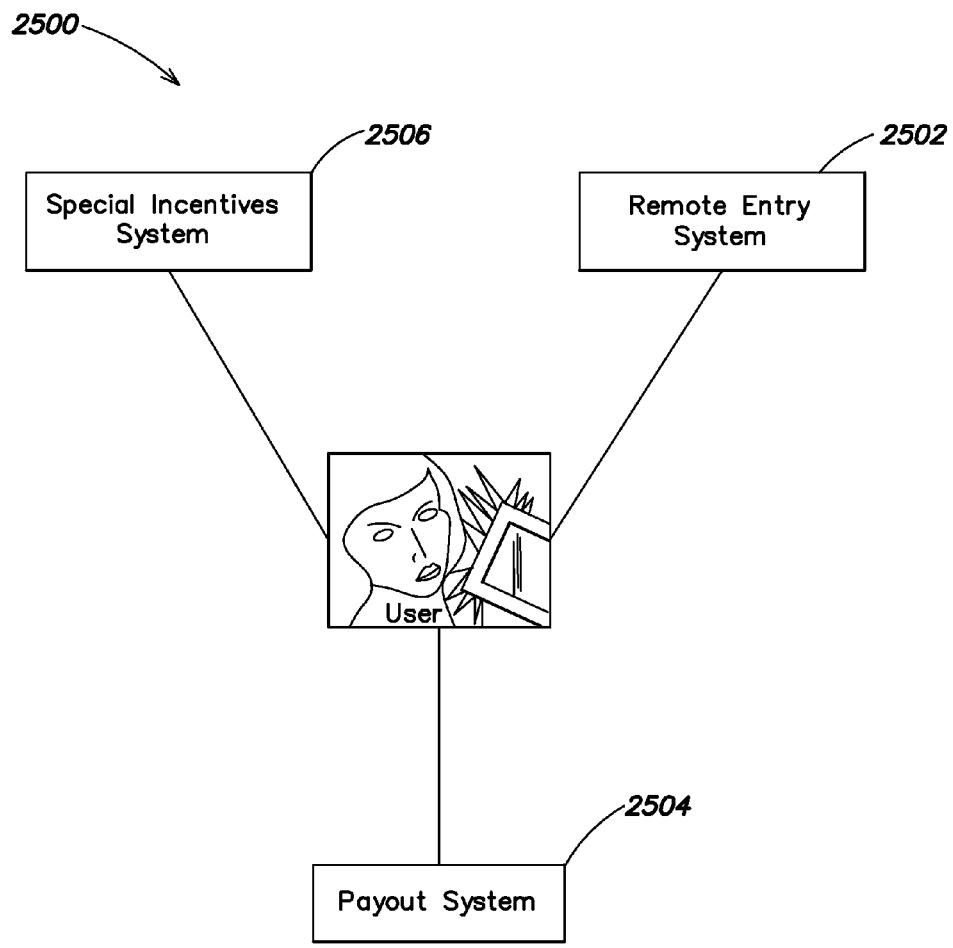
FIG. 25 is a diagram showing example components of a remote special incentives computer system according to one embodiment of the invention.

A computer system (e.g., system 2500) that executes game operations according to various embodiments of the invention may include, for example, one or more system components as shown in FIG. 25. One system component may handle remote entry by frequent player program members. Another system component may handle the special incentives and yet another system may handle payouts. Such a system may also be connected (e.g., by direct line or network) to other computer systems including systems for handling casino or hotel loyalty programs, reservations, in-room television viewing, gambling floor kiosks, or other systems. Connections to other computer systems may be performed using one or more of the system components described below.

Figure 26:
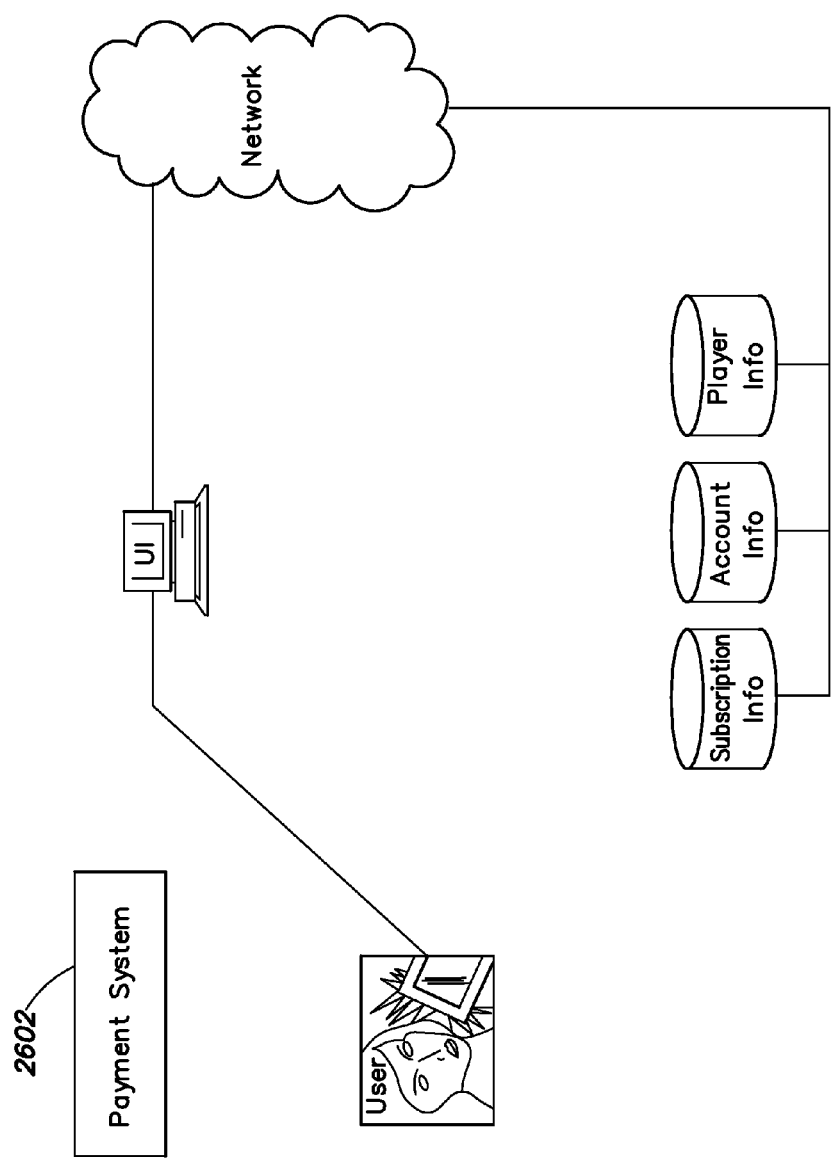
FIG. 26 is a diagram showing components of a payout subsystem according to one embodiment of the invention.

A remote entry component (e.g., system 2502) may include one or more of a number of well-known systems (e.g., as shown in FIG. 26). For example, a bettor may be able to enter remotely through an off-casino kiosk or other method (e.g., cell phone) is connected to the remote entry computer system through an interface. In the computer, data may be stored in a database that is stored in the memory of a computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Examples of UIs that may be implemented with various aspects of the invention include a graphical user interface (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

Frequent player program member information may also be entered into a remote entry system component (e.g., system 2502). Member information that may be input includes name, address, telephone number and age, and payment information may include a credit or debit card number or loyalty account information. Based upon the member information, the call center representative may verify that the member information is accurate.

Various remote entry systems and one or more user interfaces may be located on computer systems coupled by a network with the computer system(s) storing data having member, account, and subscription information. As used herein, a "network" or a "communications network" is a group of two or more devices interconnected by one or more segments of transmission media or active communications equipment on which communications may be exchanged between the devices. One example of a network includes the Internet, at least a portion of which may be used to remotely access incentive information.

The above examples are merely illustrative embodiments of a remote entry system component. It should be appreciated that an illustrative embodiment is not intended to limit the scope of the invention, as any of numerous other implementations of the remote entry system, for example, variations for remote entry method, are possible and are intended to fall within the scope of the invention. For example, the remote entry system may include using pay-per-view systems associated with interactive television in an off-site hotel or the remote entry engine may additionally deliver a receipt to the member by either e-mail or mail. None of the claims set forth below are intended to be limited to any particular implementation of a remote entry system unless such claim includes a limitation explicitly reciting a particular implementation.

Payout systems or payment systems (e.g., payment system 2602 as shown in FIG. 26) are also well-known. Any of a number of standard systems or payout engines for making payouts for winning may be used. For example, a standard application programming interface such as 'Quicken' (available commercially from Intuit Inc., Mountain View, Calif., USA) may be used to write and mail checks or credit a debit card, credit card (if legal in the jurisdiction of play) or loyalty account. 'Quicken' may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of a payout system. Such an illustrative embodiment is not intended to limit the scope of the invention, as any of numerous other implementations of the payout system, for example, variations of online payout, are possible and are intended to fall within the scope of the invention. Additionally, a cashier may also have access to payout information using a user interface to the payout data structure through a network; the cashier then makes a payment to the winning player based upon the accessed information. None of the claims set forth below are intended to be limited to any particular implementation of a pay system unless such claim includes a limitation explicitly reciting a particular implementation.

Special Incentives System

Figure 27:
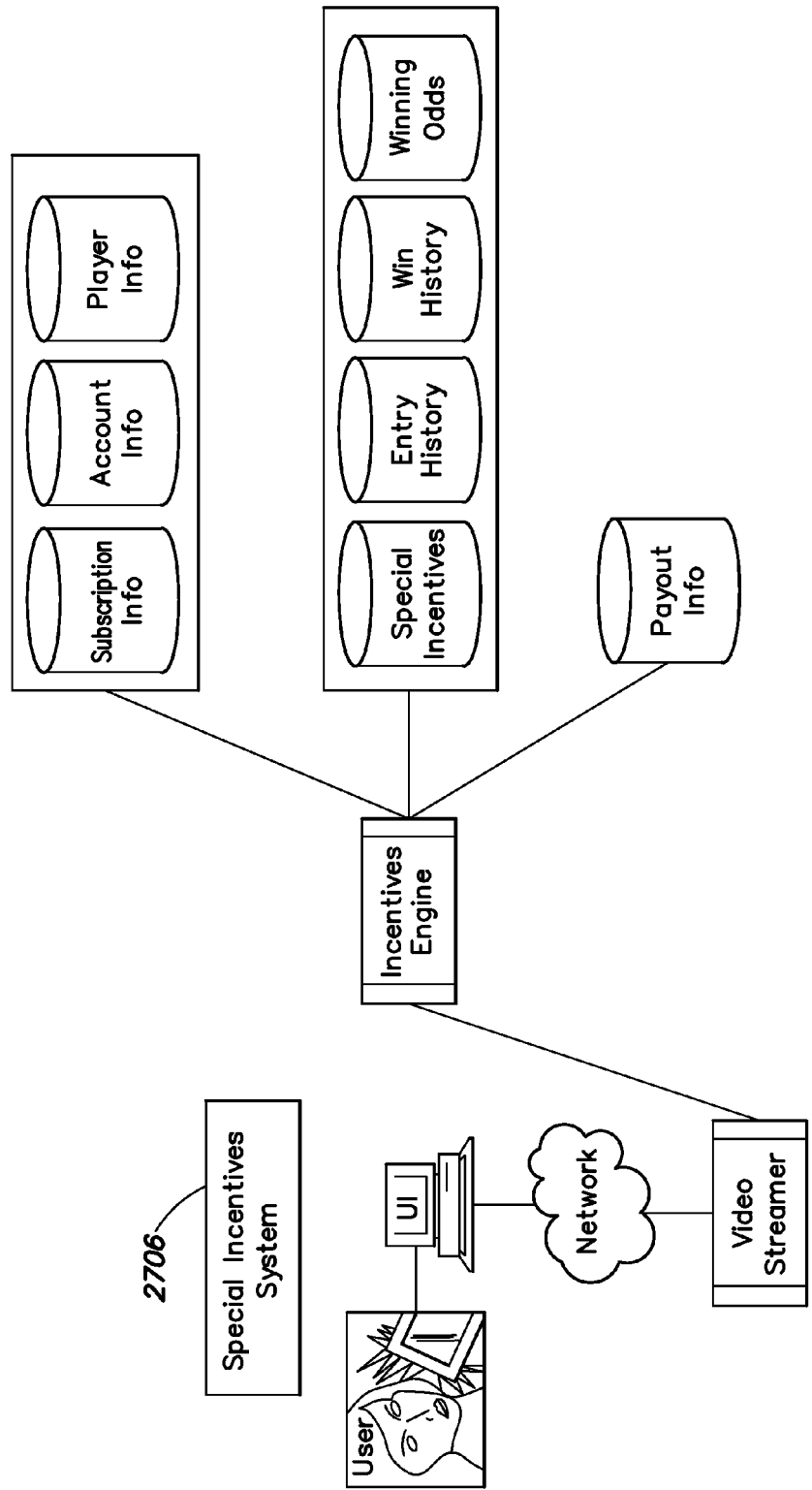
FIG. 27 is a diagram showing components of a special incentives subsystem according to one embodiment of the invention.

A special incentives system (e.g., system 2506 as shown in FIG. 27) according to one embodiment of the invention may comprise of a number of components for performing specific functions as shown in FIG. 27. These components may include, for example, a storage component that stores data structures having information relating to special incentive programs and odds. For example, such information may include program dates, time, and location, member's betting and win history, and program odds. A remote incentives system may also include components to access remote entry and payout data structures.

A special incentives system, according to one embodiment, may also include an incentives engine. An incentives engine may perform, for example, any or all functions required to administer the special incentives program(s) for remote entry frequent player program members. The frequent player program member's winnings of the incentives may be stored and tracked by a computer system of the casino.

In one example, a management system (e.g., a casino management system) may generate incentives and assign them to players. Alternatively, the incentives engine may assign incentive and communicate those assignments to the management system. However, it should be appreciated that there may be many different systems that are capable of generating and/or assigning incentives to a player.

The player's winnings may be displayed on one or more interfaces of one or more systems, including, but not limited to, a game playing computer system on which the player is playing, a player tracking system or casino management system that tracks player wins/losses, or other system (e.g., a player kiosk) that allows different people (casino manager, player, teller, etc.) to view the status of the incentive awards. Such incentives may be tracked by the frequent player identifier or other unique identifier associated with the player.

The processes described above are merely illustrative embodiments of a method for providing special incentives to frequent player program members. Such an illustrative embodiment is not intended to limit the scope of the invention, as any of numerous other implementations for performing the invention. None of the claims set forth below are intended to be limited to any particular implementation of a method of providing special incentives, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIG. 23, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the special incentives system may include a software component (e.g., a driver) that streams video via a broadband, satellite or wireless medium to a user interface. If the remote access is completely automatic, the user interface may be merely a video terminal including television with no user input means. Viewing access may be controlled by standard methods for conditional access including using set top box addresses, telephone numbers or internet protocol (IP) addresses.

The above is merely an illustrative embodiment of a special incentives system. Such an illustrative embodiment is not intended to limit the scope of the invention, as any of numerous other implementations of a special incentives system, for example, variations of conditional access, are possible and are intended to fall within the scope of the invention. None of the claims set forth below are intended to be limited to any particular implementation of a special incentives system unless such claim includes a limitation explicitly reciting a particular implementation.

System 2500, and components thereof such as the payment, payout and betting engines, may be implemented using software (e.g., C, C#, C++, Java, or a combination thereof), hardware (e.g., one or more application-specific integrated circuits, processors or other hardware), firmware (e.g., electrically-programmed memory) or any combination thereof. One or more of the components of 2500 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of 1600, each of the components may reside in one or more locations on the system. For example, different portions of the components of 2500 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 2500 may be implemented on a computer system described below in relation to FIGS. 23 and 24.

System 2500 is merely an illustrative embodiment of the remote entry system. Such an illustrative embodiment is not intended to limit the scope of the invention, as any of numerous other implementations of the remote entry system, for example, variations of 2500, are possible and are intended to fall within the scope of the invention. For example, interactive television may also be used to view the available bets. None of the claims set forth below are intended to be limited to any particular implementation of the betting system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

Figure 23:
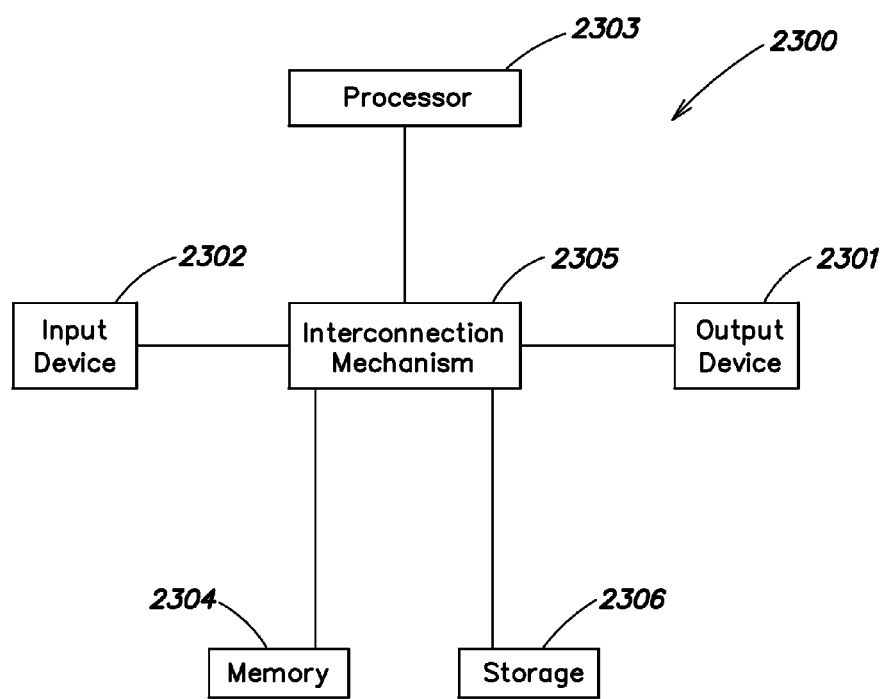
FIG. 23 is a block diagram of a general-purpose computer system upon which various embodiments of the invention may be implemented.

For example, various aspects of the invention may be implemented as specialized software executing in a general-purpose computer system 2300 such as that shown in FIG. 23. The computer system 2300 may include a processor 2303 connected to one or more memory devices 2304, such as a disk drive, memory, or other device for storing data. Memory 2304 is typically used for storing programs and data during operation of the computer system 2300. Components of computer system 2300 may be coupled by an interconnection mechanism 2305, which may include one or more busses (e.g., between components that are integrated within a same machine) and/or a network (e.g., between components that reside on separate discrete machines). The interconnection mechanism 2305 enables communications (e.g., data, instructions) to be exchanged between system components of system 2300. Computer system 2300 also includes one or more input devices 2302, for example, a keyboard, mouse, trackball, microphone, touch screen, and one or more output devices 2301, for example, a printing device, display screen, and/or speaker. In addition, computer system 2300 may contain one or more interfaces (not shown) that connect computer system 2300 to a communication network (in addition or as an alternative to the interconnection mechanism 2305.

Figure 24:
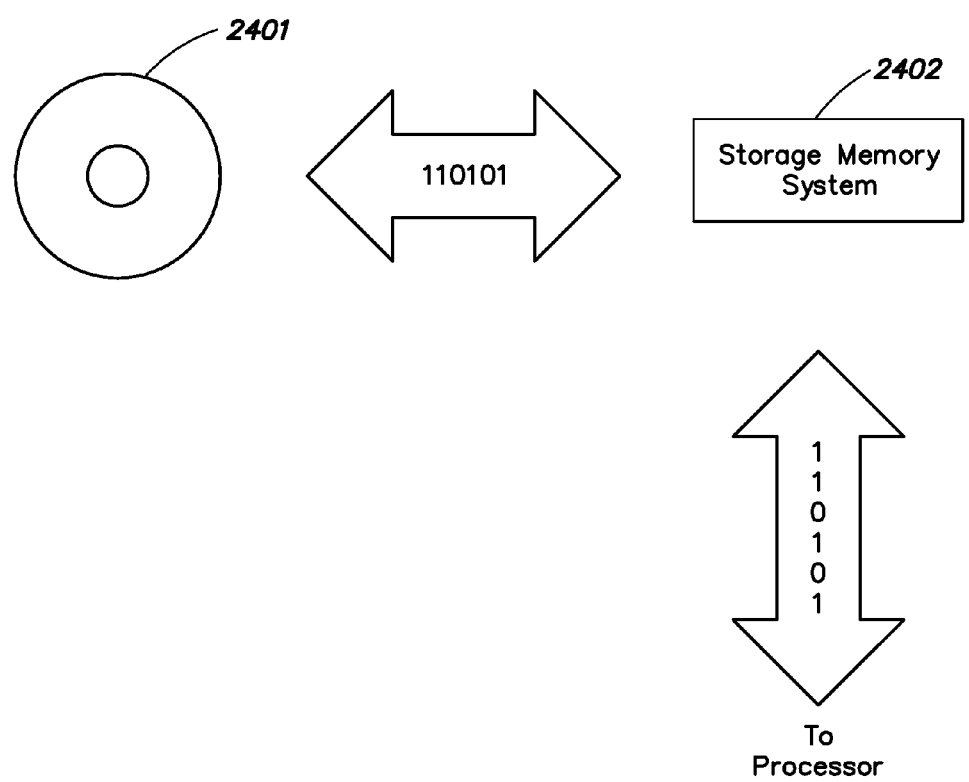
FIG. 24 is a block diagram of a computer data storage system with which various embodiments of the invention may be practiced.

The storage system 2306, shown in greater detail in FIG. 24, typically includes a computer readable and writeable non-volatile recording medium 2401 in which signals are stored that define a program to be executed by the processor or information stored on or in the medium 2401 to be processed by the program. The medium may, for example, be a disk or flash memory. Typically, in operation, the processor causes data to be read from the nonvolatile recording medium 2401 into another memory 2402 that allows for faster access to the information by the processor than does the medium 2401. This memory 2402 is typically a volatile, random access memory such as a dynamic random access memory (DRAM) or static memory (SRAM). It may be located in storage system 2306, as shown, or in memory system 2304, not shown. The processor 2303 generally manipulates the data within the integrated circuit memory 2304, 2402 and then copies the data to the medium 2401 after processing is completed. A variety of mechanisms are known for managing data movement between the medium 2401 and the integrated circuit memory element 2304, 2402, and the invention is not limited thereto. The invention is not limited to a particular memory system 2304 or storage system 2306.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 2300 is shown by way of example as one type of computer system upon which various aspects of the invention may be practiced, it should be appreciated that aspects of the invention are not limited to being implemented on the computer system as shown in FIG. 23. Various aspects of the invention may be practiced on one or more computers having a different architecture or components that that shown in FIG. 23.

Computer system 2300 may be a general-purpose computer system that is programmable using a high-level computer programming language. Computer system 2300 may be also implemented using specially programmed, special purpose hardware. In computer system 2300, processor 2303 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, or Windows Visa operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particu- lar, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "containing", "characterized by" and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition $2^{nd}$ Revision, May 2004), Section 2111.03.

Use of ordinal terms such as "first", "second", "third", "a", "b" "c" etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A computer-implemented system for collecting player information, the system comprising:
    a collector adapted to collect information relating to a plurality of frequent player accounts associated with a player wherein the plurality of frequent player accounts are player accounts related to a respective plurality of separate gaming establishments;
    a database adapted to store the collected information; and
    further comprising a component configured to execute a trading of frequent player points between a plurality of players.

2. The system according to claim 1, further comprising a processor adapted to determine a rating of the player based on the information relating to the plurality of frequent player accounts associated with the player.

3. The system according to claim 1, wherein the collector further comprises a component that is adapted to log onto at least one of the plurality of frequent player accounts associated with the player to obtain the information.

4. The system according to claim 3, further comprising a component that permits the player to manage points associated with the at least one of the plurality of frequent player accounts associated with the player.

5. The system according to claim 1, further comprising an interface adapted to display, to the player, the collected information relating to a plurality of frequent player accounts associated with the player.

6. The system according to claim 1, further comprising a component configured to purchase, on behalf of the player, frequent player points from one of a plurality of frequent player programs.

7. The system according to claim 1, further comprising a component configured to sell, on behalf of the player, frequent player points from one of a plurality of frequent player programs.

8. The system according to claim 1, further comprising a collector adapted to collect information relating to a plurality of loyalty accounts associated with a player.

9. The system according to claim 1, further comprising a collector adapted to collect information relating to game play of the player.

10. A computer-implemented method for collecting player information, the system comprising acts of:
    collecting, via a collector, information relating to a plurality of frequent player accounts associated with a player wherein the plurality of frequent player accounts are player accounts related to a respective plurality of separate gaming establishments;
    storing, in a database, the collected information; and
    further comprising an act of executing a trading of frequent player points between a plurality of players.

11. The method according to claim 10, further comprising an act of determining a rating of the player based on the information relating to the plurality of frequent player accounts associated with the player.

12. The method according to claim 10, wherein the act of collecting further comprises an act of logging onto at least one of the plurality of frequent player accounts associated with the player to obtain the information.

13. The method according to claim 12, further comprising an act of permitting the player to manage points associated with the at least one of the plurality of frequent player accounts associated with the player.

14. The method according to claim 10, further comprising an act of displaying, to the player, the collected information relating to a plurality of frequent player accounts associated with the player.

15. The method according to claim 10, further comprising an act of purchasing, on behalf of the player, frequent player points from one of a plurality of frequent player programs.

16. The method according to claim 10, further comprising an act of selling, on behalf of the player, frequent player points from one of a plurality of frequent player programs.

17. The method according to claim 10, further comprising an act of collecting information relating to a plurality of loyalty accounts associated with a player.

18. The method according to claim 10, further comprising an act of collecting information relating to game play of the player.

19. A non-transitory computer readable medium comprising computer-executable instructions that when executed on a processor performs a method for collecting player information in a distributed computer system, the method comprising acts of:
    collecting information relating to a plurality of frequent player accounts associated with a player wherein the plurality of frequent player accounts are player accounts related to a respective plurality of separate gaming establishments;
    storing, in a database, the collected information; and
    further comprising an act of executing a trading of frequent player points between a plurality of players.

20. The computer readable medium according to claim 19, further comprising an act of determining a rating of the player based on the information relating to the plurality of frequent player accounts associated with the player.

* * * * *